US012713124B2

(12) United States Patent
Tsuchiya et al.

(10) Patent No.: US 12,713,124 B2
(45) Date of Patent: Aug. 18, 2026

(54) ELECTRONIC DEVICE, IMAGE-CAPTURING DEVICE, AND IMAGE-CAPTURING SYSTEM

(71) Applicant: NIKON CORPORATION, Tokyo (JP)

(72) Inventors: Satoshi Tsuchiya, Kawasaki (JP); Yuuki Asano, Narashino (JP); Shuhei Yoshikawa, Tokyo (JP); Iori Noda, Kawasaki (JP); Takashi Shionoya, Koganei (JP); Toshiyuki Kanbara, Tokyo (JP); Aiko Namikawa, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 211 days.

(21) Appl. No.: 18/196,554

(22) Filed: May 12, 2023

(65) Prior Publication Data

US 2023/0283881 A1 Sep. 7, 2023

Related U.S. Application Data

(62) Division of application No. 15/510,314, filed as application No. PCT/JP2015/077787 on Sep. 30, 2015, now Pat. No. 11,689,798.

(30) Foreign Application Priority Data

Sep. 30, 2014 (JP) ................................ 2014-202104
Sep. 30, 2014 (JP) ................................ 2014-202105

(51) Int. Cl.
*H04N 23/62* (2023.01)
*G03B 17/18* (2021.01)
(Continued)

(52) U.S. Cl.
CPC ............ *H04N 23/62* (2023.01); *G03B 17/18* (2013.01); *H04N 23/631* (2023.01); *H04N 23/64* (2023.01); *H04N 25/76* (2023.01)

(58) Field of Classification Search
CPC ...... H04N 23/62; H04N 23/631; H04N 23/64; H04N 25/76; G03B 17/18
See application file for complete search history.

(56) References Cited

U.S. PATENT DOCUMENTS 6,665,010 B1 12/2003 Morris et al.
2008/0024624 A1 1/2008 Okamoto
(Continued)

FOREIGN PATENT DOCUMENTS

JP 2006-049361 A 2/2006
JP 2011-078055 A 4/2011
(Continued)

OTHER PUBLICATIONS

Dec. 8, 2015 Search Report issued in International Patent Application No. PCT/JP2015/077787.
(Continued)

*Primary Examiner* — Kelly L Jerabek
(74) *Attorney, Agent, or Firm* — Oliff PLC

(57) ABSTRACT

An electronic device includes: a display control unit that is configured to display at a display unit a first image generated by capturing an image with light having entered a first area of an image sensor and a second image generated by capturing an image with light having entered a second area at the image sensor different from the first area; and a selection unit that is configured to select either the first area or the second area as an area for image-capturing condition adjustment in reference to the first image and the second image displayed at the display unit.

20 Claims, 28 Drawing Sheets

(51) Int. Cl.
*H04N 23/60* (2023.01)
*H04N 23/63* (2023.01)
*H04N 25/76* (2023.01)

(56) References Cited

U.S. PATENT DOCUMENTS

| | | | |
|---|---|---|---|
| 2009/0225189 | A1 | 9/2009 | Morin |
| 2010/0276572 | A1 | 11/2010 | Iwabuchi et al. |
| 2011/0292242 | A1 | 12/2011 | Imai |
| 2012/0069212 | A1 | 3/2012 | Imai |
| 2013/0002928 | A1 | 1/2013 | Imai |
| 2013/0140467 | A1 | 6/2013 | Kitano et al. |

FOREIGN PATENT DOCUMENTS

| | | | |
|---|---|---|---|
| JP | 2013-150265 | A | 8/2013 |
| JP | 2013-258438 | A | 12/2013 |
| WO | 2014/133076 | A1 | 9/2014 |

OTHER PUBLICATIONS

Apr. 12, 2018 Extended Search Report issued European Patent Application No. 15846504.7.
Sep. 10, 2018 Office Action issued in U.S. Appl. No. 15/510,314.
Feb. 25, 2019 Office Action issued in U.S. Appl. No. 15/510,314.
Apr. 16, 2019 Office Action issued in Japanese Patent Application No. 2016-552128.
Jun. 26, 2019 Office Action issued in European Patent Application No. 15 846 504.7.
May 31, 2019 Office Action issued in Chinese Patent Application No. 201580064891.X.
Oct. 31, 2019 Office Action issued in U.S. Appl. No. 15/510,314.
Jun. 11, 2020 Office Action issued in U.S. Appl. No. 15/510,314.
Apr. 28, 2020 Office Action issued in European Patent Application No. 15 846 504.7.
Apr. 29, 2020 Office Action issued in Chinese Patent Application No. 201580064891.X.
Jun. 10, 2020 Office Action issued in Indian Patent Application No. 201717015221.
Sep. 15, 2020 Office Action issued in Japanese Patent Application No. 2019-234837.
Nov. 3, 2020 Office Action issued in Chinese Patent Application No. 201580064891.X.
Dec. 17, 2020 Office Action issued in European Patent Application No. 15 846 504.7.
May 11, 2021 Office Action issued in Japanese Patent Application No. 2019-234837.
Sep. 13, 2021 Non-Final Office Action Issued in U.S. Appl. No. 15/510,314.
Jun. 21, 2022 Office Action issued in U.S. Appl. No. 15/510,314.
Sep. 20, 2022 Office Action issued in Japanese Patent Application No. 2021-183422.
Feb. 14, 2023 Notice of Allowance Issued in U.S. Appl. No. 15/510,314.
Mar. 3, 2021 Office Action issued in U.S. Appl. No. 15/510,314.
May 11, 2024 Office Action issued in Chinese Patent Application No. 202111144079.1.
Sep. 28, 2023 Office Action issued in Chinese Patent Application No. 202111144079.1.
Dec. 2, 2025 Office Action issued in Japanese Patent Application No. 2024-062674.
Jul. 7, 2026 Office Action issued in Japanese Patent Application No. 2024-062674.

10
21
22
23
24
0
CONTROL UNIT
LIQUID CRYSTAL MONITOR
23a
OBJECT RECOGNITION UNIT
25
MEMORY CARD
23b
WEIGHT SETTING UNIT
26
OPERATION UNIT
30
23c
AREA SECTIONALIZING UNIT
27
DRAM
23d
IMAGE-CAPTURING CONDITION SETTING UNIT
28
FLASH MEMORY
23e
IMAGE PROCESSING UNIT
29
ATTITUDE DETECTION UNIT
23f
IMAGE-CAPTURING CONTROL UNIT (a)
101
110
108
102
104
105
24
103
(b)
110A
102
102a
111
130
SET PRIMARY SUBJECT
SHUTTER SPEED 1/125 SEC
ISO SENSITIVITY 200
IMAGE PROCESSING EFFECT NO
101a
101
104
104a
105
103
103a
131a
131b
131c
131d
131
114
24
190
181
(c)
110A
102
111
130
SET PRIMARY SUBJECT
SHUTTER SPEED 1/125 SEC
ISO SENSITIVITY 200
IMAGE PROCESSING EFFECT SKIN TONE CORRECTION
OK
RETURN
101
104
105
103
131a
131b
131c
131d
131
114
132
24
121
191
182
(d)
110A
102
111
130
SET PRIMARY SUBJECT
SHUTTER SPEED 1/125 SEC
ISO SENSITIVITY 200
IMAGE PROCESSING EFFECT NO
OK
RETURN
101
104
105
103
131a
131b
131c
131d
131
114
132
24
124
191
182

(a)
(b)
110B
106
24
106a
130
131a
131b
131c
131d
131
132
SET PRIMARY SUBJECT
SHUTTER SPEED 1/125 SEC
ISO SENSITIVITY 200
IMAGE PROCESS-ING EFFECT NO
OK (a)
(b)
SET PRIMARY SUBJECT
SHUTTER SPEED 1/125 SEC ΔV
ISO SENSITIVITY 200 ΔV
IMAGE PROCESSING EFFECT NO ΔV
OK
130
131
131a
131b
131c
131d
114
24
132
111
110C
106
106a
191
125

(b)
(d)
SET PRIMARY SUBJECT
SHUTTER SPEED 1/125 SEC
ISO SENSITIVITY 200
IMAGE PROCESS-ING EFFECT NO
⋮
OK
130
131
132
101
102
103
104A
104B
105B
105C
106
110E
115
116
146, 126
147, 127
148, 128
149, 129
151
152
24

(a)
(c)

SET PRIMARY SUBJECT
SHUTTER SPEED 1/125 SEC
ISO SENSITIVITY 200
IMAGE PROCESS-ING EFFECT NO
⋮
OK
105A
101
104A
104B
102
105B
105C
108
110E
103
24
106
130
131
132
149, 129

(a)
(b)
SET PRIMARY SUBJECT
SHUTTER SPEED 1/125 SEC
ISO SENSITIVITY 200
IMAGE PROCESSING EFFECT NO
OK
130
131a
131b
131c
131d
131
114
132
24
111
102
110A
101
104
105
103
112
121
110
106
161

(a)
(b)
110
202
203
24
101
ISO
Tv

ELECTRONIC DEVICE, IMAGE-CAPTURING DEVICE, AND IMAGE-CAPTURING SYSTEM

CROSS-REFERENCE TO RELATED APPLICATION(S)

This is a divisional of U.S. application Ser. No. 15/510,314 filed Jul. 18, 2017 now U.S. Pat. No. 11,689,798), which is a National Stage Entry of PCT/JP2015/077787 filed on Sep. 30, 2015, which is based on and claims priority under 35 U.S.C. 119 from Japanese Patent Application No. 2014-202104 filed Sep. 30, 2014 and Japanese Patent Application No. 2014-202105 filed Sep. 30, 2014. The contents of the above applications are incorporated herein by reference.

TECHNICAL FIELD

The present invention relates to an electronic device, an image-capturing device and an image-capturing system.

BACKGROUND ART

There is an image sensor proposed in the related art, which is configured with an image-capturing chip and a signal processing chip (see PTL1).

CITATION LIST

Patent Literature

PTL1: Japanese Laid Open Patent Publication No. 2006-49361

SUMMARY OF INVENTION

Technical Problem

There is an issue in the related art in that image-capturing conditions cannot be set with ease in correspondence to individual areas.

Solution to Problem

According to the 1st aspect of the present invention, an electronic device comprises: a display control unit that is configured to display at a display unit a first image generated by capturing an image with light having entered a first area of an image sensor and a second image generated by capturing an image with light having entered a second area at the image sensor different from the first area; and a selection unit that is configured to select either the first area or the second area as an area for image-capturing condition adjustment in reference to the first image and the second image displayed at the display unit.

According to the 2nd aspect of the present invention, in the electronic device according to the 1st aspect, it is preferred that: the electronic device further comprises a setting unit that is configured to set image-capturing conditions for the first area or the second area having been selected by the selection unit.

According to the 3rd aspect of the present invention, in the electronic device according to the 2nd aspect, it is preferred that: the setting unit is configured to set image-capturing conditions for the first area or the second area that has not been selected by the selection unit by setting the image-capturing conditions for the first area or the second area having been selected by the selection unit.

According to the 4th aspect of the present invention, in the electronic device according to the 3rd aspect, it is preferred that: the display control unit is configured to display at the display unit a third image generated by capturing an image with light having entered the first area under the image-capturing conditions set by the setting unit and a fourth image generated by capturing an image with light having entered the second area under the image-capturing conditions set by the setting unit.

According to the 5th aspect of the present invention, in the electronic device according to the 3rd or the 4th aspect, it is preferred that: the setting unit is configured to set image-capturing conditions so that the image-capturing conditions for the first area or the second area having been selected by the selection unit are different from the image-capturing conditions for the first area or the second area that has not been selected by the selection unit.

According to the 6th aspect of the present invention, in the electronic device according to any one of the 3rd through 5th aspects, it is preferred that: the display control unit is configured to display at the display unit a setting image to be used to set image-capturing conditions for the first area or the second area having been selected by the selection unit; and the setting unit is configured to set image-capturing conditions via the setting image displayed at the display unit.

According to the 7th aspect of the present invention, an electronic device comprises: a display control unit that is configured to display at a display unit a subject image captured by an image-capturing unit controlled under specific image-capturing conditions set in correspondence to each of a plurality of image-capturing areas; and a sectionalizing unit that is configured to sectionalize at least one areal portion in the subject image, wherein: the display control unit is configured to display at the display unit a partial image of an image-capturing area corresponding to the areal portion, captured by the image-capturing unit, and the subject image.

According to the 8th aspect of the present invention, in the electronic device according to the 7th aspect, it is preferred that: the electronic device further comprises a setting unit that is configured to set image-capturing conditions for the image-capturing area corresponding to the areal portion; and the display control unit is configured to superimpose the partial image over the subject image to be displayed; and the setting unit is configured to set image-capturing conditions for the corresponding image-capturing area by selecting the areal portion on the subject image.

According to the 9th aspect of the present invention, in the electronic device according to the 7th aspect, it is preferred that: the display control unit is configured to further include a setting unit that is configured to set image-capturing conditions for the image-capturing area corresponding to the areal portion; the display control unit is configured to display the partial image in an area different from an area where the subject image is displayed at the display unit; and the setting unit is configured to select the partial image displayed at the display unit and set image-capturing conditions for the image-capturing area corresponding to the partial image having been selected.

According to the 10th aspect of the present invention, in the electronic device according to the 9th aspect, it is preferred that: the display control unit is configured to display the areal portion on the subject image displayed at the display unit.

According to the 11th aspect of the present invention, in the electronic device according to the 9th or the 10th aspect, it is preferred that: the sectionalizing unit is configured to sectionalize the subject image into a plurality of areal portions; and the display control unit is configured to display at the display unit a plurality of enlarged partial images corresponding to the plurality of areal portions.

According to the 12th aspect of the present invention, in the electronic device according to the 9th or the 10th aspect, it is preferred that: the sectionalizing unit is configured to sectionalize the subject image into a plurality of areal portions; and the display control unit is configured to provide an at-a-glance display of a plurality of partial images corresponding to the plurality of areal portions at the display unit.

According to the 13th aspect of the present invention, in the electronic device according to any one of the 8th through 12th aspects, it is preferred that: the display control unit is configured to display at the display unit the subject image that includes an image of the image-capturing area corresponding to the areal portion captured by the image-capturing unit based upon the image-capturing conditions set by the setting unit.

According to the 14th aspect of the present invention, in the electronic device according to any one of the 7th through 13th aspects, it is preferred that: the sectionalizing unit is configured to include a subject detection unit that is configured to detect a specific type of subject in the subject image and sectionalize an area corresponding to the specific type of subject detected by the subject detection unit as the areal portion.

According to the 15th aspect of the present invention, in the electronic device according to any one of the 7th through 13th aspects, it is preferred that: the sectionalizing unit is configured to include an external operation unit that is configured to select a desired area in the subject image displayed by the display control unit and sectionalize the desired area selected by the external operation unit as the areal portion.

According to the 16th aspect of the present invention, in the electronic device according to any one of the 7th through 15th aspects, it is preferred that: the image-capturing conditions include at least either an electric charge accumulation duration in the image-capturing area or a gain in the image-capturing area.

According to the 17th aspect of the present invention, an image-capturing device comprises: the electronic device according to any one of the 8th through 13th aspects; an image-capturing unit controlled under specific image-capturing conditions set in correspondence to each of a plurality of image-capturing areas; an image-capturing control unit that is configured to control each of the plurality of image-capturing areas under the specific image-capturing conditions; and a recording unit that is configured to record a subject image captured by the image-capturing unit into a recording medium, wherein: the image-capturing control unit is configured to generate the subject image by controlling each image-capturing area under image-capturing conditions set by the setting unit in correspondence to the image-capturing area; and the recording unit is configured to record the subject image into the recording medium.

According to the 18th aspect of the present invention, an image-capturing system comprises: the electronic device according to any one of the 8th through 13th aspects; and an image-capturing device, wherein: the electronic device further comprises a first communication unit capable of communicating with the image-capturing device; the image-capturing device further comprises an image-capturing unit controlled under specific image-capturing conditions set for each of a plurality of image-capturing areas, an image-capturing control unit that is configured to generate a subject image by controlling each of the plurality of image-capturing areas under the specific image-capturing conditions, and a second communication unit capable of communicating with the electronic device; the second communication unit transmits the subject image to the electronic device via the second communication unit; and the first communication unit transmits the image-capturing conditions set by the setting unit in correspondence to each areal portion in the subject image, displayed by the display control unit, to the image-capturing device.

According to the 19th aspect of the present invention, an electronic device comprises: an image sensor that is configured to include a first area where a first signal is generated by capturing an image with incident light under a first image-capturing condition and a second area different from the first area, where a second signal is generated by capturing an image with incident light under a second image-capturing condition; and an adjustment unit that is configured to adjust the second image-capturing condition as the first image-capturing condition is adjusted.

According to the 20th aspect of the present invention, in the electronic device according to the 19th aspect, it is preferred that: the adjustment unit is configured to adjust the second image-capturing condition in correspondence to an extent of adjustment of the first image-capturing condition.

According to the 21st aspect of the present invention, in the electronic device according to the 19th or the 20th aspect, it is preferred that: an extent of adjustment of the second image-capturing condition is different from the extent of adjustment of the first image-capturing condition.

According to the 22nd aspect of the present invention, in the electronic device according to the 19th aspect, it is preferred that: the adjustment unit is configured to adjust the second image-capturing condition based upon light entering the second area.

According to the 23rd aspect of the present invention, in the electronic device according to the 22nd aspect, it is preferred that: the electronic device further comprises a detection unit that is configured to detect the second signal output from the image sensor; and the adjustment unit is configured to adjust the second image-capturing condition based upon detection results provided by the detection unit.

According to the 24th aspect of the present invention, in the electronic device according to the 23rd aspect, it is preferred that: the detection unit is configured to detect a subject based upon the second signal; and the adjustment unit is configured to adjust the second image-capturing condition based upon the subject detected by the detection unit.

According to the 25th aspect of the present invention, in the electronic device according to any one of the 19th through 24th aspects, it is preferred that: the adjustment unit is configured to adjust the second image-capturing condition within a range in which the second signal does not range beyond a brightness-defining threshold value.

According to the 26th aspect of the present invention, in the electronic device according to any one of the 19th through 25th aspects, it is preferred that: the electronic device further comprises an operation unit that is configured to be operated to adjust the first image-capturing condition; and the adjustment unit is configured to adjust the second image-capturing condition in response to an operation at the operation unit.

According to the 27th aspect of the present invention, in the electronic device according to any one of the 19th through 26th aspects, it is preferred that: the electronic device further comprises a display unit at which an image to be used to adjust the first image-capturing condition is displayed; and the adjustment unit is configured to adjust the second image-capturing condition via the image displayed at the display unit.

According to the 28th aspect of the present invention, an electronic device comprises: a setting unit that is configured to set a first image-capturing condition under which an image is captured with light having entered a first area at an image sensor and a second image-capturing condition under which an image is captured with light having entered a second area, different from the first area, at the image sensor; and an adjustment unit that is configured to adjust the second image-capturing condition having been set by the setting unit, as the first image-capturing condition is adjusted.

According to the 29th aspect of the present invention, in the electronic device according to the 28th aspect, it is preferred that: the electronic device further comprises an operation unit that is configured to be operated to adjust the first image-capturing condition; and the adjustment unit is configured to adjust the second image-capturing condition in response to an operation at the operation unit.

According to the 30th aspect of the present invention, in the electronic device according to the 28th or the 29th aspect, it is preferred that: the electronic device further comprises a display unit at which an image to be used to adjust the first image-capturing condition is displayed; and the adjustment unit is configured to adjust the second image-capturing condition via the image displayed at the display unit.

According to the 31st aspect of the present invention, in the electronic device according to any one of the 19th through 30th aspects, it is preferred that: the electronic device further comprises a disallowing unit that is configured to disallow an adjustment of the second image-capturing condition by the adjustment unit that would result in an image-capturing signal in the second area ranging beyond predetermined limits.

According to the 32nd aspect of the present invention, in the electronic device according to the 31st aspect, it is preferred that: the second area corresponds to at least either a darkest area of a subject or a brightest area of the subject; and the disallowing unit is configured to disallow an adjustment of the second image-capturing condition that would result in a reversal of a magnitude relation between an image-capturing signal in the first area and an image-capturing signal in the second area.

According to the 33rd aspect of the present invention, an image-capturing device comprises: the electronic device according to any one of the 19th through 32nd aspects.

(d) An example of a display mode that provides an enlarged display of a primary subject corresponding to a partial image in (a)

Figure 4:
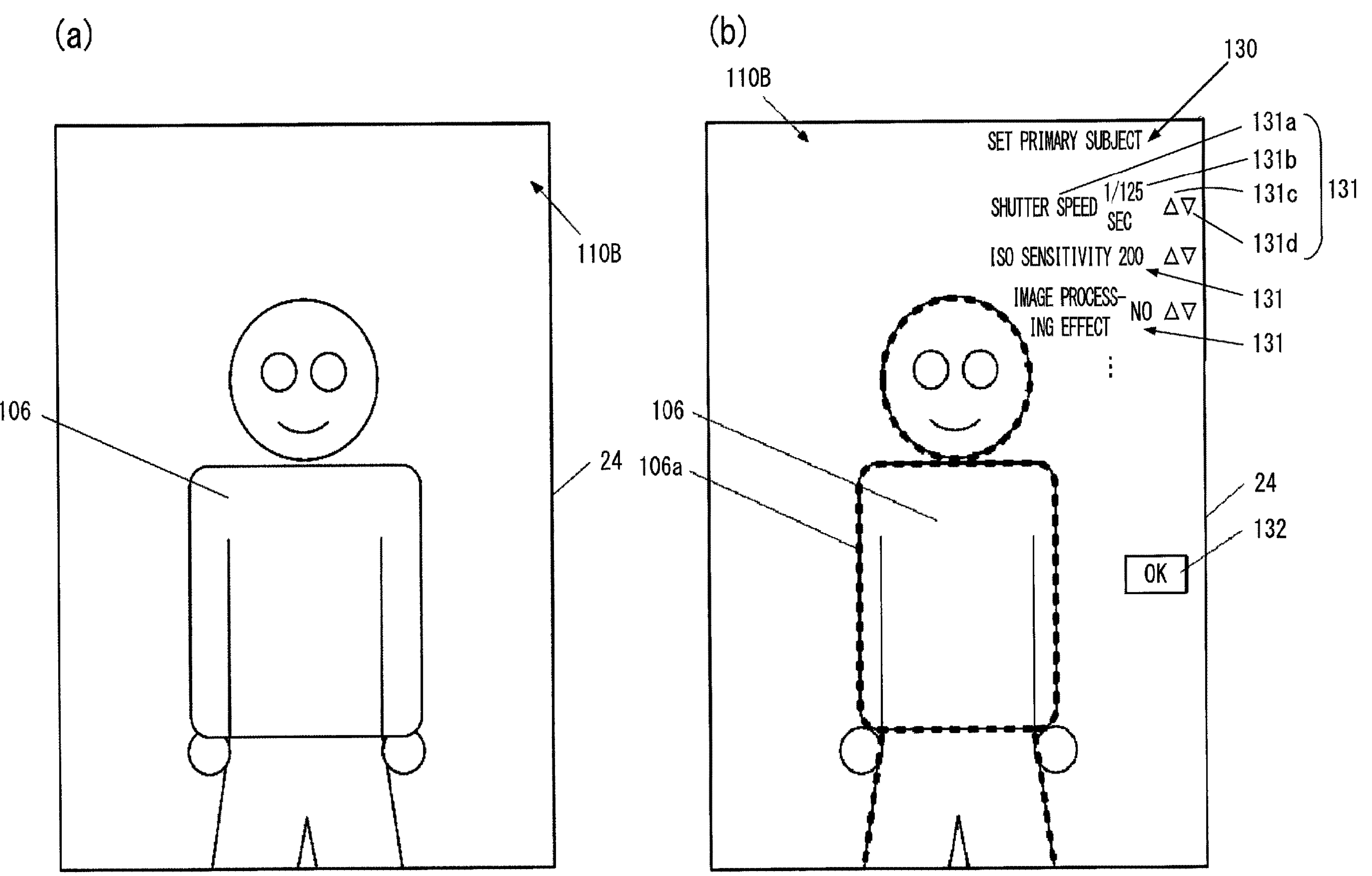
Figure 5:
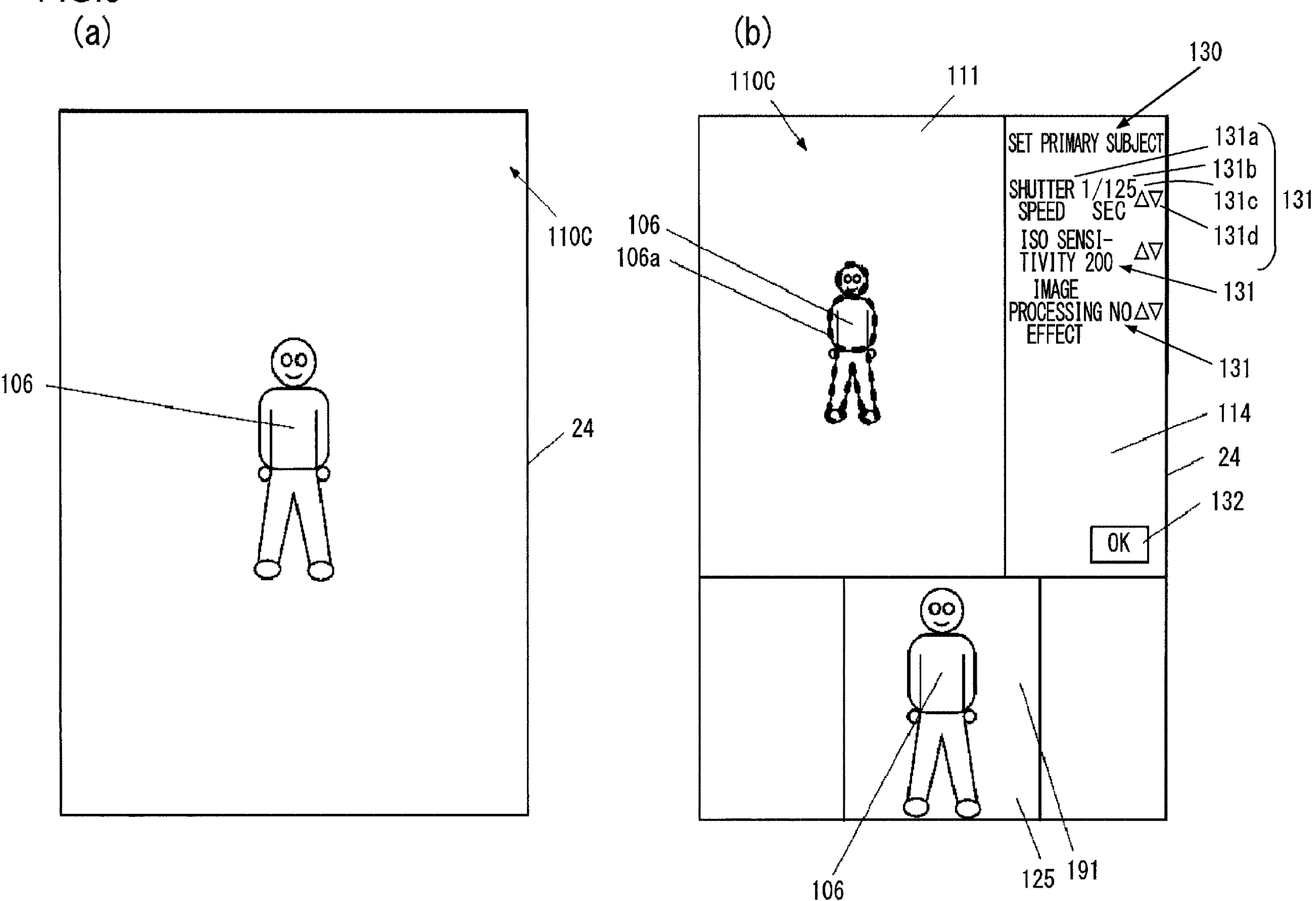
Figure 6:
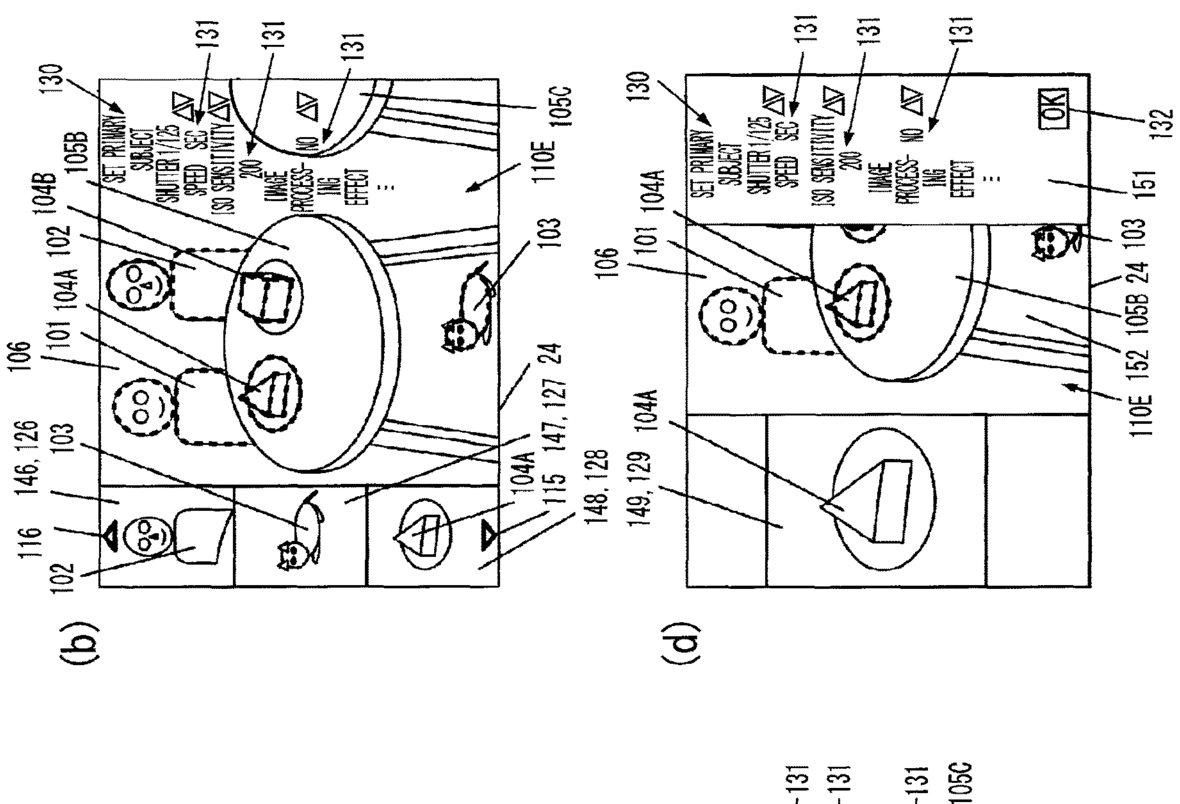
Figure 6:
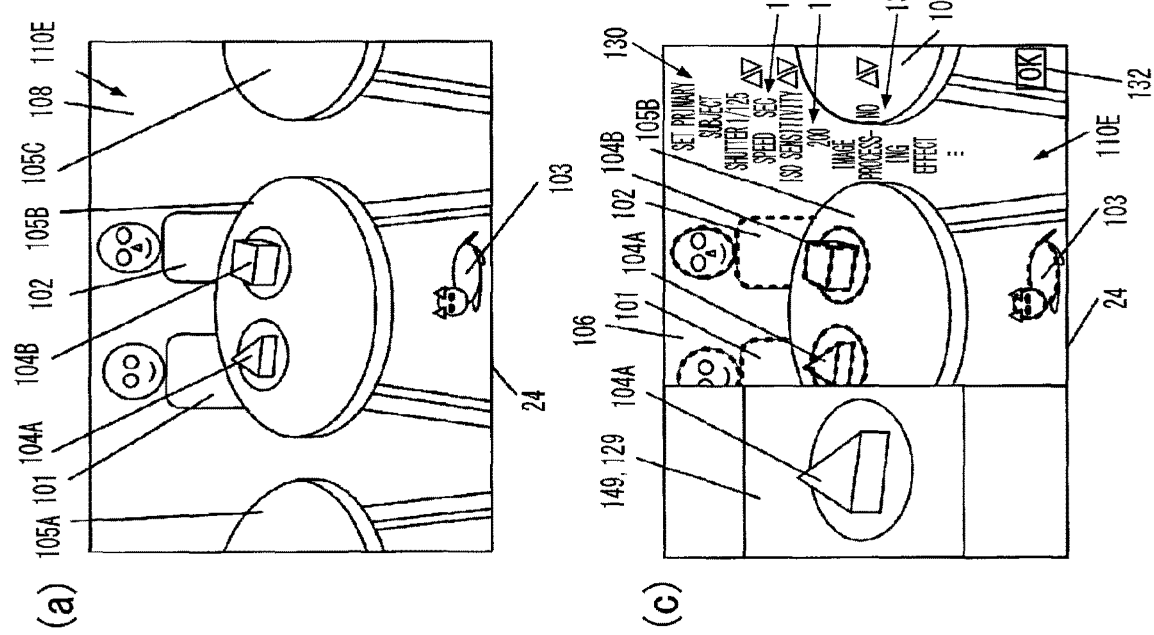

FIG. 4 (*a*) An example of a display mode in which an image of a person displayed at the liquid crystal monitor takes up a large area at the information terminal device judged by the attitude detection unit to be in a vertical orientation (b) An example of a display mode that provides a display of the outline of a primary subject area on the subject image FIG. 5 (*a*) An example of a display mode in which an image of a person displayed at the liquid crystal monitor takes up a small area at the information terminal device judged by the attitude detection unit to be in a vertical orientation (b) An example of a display mode that provides an enlarged display of the image of the primary subject in the subject image FIG. 6 (*a*) A schematic illustration of a subject image brought up on display at the liquid crystal monitor of the information terminal device judged by the attitude detection unit to be in a horizontal orientation (b) An example of a display mode that provides an instructive display of a subject image with primary subject areas superimposed thereupon, together with a display of partial images (c) An example of a display mode that provides an enlarged view of a primary subject corresponding to a partial image in (b)

(d) An example of a display mode that provides an enlarged display of a primary subject among the partial images in (b)

Figure 7:
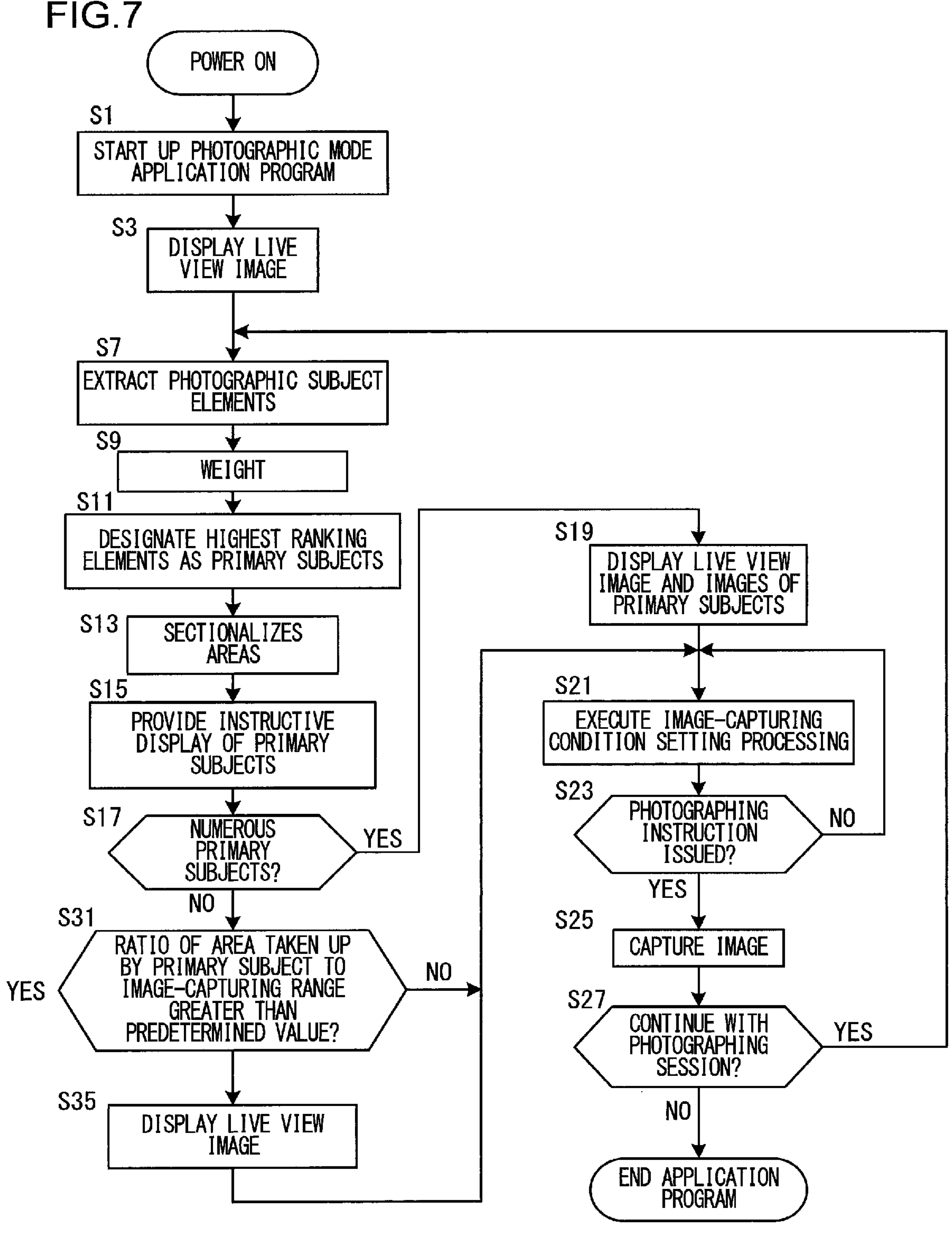
Figure 8:
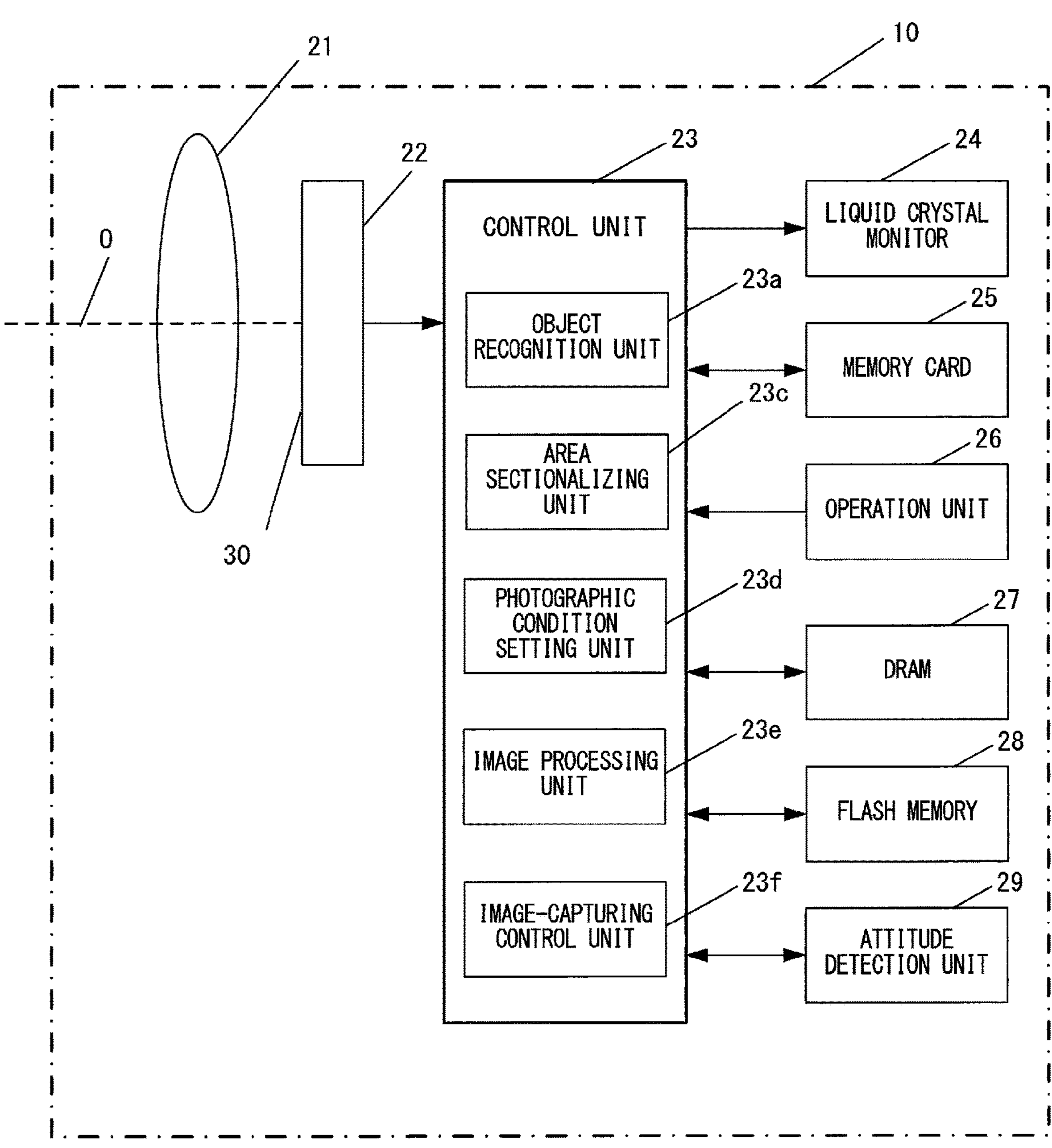
Figure 9:
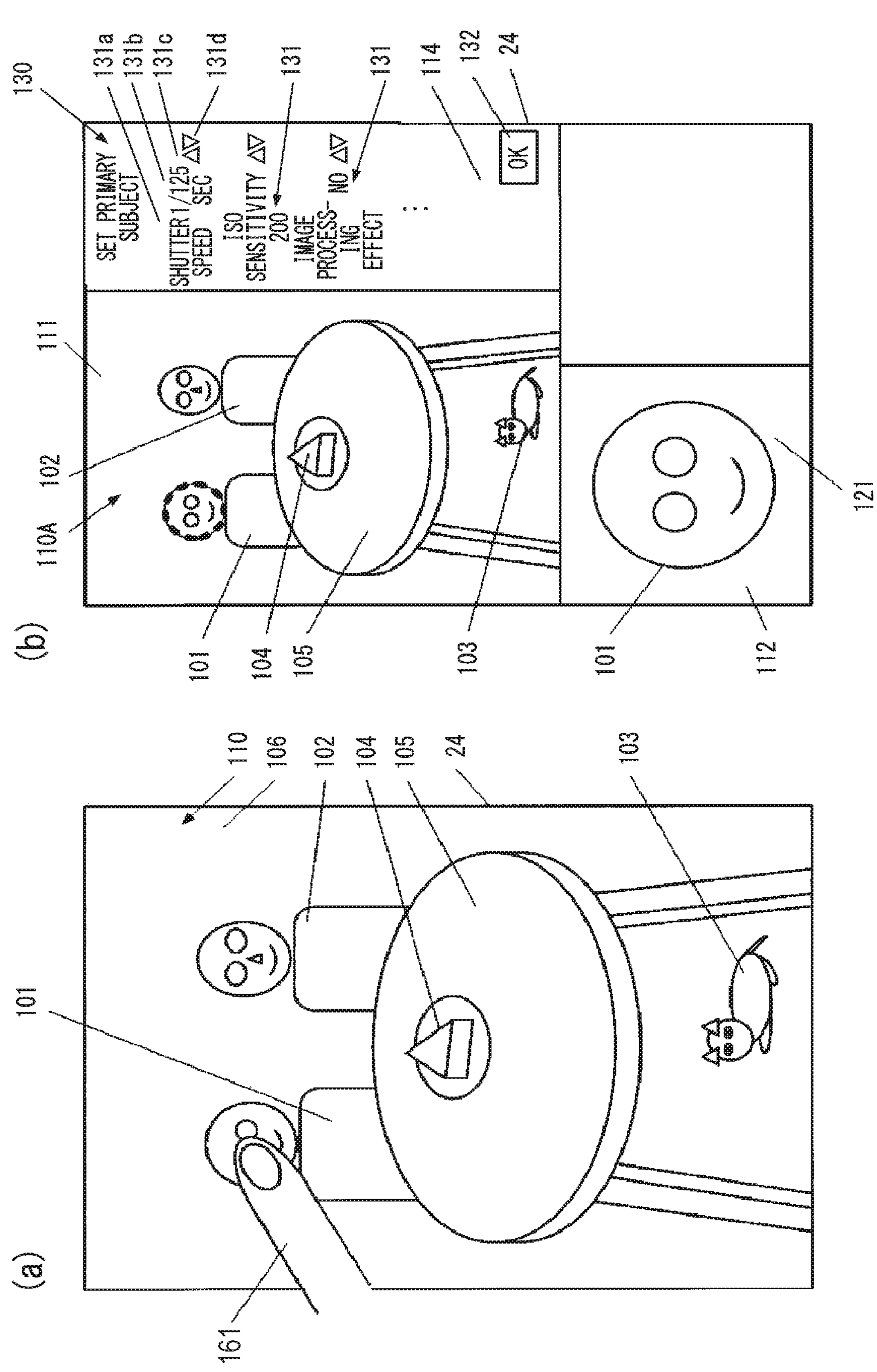
Figure 11:
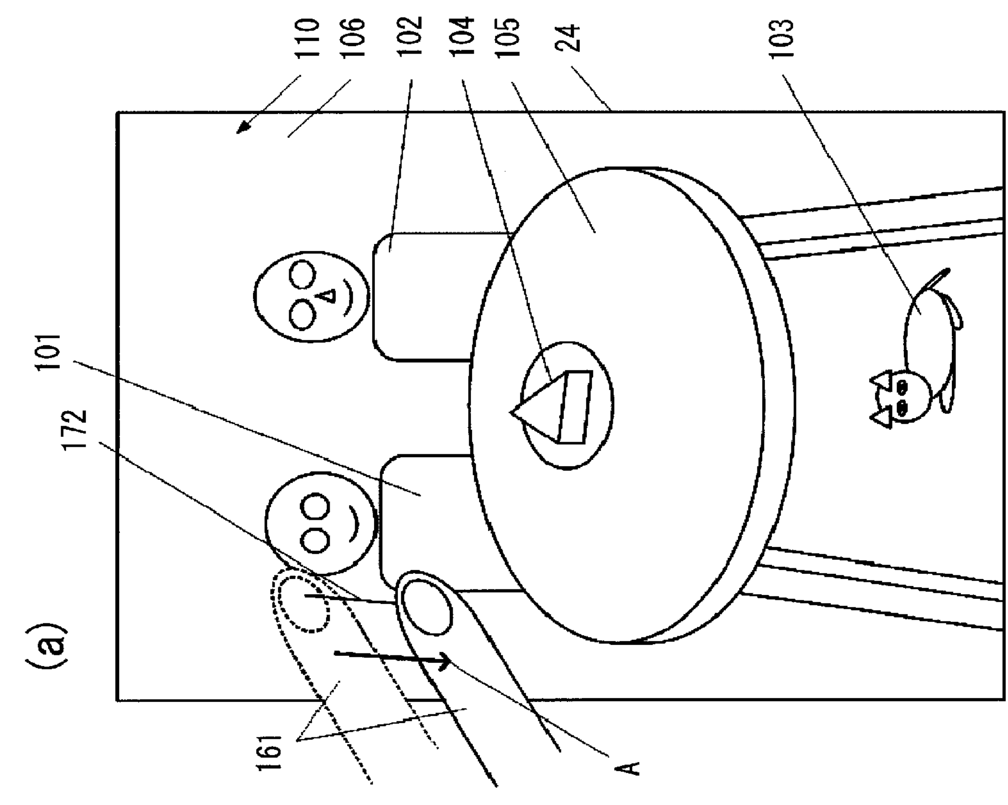
Figure 12:
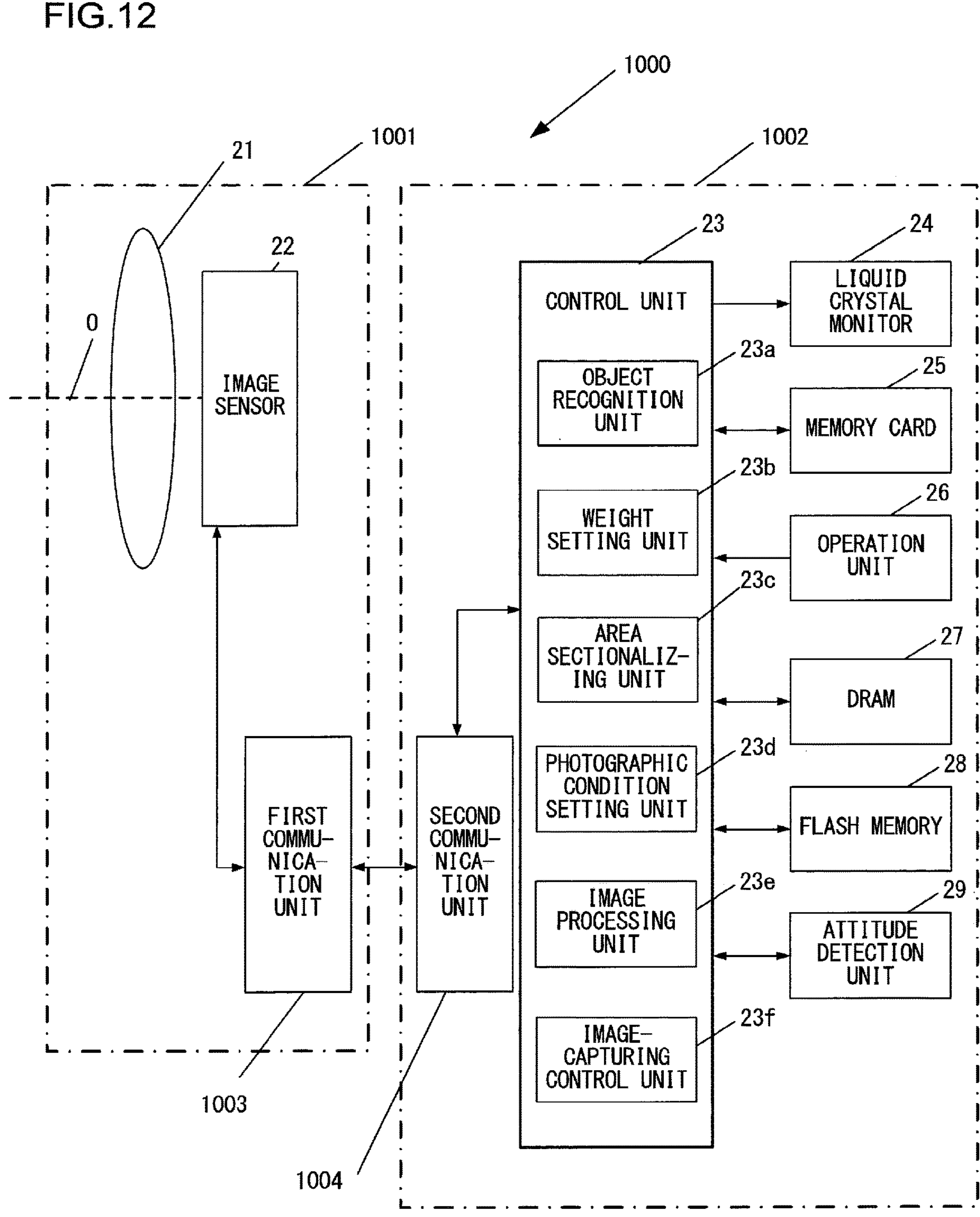
Figure 13:
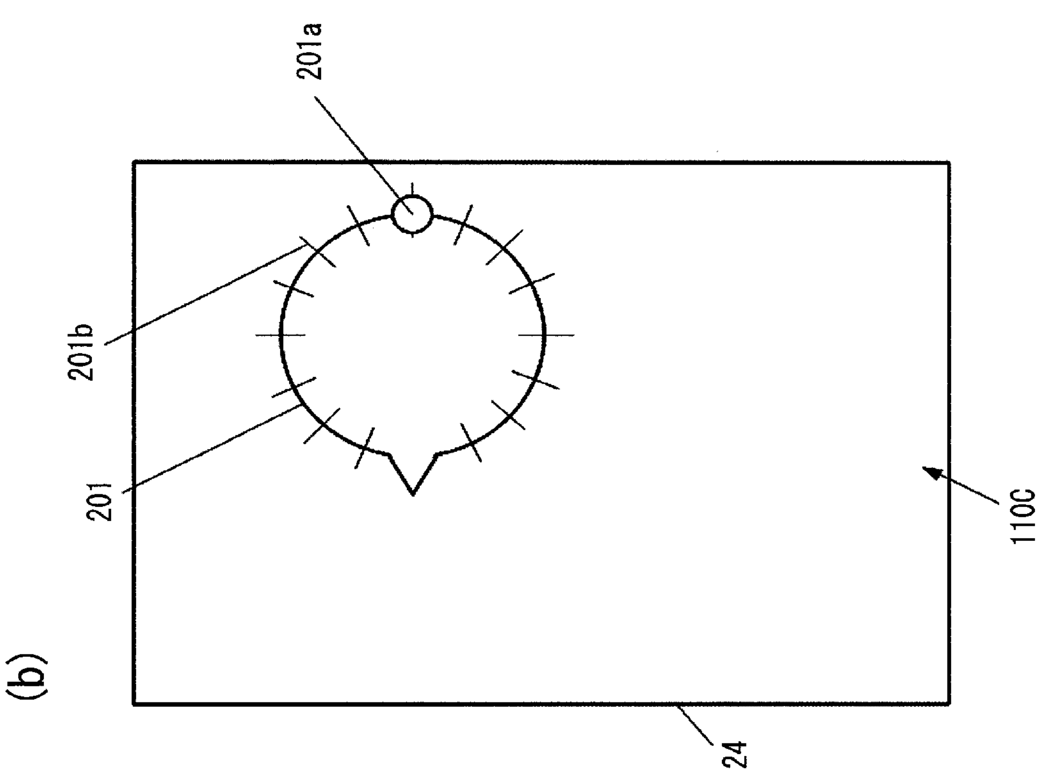
Figure 13:
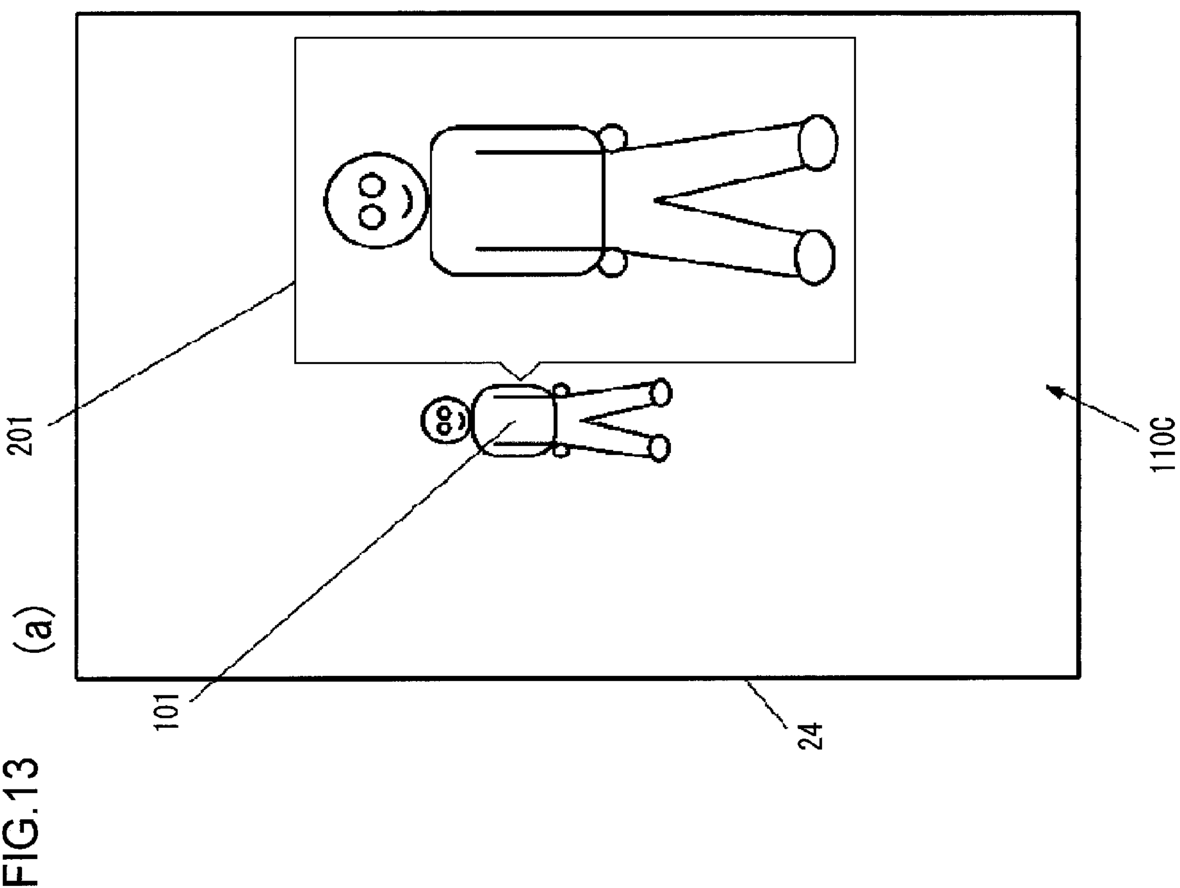
Figure 14:
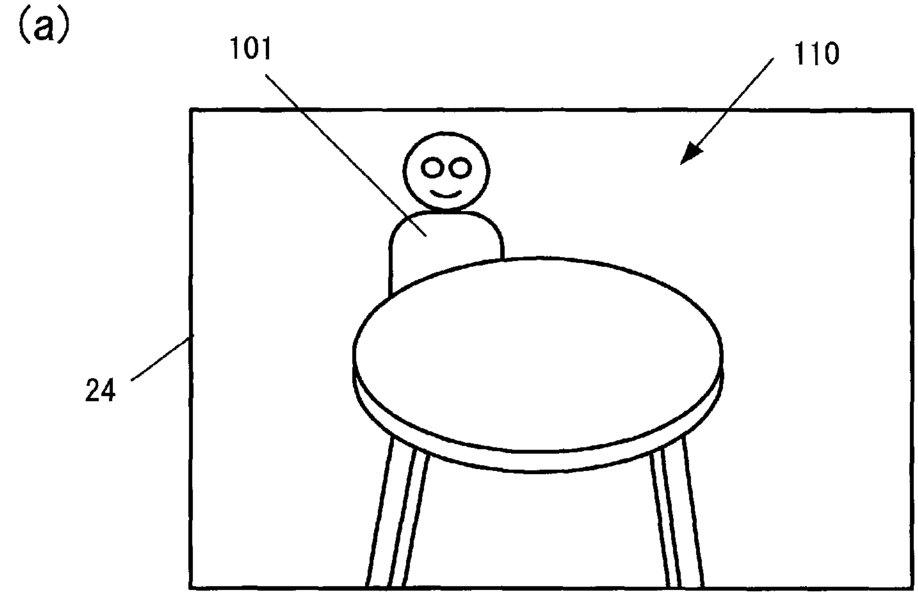
Figure 14:
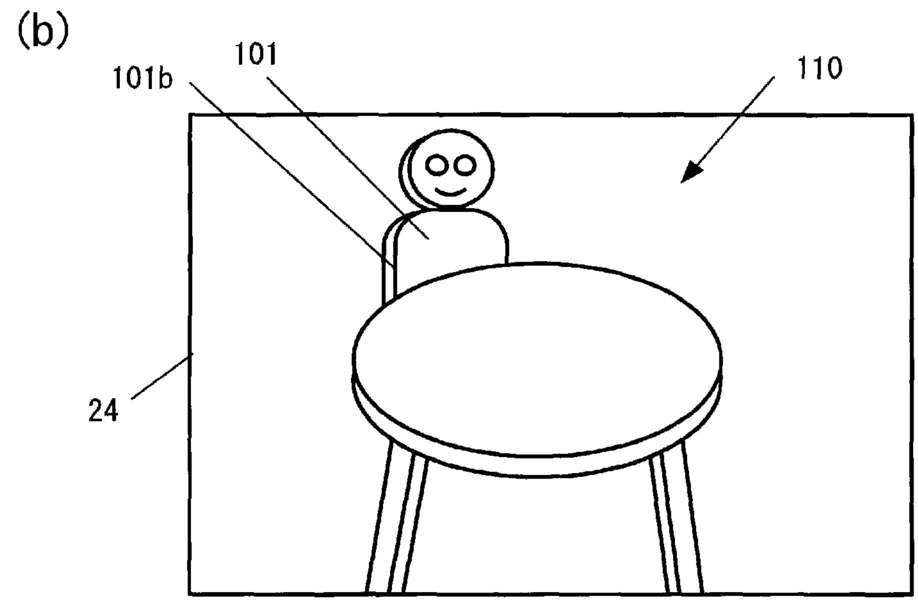
Figure 15:
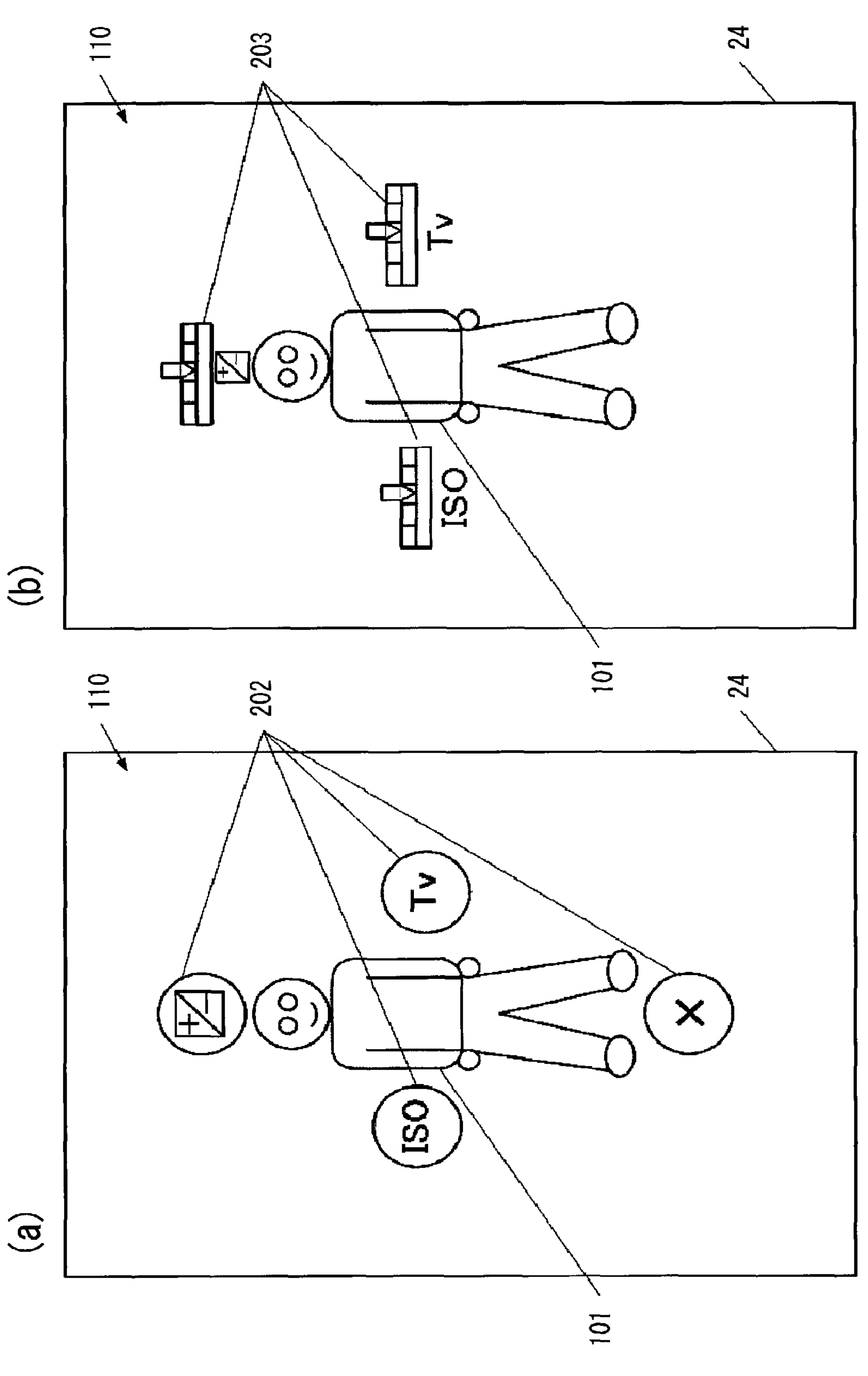
Figure 16:
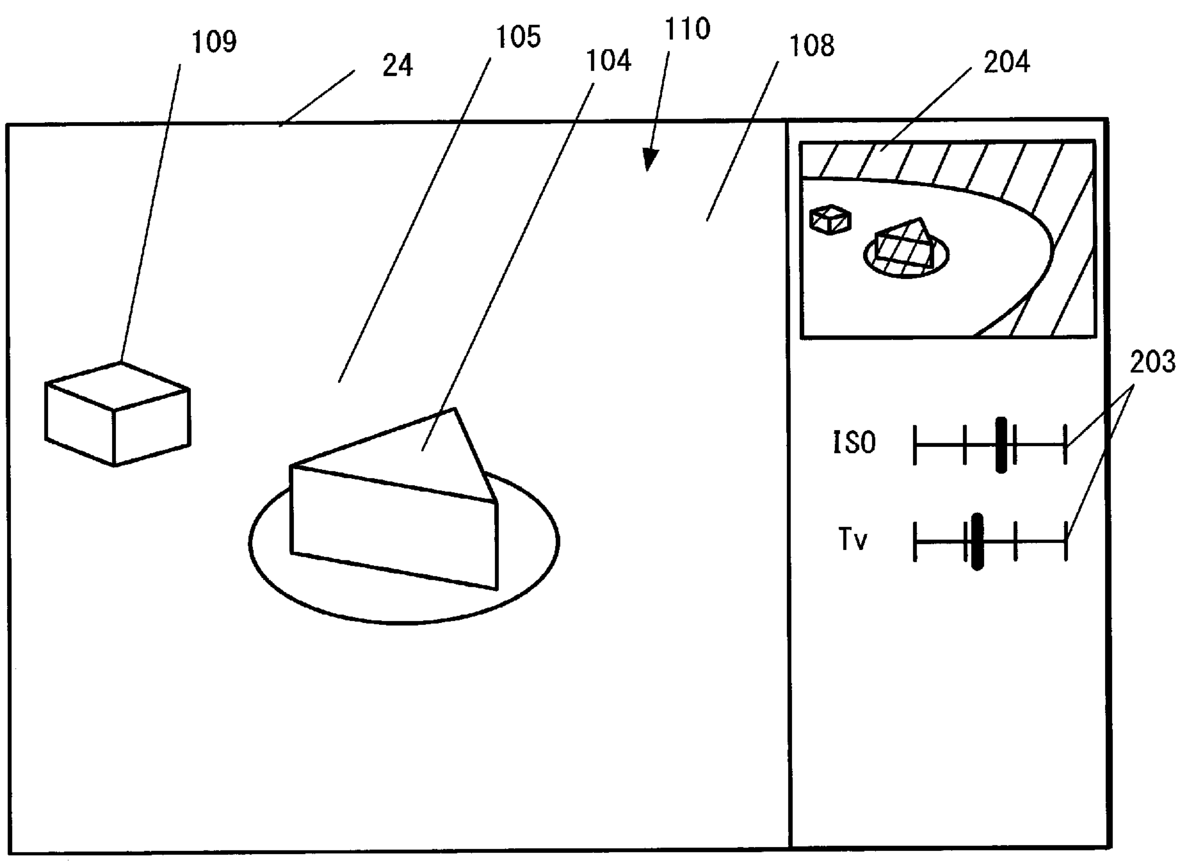
Figure 17:
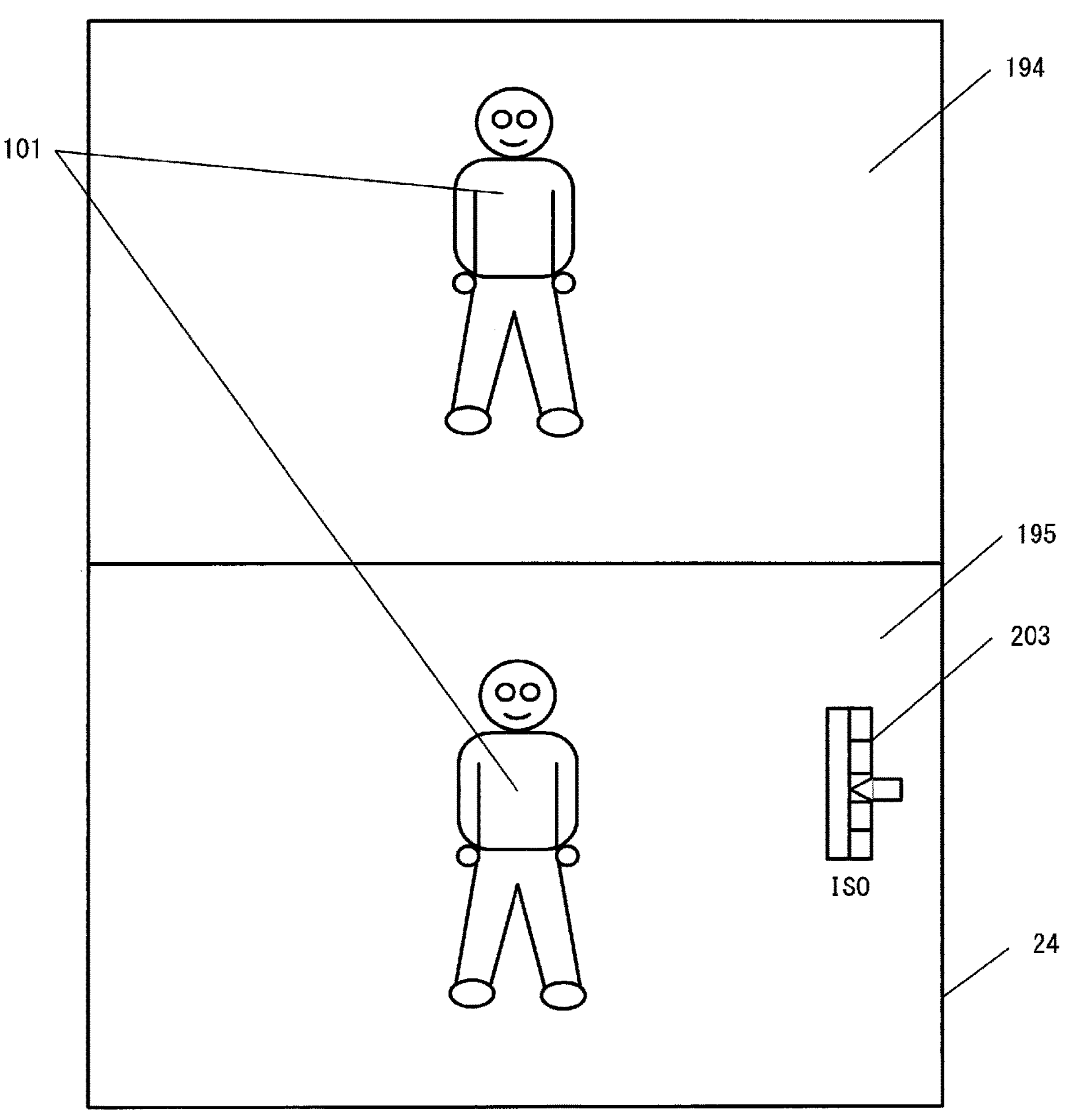
Figure 18:
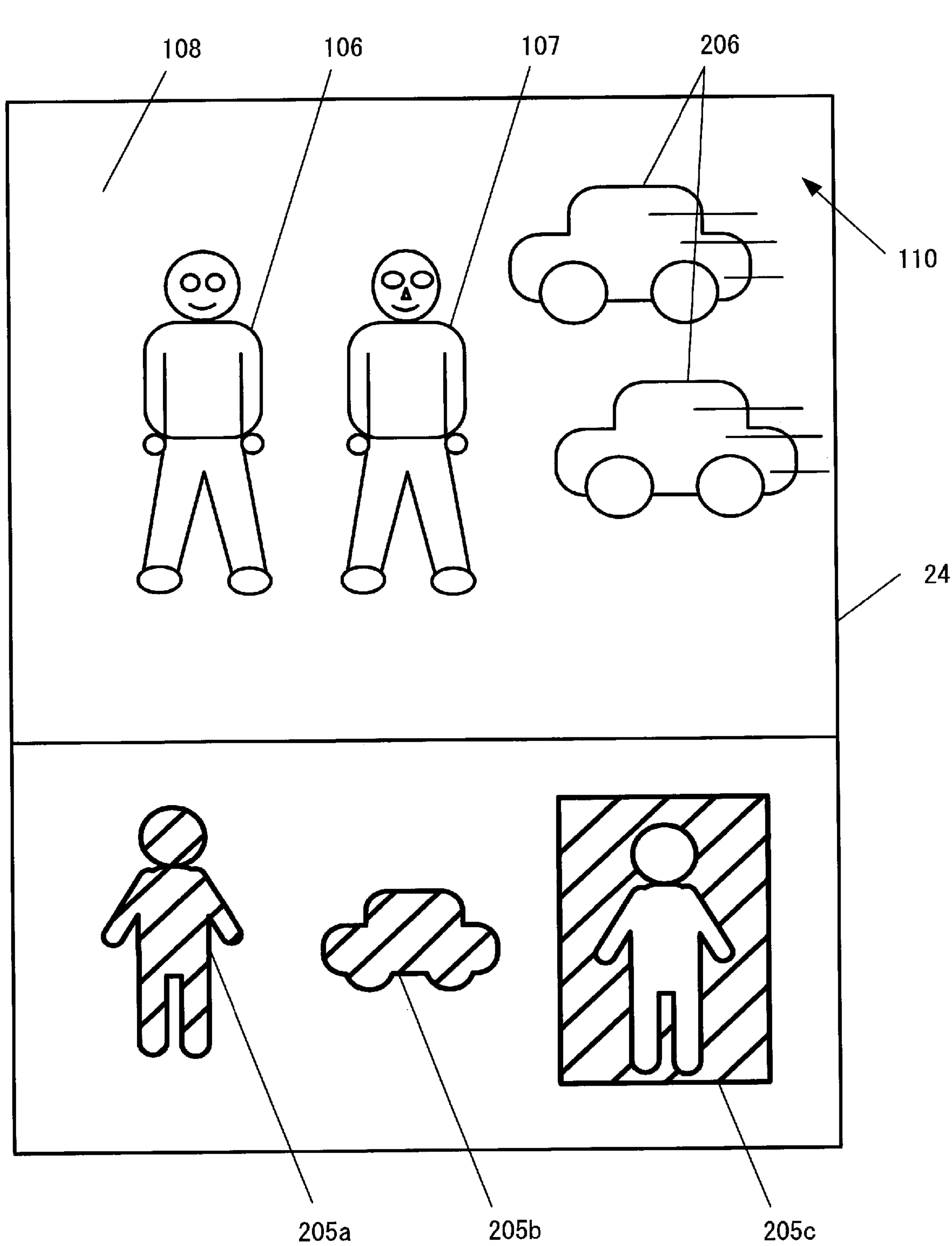
Figure 19:
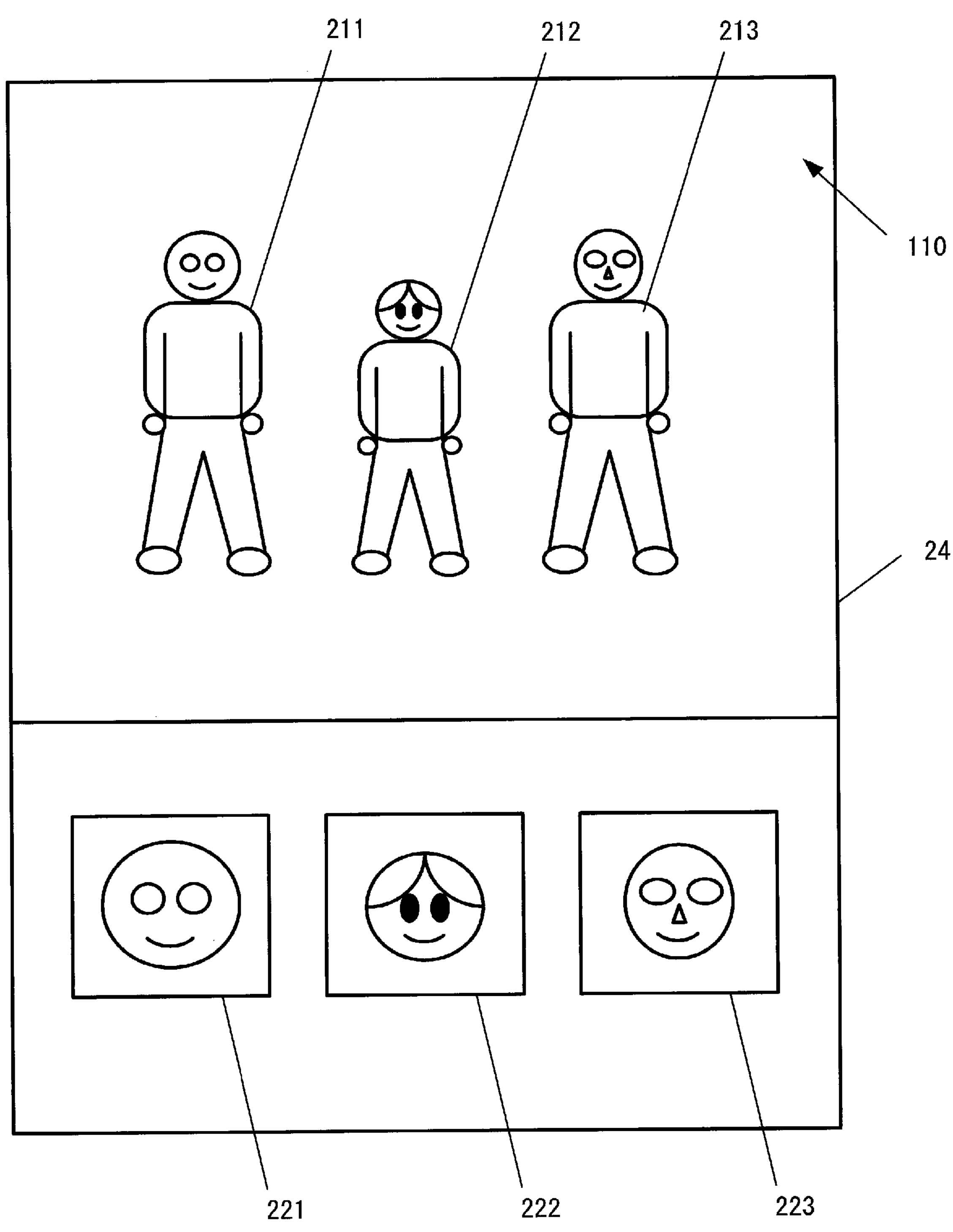
Figure 20:
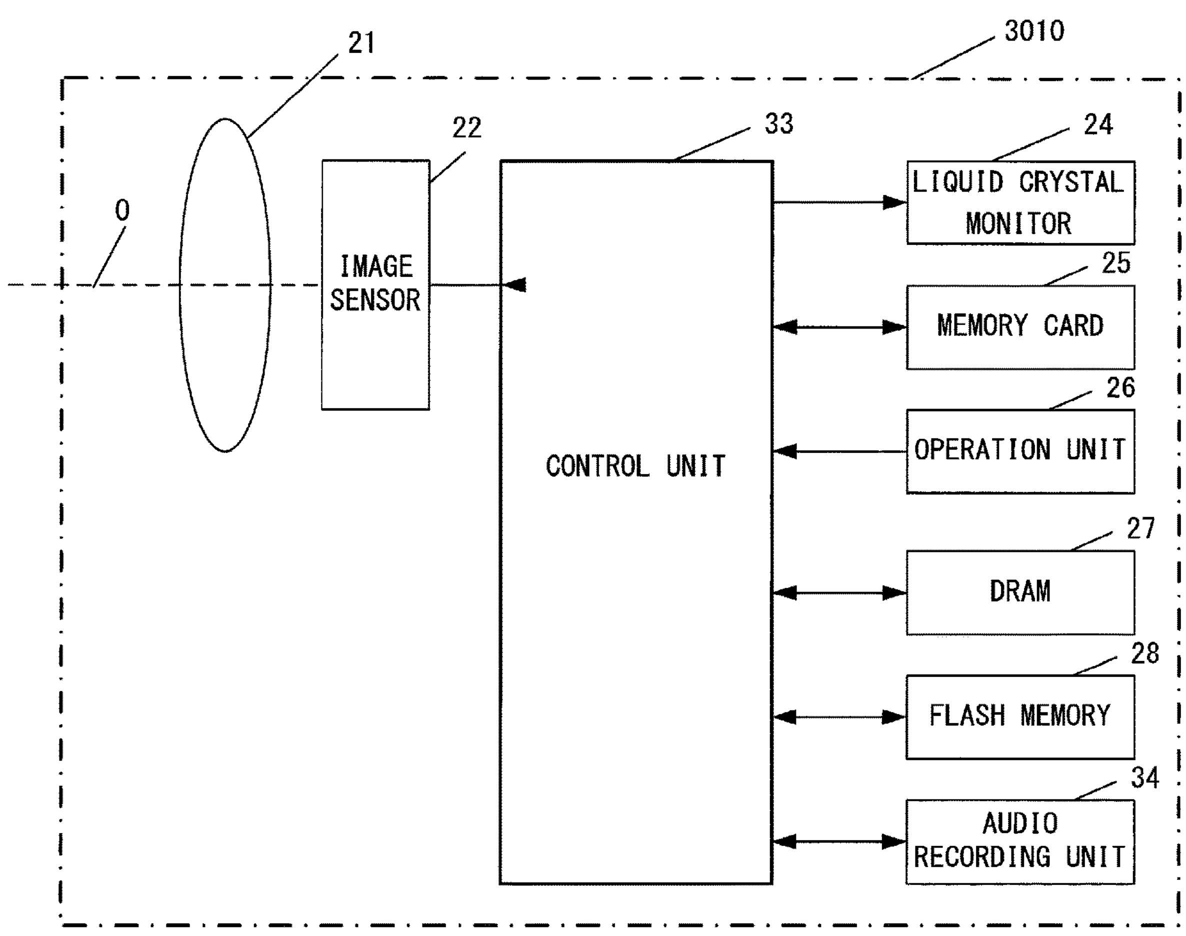
Figure 21:
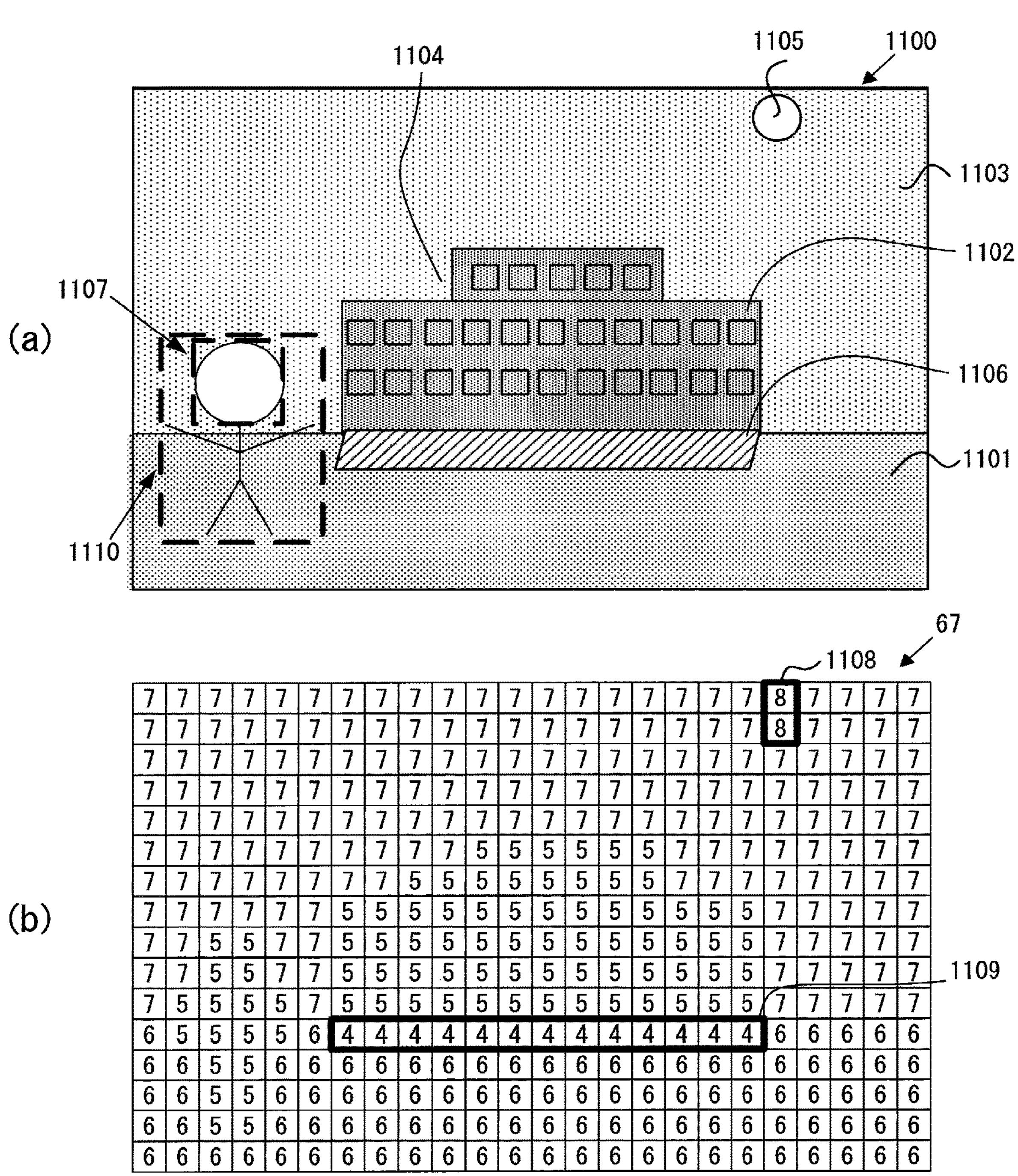
Figure 22:
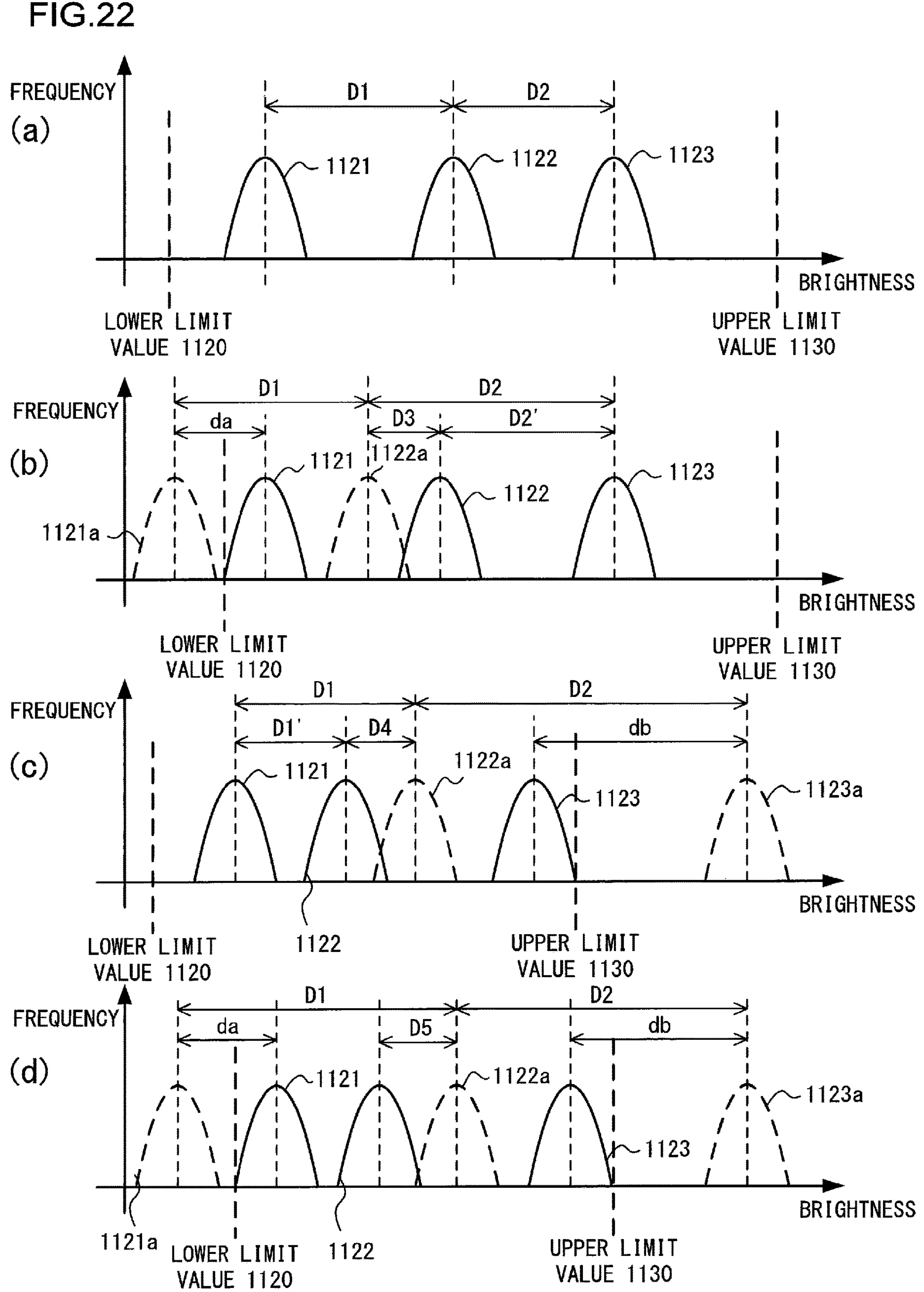
Figure 23:
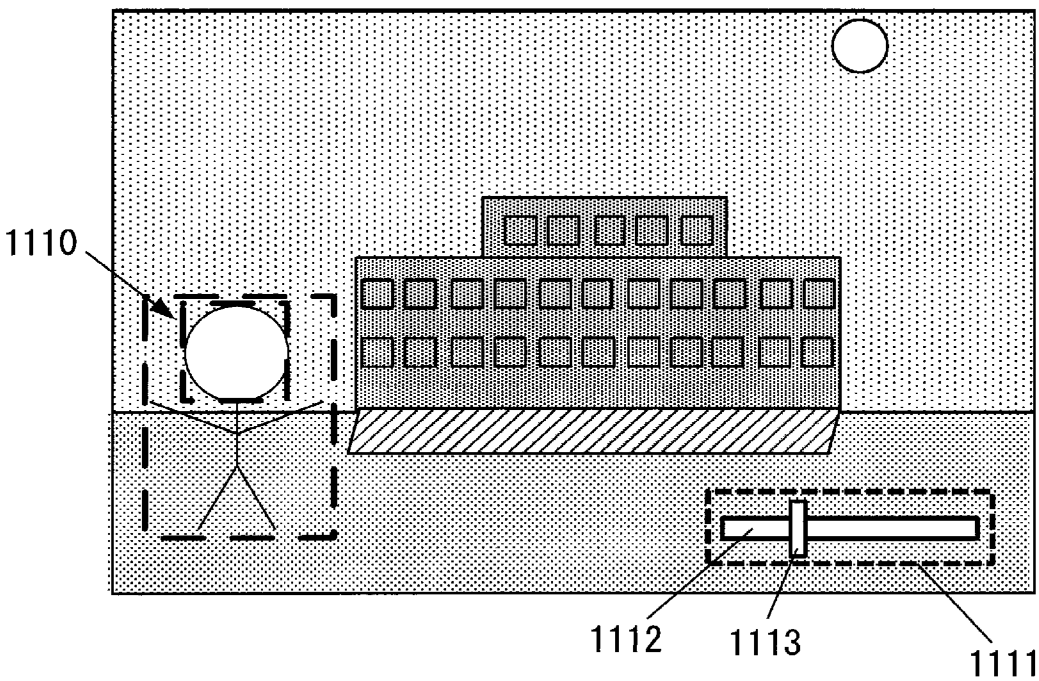

FIG. 7 A flowchart of processing executed to capture a subject image by setting image-capturing conditions individually for a primary subject FIG. 8 A block diagram showing the structure of the information terminal device achieved in a second embodiment FIG. 9 (*a*) A schematic illustration of the user's finger touching a person in a subject image on display at the liquid crystal monitor (b) An example of a display mode that provides an instructive display of the subject image with a primary subject area superimposed thereupon, together with an enlarged image display FIG. 10 (*a*) A schematic illustration of the user using two fingers to touch a person in a subject image on display at the liquid crystal monitor (b) An illustration showing how a frame displayed at the liquid crystal monitor may be manipulated (c) An illustration showing how a frame displayed at the liquid crystal monitor may be manipulated (d) An illustration showing how a frame displayed at the liquid crystal monitor may be manipulated (e) An illustration showing how a frame displayed at the liquid crystal monitor may be manipulated FIG. 11 (*a*) An illustration showing how a line running along the locus of a finger trace may be displayed at the liquid crystal monitor (b) An illustration showing how a line running along the locus of a finger trace may be displayed at the liquid crystal monitor FIG. 12 A block diagram of a variation FIG. 13 Illustrations pertaining to a variation FIG. 14 Illustrations pertaining to a variation FIG. 15 Illustrations pertaining to a variation FIG. 16 An illustration pertaining to a variation FIG. 17 An illustration pertaining to a variation FIG. 18 An illustration pertaining to a variation FIG. 19 An illustration pertaining to a variation FIG. 20 A block diagram showing the structure of the image-capturing device achieved in a fourth embodiment of the present invention FIG. 21 Diagrams providing schematic presentations of a subject and subject brightness distribution FIG. 22 (*a*) Histograms of brightness values each measured for a specific unit group in an image having no clipped black or clipped white areas (b) Histograms of brightness values each measured for a specific unit group in an image having clipped black but no clipped white areas (c) Histograms of brightness values each measured for a specific unit group in an image having clipped white but no clipped black areas (d) Histograms of brightness values each measured for a specific unit group in an image having clipped black and clipped white areas FIG. 23 An illustration of variation 7

Figure 24:
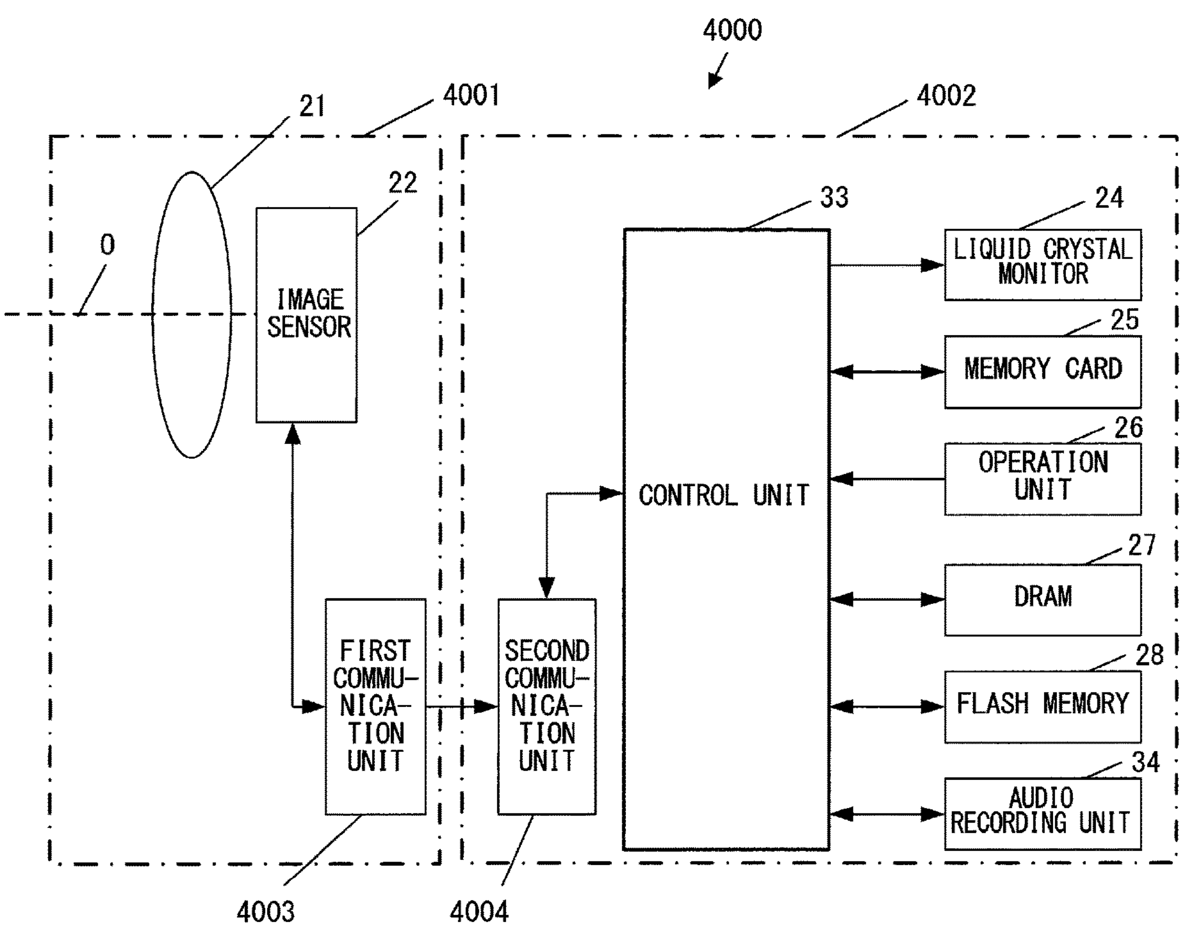

FIG. 24 A block diagram of variation 8

Figure 25:
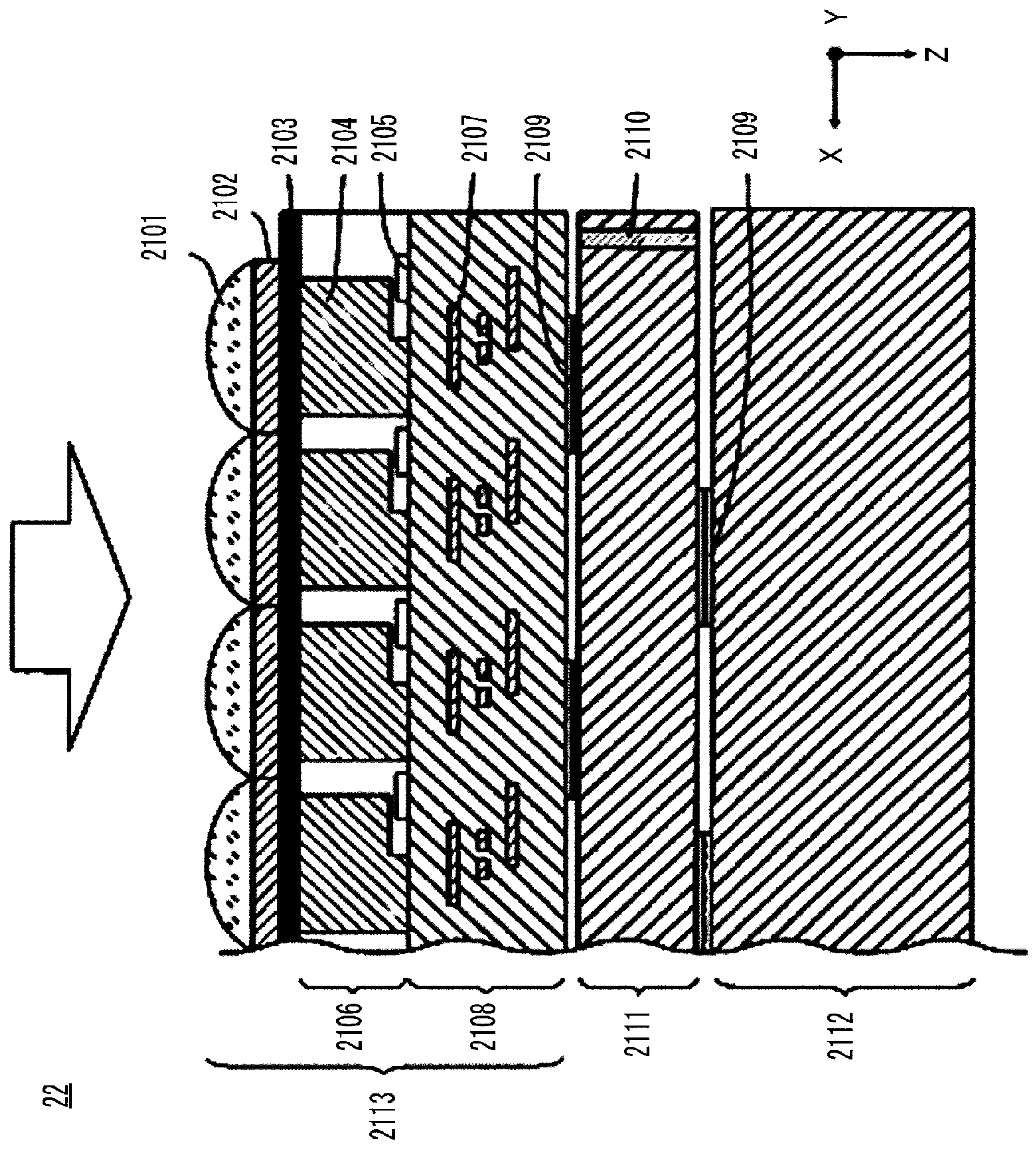

FIG. 25 A sectional view of a laminated image sensor

Figure 26:
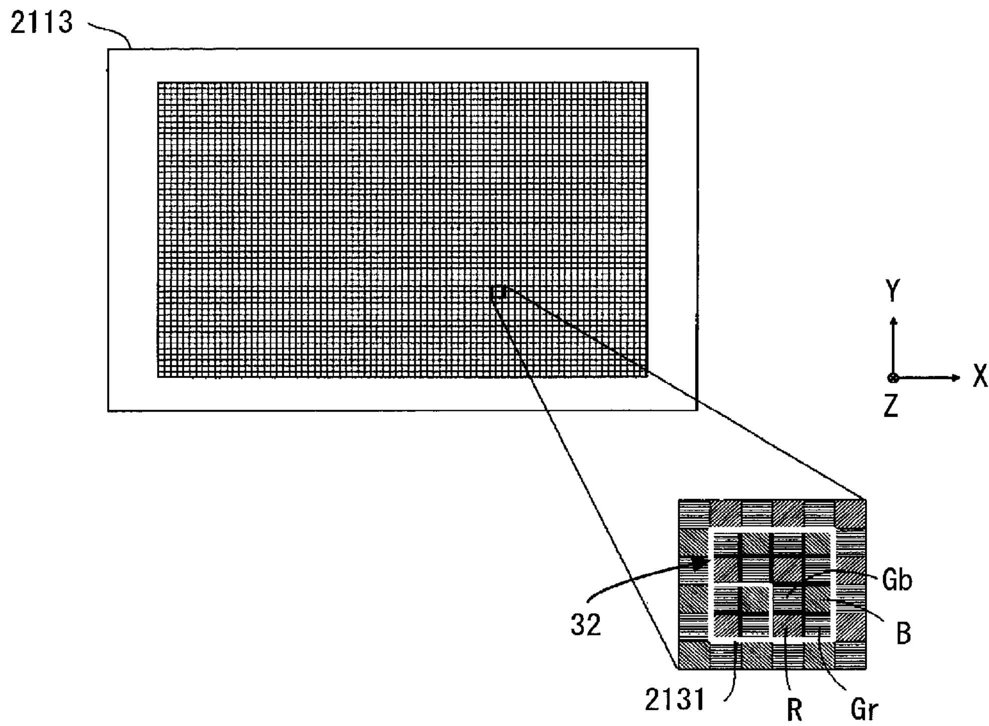
Figure 27:
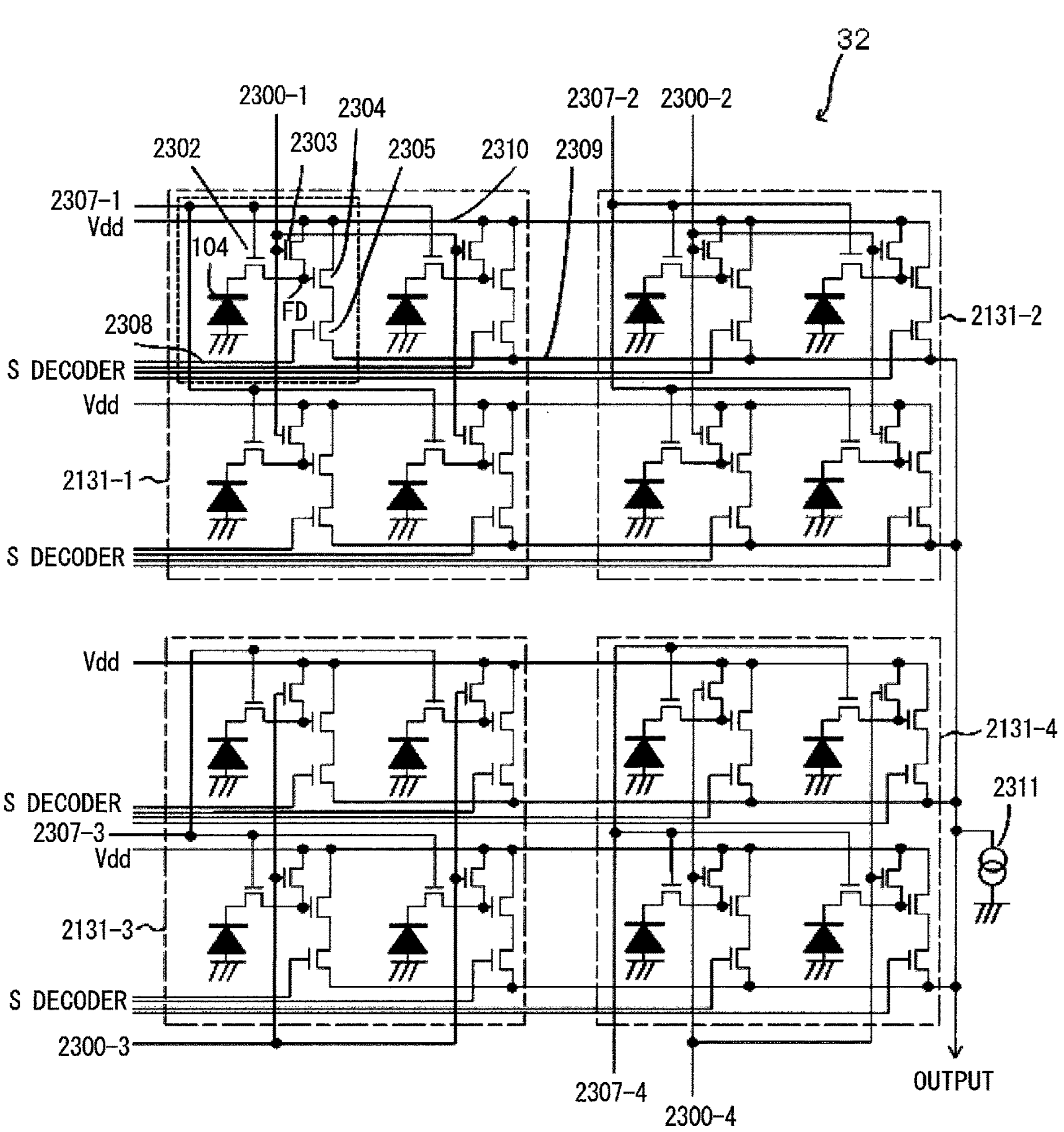
Figure 28:
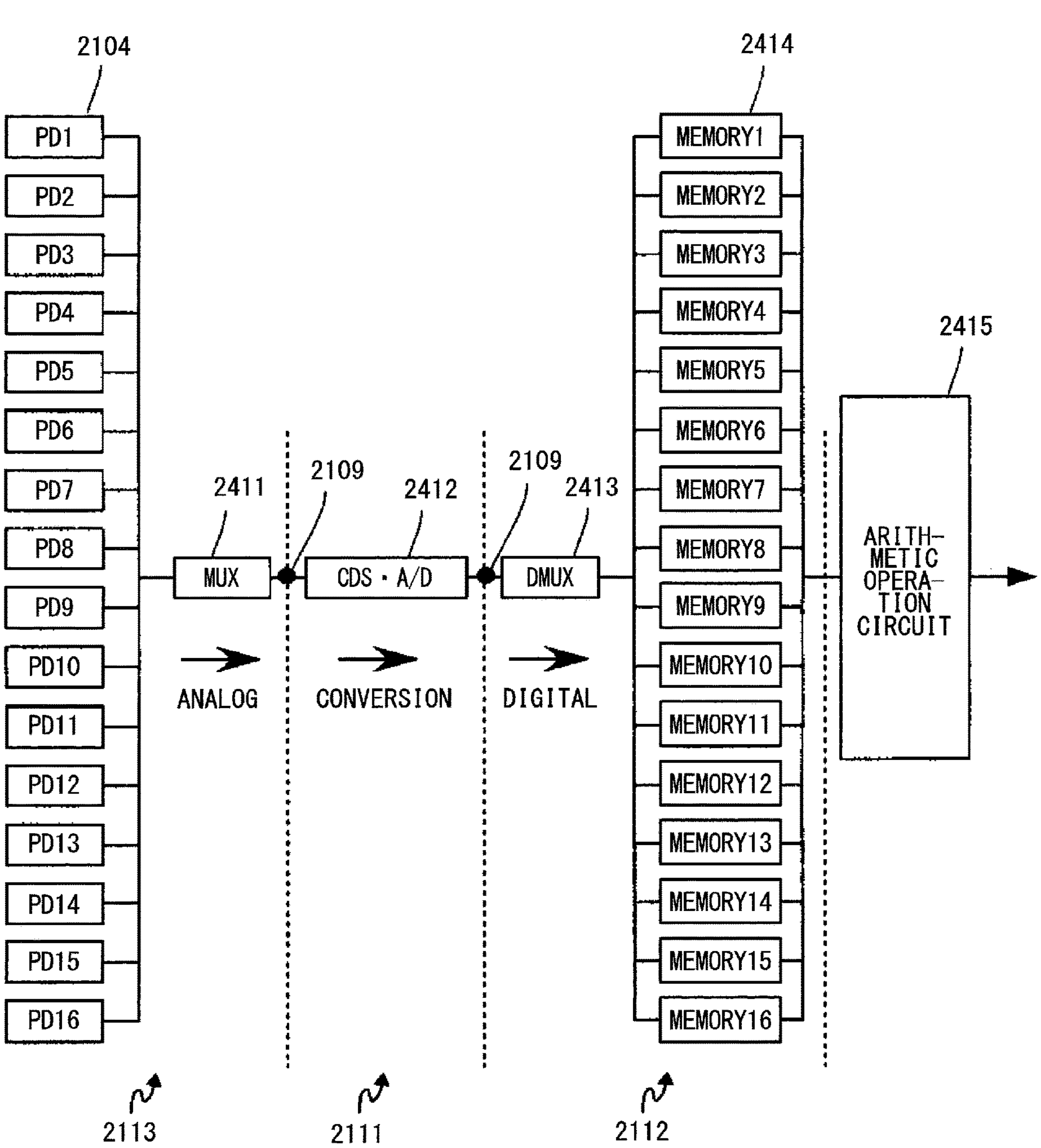

FIG. 26 An illustration of a pixel array assumed in the image-capturing chip and blocks included therein FIG. 27 A circuit diagram corresponding to a single unit in the image-capturing chip FIG. 28 A block diagram showing the functional structure assumed in the image sensor

DESCRIPTION OF EMBODIMENTS

First Embodiment

First, an image sensor 22 installed in the electronic device (e.g., an image-capturing device 10) achieved in an embodiment of the present invention will be explained. The image sensor 22 is described in Japanese Patent Application No. 2012-139026, which was previously submitted by the applicant of the present invention. FIG. 25 is a sectional view of the image sensor 22. The image sensor 22 comprises an image-capturing chip 2113 that outputs pixel signals corresponding to incident light, a signal processing chip 2111 that processes the pixel signals and a memory chip 2112 where the pixel signals are stored. The image-capturing chip 2113, the signal processing chip 2111 and the memory chip 2112 are laminated one on top of another, and are electrically connected with one another via electrically conductive bumps 2109 that may be constituted of, for instance, Cu.

It is to be noted that the incident light advances toward the positive side along a Z axis, as indicated by the unshaded arrow in the figure. In the description of the embodiment, the surface of the image-capturing chip 2113, located on the entry side where the incident light enters, will be referred to as a backside surface. In addition, in reference to the coordinate axes shown in the figure, the left side on the drawing sheet along an X axis running perpendicular to the Z axis will be referred to as an X axis positive side and the side closer to the viewer looking at the drawing further away from the drawing sheet along a Y axis running perpendicular to the Z axis and the X axis, will be referred to as a Y axis positive side. In some of the drawings to be referred to subsequently, coordinate axes are shown so as to indicate the orientations of the individual drawings in reference to the coordinate axes in FIG. 25.

A typical example of the image-capturing chip 2113 is a CMOS image sensor. In more specific terms, it may be configured with a backside illumination CMOS image sensor. A PD layer 2106 is disposed on the side where the backside surface of a wiring layer 2108 is present. The PD layer 2106 includes a plurality of photodiodes 2104 disposed in a two-dimensional pattern, where electric charges corresponding to the incident light are accumulated, and transistors 2105 each disposed in correspondence to a photodiode 2104. Namely, a plurality of photodiodes 2104 having a photoelectric conversion function for converting light to electric charges and a plurality of transistors 2105 via which signals generated with electric charges accumulated in the photodiodes 2104 are read out to the wiring layer 2108, are present in the PD layer 2106.

Color filters 2102 are disposed, via a passivation film 2103, on the incident light entry side of the PD layer 2106. The color filters 2102 are a plurality of types of filters through which light in different wavelength ranges is transmitted and are disposed in a specific arrangement in correspondence to the individual photodiodes 2104. Namely, the color filters 2102 include a plurality of types of filters assuming different spectral characteristics, and light having been transmitted through a filter is received at the corresponding photodiode 2104. The arrangement with which the color filters 2102 are disposed will be described later. Each pixel is formed with a set of; a color filter 2102, a photodiode 2104 and a transistor 2105.

Microlenses 2101 are disposed, each in correspondence to a specific pixel, on the incident light entry side of the color filters 2102. The incident light is condensed via a microlens 2101 toward the corresponding photodiode 2104.

Wirings 2107, via which the pixel signals originating in the PD layer 2106 are transmitted to the signal processing chip 2111, are disposed in the wiring layer 2108. The wirings 2107 may be disposed in a multilayer pattern and a passive element and an active element may be disposed there.

A plurality of bumps 2109 are disposed at the surface of the wiring layer 2108. As the plurality of bumps 2109 are positioned relative to a plurality of bumps 2109 disposed at the surface of the signal processing chip 2111 facing opposite them and the image-capturing chip 2113 and the signal processing chip 2111 are pressed against each other, the relatively positioned bumps 2109 become bonded with each other and thus become electrically connected.

Likewise, a plurality of bumps 2109 are disposed at the surfaces of the signal processing chip 2111 and the memory chip 2112 facing opposite each other. As the bumps on one side are positioned relative to those on the other side and the signal processing chip 2111 and the memory chip 2112 are pressed against each other, the relatively positioned bumps 2109 become bonded with each other and thus become electrically connected.

It is to be noted that a method that may be adopted to bond the bumps 2109 is not limited to Cu bump bonding achieved through solid-phase diffusion and they may be bonded through micro-bump bonding via molten solder. In addition, the bumps 2109 are required at a rate of, for instance, one bump for each of the blocks, which are to be explained later. Accordingly, the size of the bumps 2109 may be greater than the pitch at which the photodiodes 2104 are disposed.

Furthermore, bumps larger than the bumps 2109 corresponding to the pixel area may be disposed in a peripheral area outside the pixel area where the pixels are arrayed.

The signal processing chip 2111 includes a TSV (through-silicon via) 2110 that connects circuits disposed on the front surface and on the back surface thereof. It is desirable that the TSV 2110 be disposed in a peripheral area. In addition, TSVs 2110 may also be disposed in the peripheral area of the image-capturing chip 2113 and in the memory chip 2112.

FIG. 26 illustrates the pixel arrangement assumed in the image-capturing chip 2113. More specifically, it provides a view of the image-capturing chip 2113 taken from the back side. As many as 8 million or more pixels are disposed in a matrix pattern in the pixel area. In the embodiment, four pixels (2×2 pixels) disposed adjacent to one another, for instance, form a single block 2131. Four pixel blocks (2×2 blocks) adjacent to one another form a single unit group 32. The grid lines in the figure conceptually illustrate how pixels adjacent to each other form blocks 2131 and unit groups 32. The quantity of pixels that form a block 2131 and the quantity of blocks 2131 that form a unit group 32 are not limited to those described above, and blocks 2131 may each be formed with fewer or more pixels and unit groups 32 may each be formed with fewer or more blocks 2131.

As shown in the enlarged view of a portion of the pixel area, a block 2131 includes four sets of Bayer arrayed pixels, disposed at a top left position, a top right position, a bottom left position and a bottom right position and each set made up with four pixels; green pixels Gb and Gr, a blue pixel B and a red pixel R. The green pixels each include a green color filter as the color filter 2102 thereof, and receive light in the green-color wavelength band in the incident light. Likewise, the blue pixel includes a blue color filter as the color filter 2102 thereof and receives light in the blue-color wavelength band, whereas the red pixel includes a red color filter as the color filter 2102 thereof and receives light in the red-color wavelength band.

The plurality of blocks 2131 in the embodiment are defined so that they each include at least one set of pixels made up with four pixels, a Gb pixel, a Gr pixel, a B pixel and an R pixel. The blocks 2131 can be individually controlled with control parameters defining four pixels within a given block 2131 in correspondence to the particular block 2131. In other words, image-capturing signals from the pixel group included in a given block 2131 and image-capturing signals from the pixel group included in another block 2131 can be obtained by setting different image-capturing conditions for these blocks 2131. Namely, an image-capturing operation can be executed with the image-capturing conditions for the pixel group included in a given block 2131 set differently from the image-capturing conditions for the pixel group included in another block 2131. Examples of such control parameters include a frame rate, a gain, a culling rate, an addition row quantity, or an addition column quantity representing the number of rows or columns the pixel signals from which are to be added together, an electric charge accumulation time duration, a number of times electric charges to be cumulatively stored and a number of bits for digitization. Furthermore, a parameter for image processing, executed after image signals originating from the pixels are obtained, may be used as a control parameter. In other words, an image-capturing operation can be executed with the frame rate, the gain, the culling rate, the addition row quantity or the addition column quantity representing the number of rows or columns the pixel signals originating from which are to be added together, the electric charge accumulation time duration, the number of times electric charges to be cumulatively stored and the number of bits for digitization set differently from the settings for the frame rate, the gain, the culling rate, the addition row quantity or the addition column quantity for pixel signal addition, the electric charge accumulation time duration, the number of times electric charges to be cumulatively stored and the number of bits for digitization, selected for the pixel group included in another block 2131.

FIG. 27 presents a circuit diagram corresponding to a single unit group 32 in the image-capturing chip 2113. A circuit corresponding to a single pixel is enclosed within a dotted-line rectangle in FIG. 27. In addition, each one-point chain line rectangular frame corresponds to a single block 2131. It is to be noted that at least some of the various transistors to be described below correspond to the transistors 2105 In FIG. 25.

As described earlier, a unit group 32 is made up with four blocks 2131. Pixel reset transistors 2303 included in the unit group 32 are turned on/off in units of the individual blocks 2131. In addition, pixel transfer transistors 2302 included in the unit group 32 are turned on/off in units of the individual blocks 2131. The example presented in FIG. 27 includes a reset wiring 2300-1 for turning on/off the four reset transistors 2303 corresponding to an upper left block 2131-1 and a TX wiring 2307-1 for supplying transfer pulses to the four transfer transistors 2302 corresponding to the same block 2131-1.

Likewise, a reset wiring 2300-3 for turning on/off the four reset transistors 2303 corresponding to a lower left block 2131-3, separate from the reset wiring 2300-1, is installed. In addition, a TX wiring 2307-3 for supplying transfer pulses to the four transfer transistors 2302 corresponding to the block 2131-3 is installed as a wiring separate from the TX wiring 2307-1.

A reset wiring 2300-2 and a TX wiring 2307-2 are installed for an upper right block 2131-2, and a reset wiring 2300-4 and a TX wiring 2307-4 are installed for a lower right block 2131-4 in a similar manner.

The sixteen photodiodes 2104, each corresponding to a pixel are connected to the corresponding transfer transistors 2302. A transfer pulse is supplied to the gate of each transfer transistor 2302 via the TX wiring for the particular block 2131. The drain of each transfer transistor 2302 is connected to the source of the corresponding reset transistor 2303, and a floating diffusion FD between the drain of the transfer transistor 2302 and the source of the reset transistor 2303 is connected to the gate of a corresponding amplifier transistor 2304.

The drains of the reset transistors 2303 are connected to a common Vdd wiring 2310 to which a source voltage is provided. A reset pulse is supplied to the gates of the reset transistors 2303 via the reset wiring installed for the particular block 2131.

The drains of the amplifier transistors 2304 are connected to the common Vdd wiring 2310 to which the source voltage is provided. In addition, the source of each amplifier transistor 2304 is connected to the drain of a corresponding selector transistor 2305. The gate of each selector transistor 2305 is connected to a decoder wiring 2308 to which a selection pulse is supplied. In the embodiment, the decoder wirings 2308 are installed independently, each in correspondence to one of the sixteen selector transistors 2305. The sources of the various selector transistors 2305 are connected to a common output wiring 2309. A load current source 2311 provides an electrical current to the output wiring 2309. Namely, the output wiring 2309 for the selector transistors 2305 is formed with a source follower. It is to be noted that the load current source 2311 may be disposed on the side where the image-capturing chip 2113 is present or it may be disposed on the side where the signal processing chip 2111 is present. In addition, if the unit group 32 includes only a single pixel, the circuit does not need to include any selector transistor 2305.

The operational flow from an electric charge accumulation start through a pixel output following an accumulation end will be explained next. As a reset pulse is applied to the reset transistors 2303 through the reset wiring installed in correspondence to each block 2131 and a transfer pulse is concurrently applied to the transfer transistors 2302 via the TX wiring installed in correspondence to each block 2131, the potentials at the photodiodes 2104 and the floating diffusions FD are reset in units of the individual blocks 2131.

As the transfer pulse application is cleared, the light received at each photodiode 2104 is converted to an electric charge and is stored in the photodiode 2104. Subsequently, as a transfer pulse is applied again while no reset pulse is being applied, the electric charge accumulated in the photodiode 2104 is transferred to the corresponding floating diffusion FD. The potential at the floating diffusion FD, which has been at the reset potential thus far, shifts to a signal potential resulting from the charge accumulation. Namely, the floating diffusion FD assumes a potential corresponding to the electric charge accumulated in the photodiode 2104. Then, as a selection pulse is applied to the selector transistor via the decoder wiring 2308, the change in the signal potential at the floating diffusion FD is transmitted to the output wiring 2309 via the corresponding amplifier transistor 2304 and selector transistor 2305. In other words, as a selection pulse is applied to the selector transistor 2305 through the decoder wiring 2308, a signal generated with the potential at the floating diffusion FD is transmitted to the output wiring 2309. Through this process, a pixel signal corresponding to the reset potential and the signal potential is output from the unit pixel to the output wiring 2309.

As explained above, a common reset wiring and a common TX wiring are installed in correspondence to the four pixels forming each block 2131 in the embodiment. This means that a reset pulse and a transfer pulse are each applied simultaneously to the four pixels in the particular block 2131. Accordingly, all the pixels forming a given block 2131 start charge accumulation with matching timing and end the charge accumulation with matching timing. However, pixel signals corresponding to the accumulated electric charges are selectively output through the output wiring 2309 as selection pulses are sequentially applied to the individual selector transistors 2305.

Thus, the charge accumulation start timing can be controlled in correspondence to each block 2131 in the embodiment. In other words, the image-capturing timing can be varied among the different blocks 2131.

FIG. 28 is a block diagram showing the functional structure of the image sensor 22. An analog multiplexer 2411 sequentially selects the sixteen photodiodes 2104 forming a unit group 32 so as to allow the respective pixel signals to be output to the output wiring 2309 installed in correspondence to the particular unit group 32. The multiplexer 2411 is formed together with the photodiodes 2104 in the image-capturing chip 2113.

The pixel signals output via the multiplexer 2411 undergo correlated double-sampling (CDS) and analog digital (A/D) conversion at a signal processing circuit 2412 which is formed in the signal processing chip 2111 and is engaged in (CDS) and (A/D) conversion. The pixel signals having undergone the A/D conversion are transferred to a demultiplexer 2413 and are stored into pixel memories 2414, each corresponding to one of the pixels. The demultiplexer 2413 and the pixel memories 2414 are formed in the memory chip 2112.

An arithmetic operation circuit 2415 processes the pixel signals stored in the pixel memories 2414 and then transfers the processed pixel signals to an image processing unit disposed at a stage further rearward. The arithmetic operation circuit 2415 may be disposed in the signal processing chip 2111 or it may be disposed in the memory chip 2112. It is to be noted that while FIG. 28 illustrates the connections achieved for a single unit group 32, these components are disposed in correspondence to each unit group 32 and are engaged in operation concurrently. It is to be noted, however, that the arithmetic operation circuit 2415 does not need to be installed in correspondence to each unit group 32, and instead, a single arithmetic operation circuit 2415 may be engaged in sequential processing by sequentially referencing the values indicated in the pixel memories 2414 corresponding to the individual unit groups 32.

As explained earlier, the output wiring 2309 is installed in correspondence to each unit group 32. Since the image sensor 22 is formed by laminating the image-capturing chip 2113, the signal processing chip 2111 and the memory chip 2112 one on top of another, the output wirings 2309 may be laid out through electrical connection between the chips via the bumps 2109 without necessitating the individual chips to take up significant areas along the planar direction.

Figure 1:
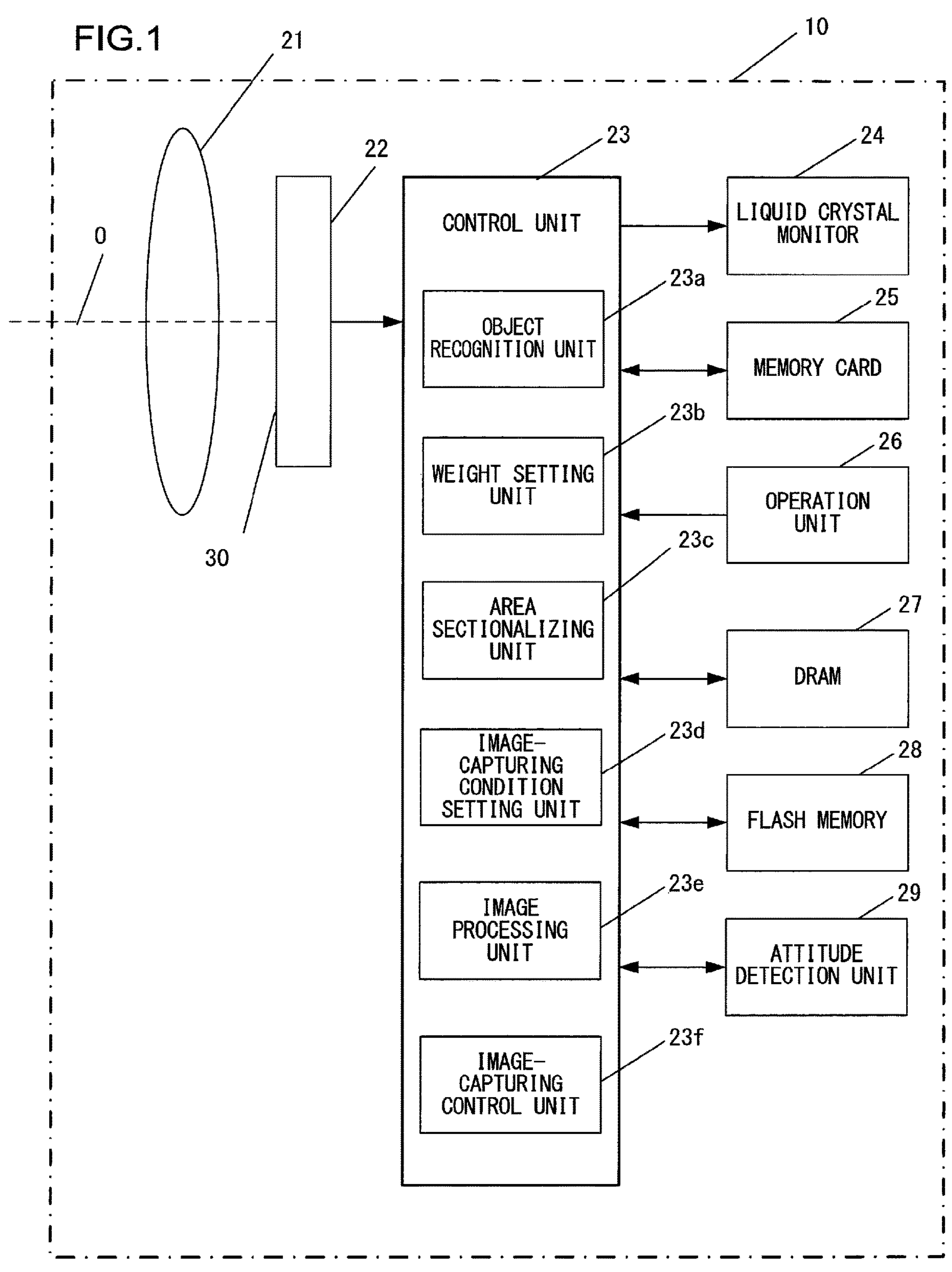
FIG. 1 A block diagram showing the structure of the electronic device achieved in a first embodiment FIG. 2 (*a*) A schematic plan view of the image-capturing surface of the image sensor (b) An enlarged plan view of a section of the image-capturing surface FIG. 3 (*a*) A schematic illustration of a subject image brought up on display at the liquid crystal monitor of the information terminal device judged to be in a vertical orientation (b) An example of a display mode that provides an instructive display of a subject image with primary subject areas superimposed thereupon together with partial images (c) An example of a display mode that provides an enlarged display of a primary subject corresponding to a partial image in (a)

FIG. 1 is a block diagram showing the structure of the electronic device achieved in the first embodiment of the present invention. The embodiment will be described in reference to an example in which the electronic device is achieved as an information terminal device 10 with an image-capturing function. The information terminal device 10 is a low-profile device such as a tablet-type information terminal device with a large liquid crystal monitor disposed at the front surface thereof and an image-capturing optical system disposed on its back side surface. The information terminal device 10 includes an image-capturing optical system 21, an image sensor 22, a control unit 23, a liquid crystal monitor 24, a memory card 25, an operation unit 26, a DRAM 27, a flash memory 28 and an attitude detection unit 29. It is to be noted that the following explanation will focus on functions and structural elements related to image-capturing operations, among the various functions and structural elements of the information terminal device 10, and will not include a description pertaining to other functions or structural elements.

The image-capturing optical system 21, configured with a plurality of lenses, forms a subject image on the image-capturing surface of the image sensor 22. It is to be noted that the image-capturing optical system 21 is shown as a single lens in FIG. 1.

The image-capturing unit, i.e., the image sensor 22, captures the subject image formed via the image-capturing optical system 21 and outputs image-capturing signals. The image sensor 22 has an image-capturing surface 30 where a plurality of image-capturing pixels are arrayed. The control unit 23 is an electronic circuit that controls the various units of the information terminal device 10 and is constituted with a CPU and its peripheral circuits. In the flash memory 28, which is a non-volatile recording medium, a specific control program is written in advance. The control unit 23 controls the various units by executing the control program read out from the flash memory 28. The control program uses the DRAM 27, which is a volatile recording medium, as its work area.

The liquid crystal monitor 24, which functions as a display unit, is a display device that includes a liquid crystal panel. The control unit 23 engages the image sensor 22 so as to capture a subject image repeatedly over predetermined cycles (e.g., every 1/60 sec). It then creates a subject image by executing various types of image processing on image-capturing signals output from the image sensor 22 and displays the subject image at the liquid crystal monitor 24. In addition to the subject image mentioned above, captured image data, a setting screen in which image-capturing conditions are set and the like are displayed, as will be explained later, at the liquid crystal monitor 24. A display device that includes an organic EL panel may be used in place of the liquid crystal monitor 24.

The attitude detection unit 29, which may be constituted with, for instance, an acceleration sensor, detects the attitude of the information terminal device 10. Based upon a signal output from the attitude detection unit 29, the control unit 23 judges whether the information terminal device 10 is currently in a vertical orientation for capturing an image with a portrait orientation (a vertically long image) or in a horizontal orientation for capturing an image with a landscape orientation (a horizontally long image).

The control unit 23 generates captured image data by executing various types of image processing on the image-capturing signals output from the image sensor 22 and has the image data recorded into the memory card 25, which is a portable recording medium. The operation unit 26 includes various operation members such as push-buttons, and outputs an operation signal to the control unit 23 in response to an operation performed at an operation member. It is to be noted that the liquid crystal monitor 24, which is a touch panel display device, constitutes part of the operation unit 26. The control unit 23 executes display control so as to display the subject image, captured via the image sensor 22, at the liquid crystal monitor 24.

The control unit 23 includes an object recognition unit 23*a*, a weight setting unit 23*b*, an area sectionalizing unit, i.e., an area demarcating unit 23*c*, an image-capturing condition setting unit 23*d*, an image processing unit 23*e* and an image-capturing control unit 23*f*, achieved in the form of software. Namely, these units are achieved in software as the control unit 23 executes the specific control program stored in the flash memory 28. It is to be noted that these units may instead be configured in the form of electronic circuits.

The object recognition unit 23*a* recognizes or detects, through a method of the known art such as template matching processing, specific types of photographic subject elements such as people, human faces, animals e.g., a dog or a cat, vehicles e.g., a bicycle, an automobile or a train, food served on a plate, toys, and other photographic subject objects, in a subject image captured via the image sensor 22.

The weight setting unit 23*b* sets weights for the photographic subject objects having been recognized by the object recognition unit 23*a*. More specifically, the weight setting unit 23*b* sets weights individually for the photographic subject objects such as a person, a person's face, an animal, a vehicle, food, a toy or the like having been recognized by the object recognition unit 23*a*. For instance, the weight setting unit 23*b* may apply the greatest weight to a person and his/her face, apply the second greatest weight to an animal, apply the third-greatest weight to a vehicle and apply a small weight to food, a toy, or the like. By applying predetermined specific weights to the photographic subject objects having been recognized by the object recognition unit 23*a* as described above, the weight setting unit 23*b* ranks the photographic subject objects.

The area sectionalizing unit 23*c* makes a decision as to whether or not the quantity of photographic subject objects, having been recognized by the object recognition unit 23*a* and weighted with predetermined values by the weight a setting unit 23*b*, exceeds a predetermined specific value. If the quantity of photographic subject objects is equal to or smaller than the predetermined value, all the photographic subject objects having been recognized by the object recognition unit 23*a* are designated as primary subjects, whereas if the quantity of photographic subject objects exceeds the predetermined value, a predetermined number of highest-ranking photographic subject objects are selected and designated as primary subjects. It is to be noted that the predetermined value may be set in advance by the user via the operation unit 26.

The area sectionalizing unit 23*c* further determines the specific position within the subject image taken by each primary subject having been designated as described above, i.e., determines a specific area in which the primary subject is present, and sectionalizes (demarcates) the area taken up by the primary subject within the subject image as an areal portion (an partial area). As will be explained later, each primary subject area, having been demarcated by the area sectionalizing unit 23*c*, and more specifically, an outline of the primary subject or a frame representing the outline, is superimposed on the subject image on display at the liquid crystal monitor 24. It is to be noted that the demarcation of a primary subject area on the subject image by the area sectionalizing unit 23*c* is equivalent to specifying, i.e., demarcating, the image-capturing area where the primary subject has been captured on the image-capturing surface of the image sensor 22.

The image-capturing condition setting unit 23*d* sets image-capturing conditions at the image sensor 22 and sets image processing conditions for a specific primary subject, as will be described in detail later. The image processing unit 23*e* executes a plurality of types of image processing on the subject image. The image-capturing control unit 23*f* individually controls a plurality of image-capturing areas at the image sensor 22, each containing at least one image-capturing pixel, independently of one another. Namely, the image-capturing control unit 23*f* controls the image-capturing conditions such as the exposure time, the gain and the frame rate in correspondence to each unit group 32 at the image sensor 22, as has been explained earlier. It is to be noted that the function of the image-capturing control unit 23*f* may, instead, be fulfilled in the image sensor 22.

Figure 2:
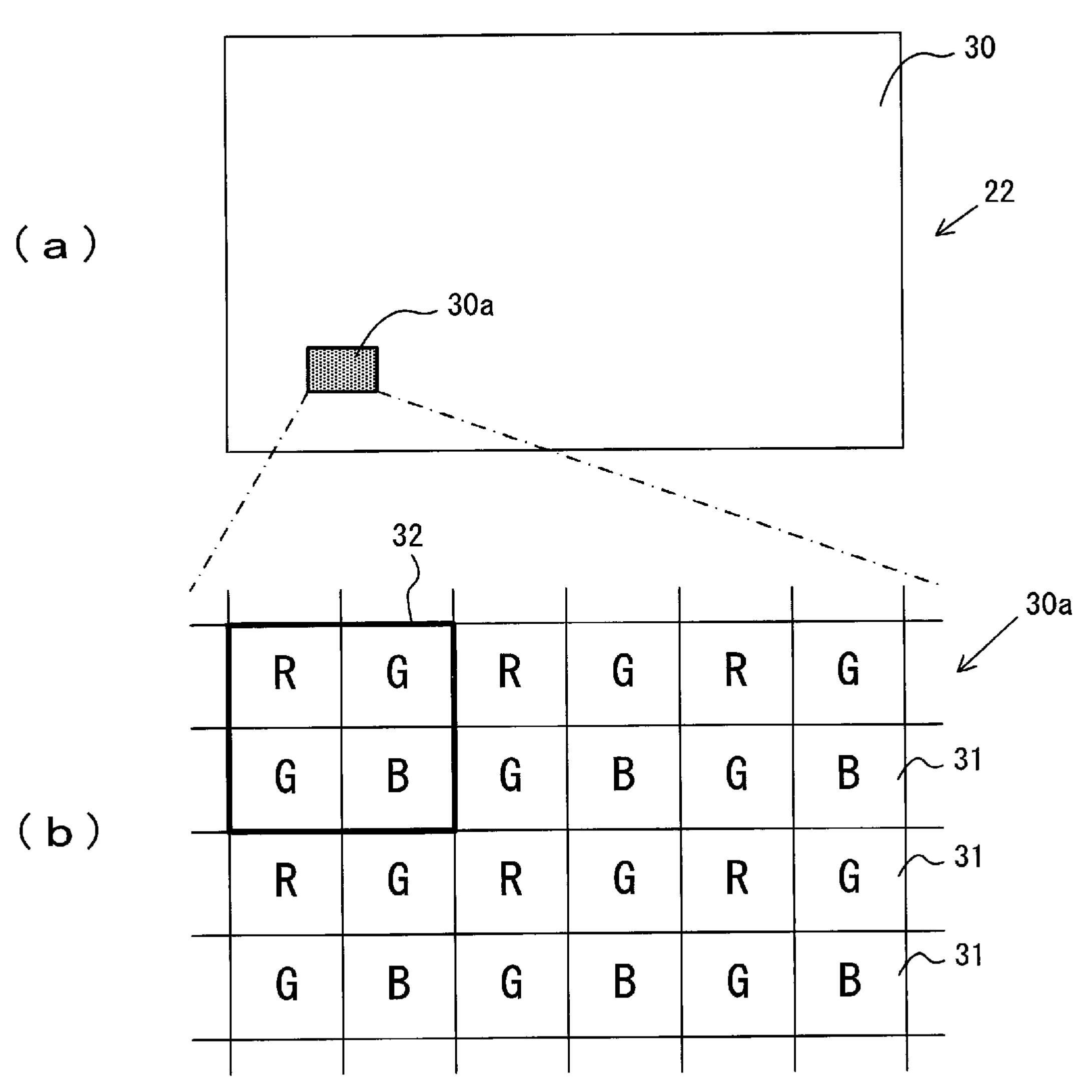

FIG. 2(*a*) is a schematic plan view of the image-capturing surface 30 of the image sensor 22 and FIG. 2(*b*) is an enlarged plan view of an areal portion 30*a* of the image-capturing surface 30. As FIG. 2(*b*) shows, numerous image-capturing pixels 31 are arrayed in a two-dimensional pattern at the image-capturing surface 30. The image-capturing pixels 31 each include a color filter (not shown). The color filters include three types of filters; red (R), green (G) and blue (B), and the letters "R", "G" and "B" in FIG. 2(*b*) each indicate a specific color filter included in an image-capturing pixel 31. As FIG. 2(*b*) indicates, the image-capturing pixels 31 that include such color filters are disposed in an array pattern referred to as a Bayer array at the image-capturing surface 30 of image sensor 22.

At an image-capturing pixel 31 having a red filter mounted thereat, part of the incident light with wavelengths within the red-color wavelength band undergoes photoelectric conversion and the image-capturing pixel 31 outputs a light reception signal (photoelectric conversion signal) resulting from the photoelectric conversion. Likewise, at an image-capturing pixel 31 having a green filter mounted thereat, part of the incident light with wavelengths within the green-color wavelength band undergoes photoelectric conversion and the image-capturing pixel 31 outputs a light reception signal resulting from the photoelectric conversion. At an image-capturing pixel 31 having a blue filter mounted thereat, part of the incident light with wavelengths within the blue-color wavelength band undergoes photoelectric conversion and the image-capturing pixel 31 outputs a light reception signal resulting from the photoelectric conversion.

The image sensor 22 in the embodiment is structured so that the unit groups 32, i.e., image-capturing areas each made up with a total of four (2×2) image-capturing pixels 31 disposed adjacent to each other, can be individually and independently controlled. For instance, when an electric charge accumulation starts simultaneously in two different unit groups 32, electric charges, i.e., the light reception signals, may be read out from one of the unit groups 32, 1/30 sec after the charge accumulation start, and electric charges may be read out in the other unit group 32, 1/15 sec after the charge accumulation start. In addition, an electric charge accumulation in one unit group 32 may start with timing different from the charge accumulation start timing in the other unit group 32. This means that the exposure time (often referred to as the shutter speed) for a given image-capturing operation may be set differently from one unit group 32 to another at the image sensor 22.

In addition to the exposure time mentioned above, the light reception signal gain (generally referred to as the ISO sensitivity) may be set differently from one unit group 32 to another at the image sensor 22. At the image sensor 22, the timing with which an electric charge accumulation starts and the timing with which light reception signals are read out can be set differently from one unit group 32 to another. In addition, the frame rate for a video shooting operation can be set differently from one unit group 32 to another at the image sensor 22. The image-capturing control unit 23*f* in the control unit 23 shown in FIG. 1 controls the image-capturing conditions such as the exposure time, the gain and the frame rate in units of individual unit groups 32.

To summarize, the image sensor 22 adopts a structure that allows the image-capturing conditions such as the exposure time, the gain and the frame rate to be set differently from one unit group 32 to another.

At the information terminal device 10 structured as described above, the image-capturing conditions for an important photographic subject object detected by the object recognition unit 23*a*, i.e., a primary subject, can be manually set separately from the image-capturing conditions for other subject portions such as the photographic subject background. The following is a detailed description of this feature.

Figure 3:
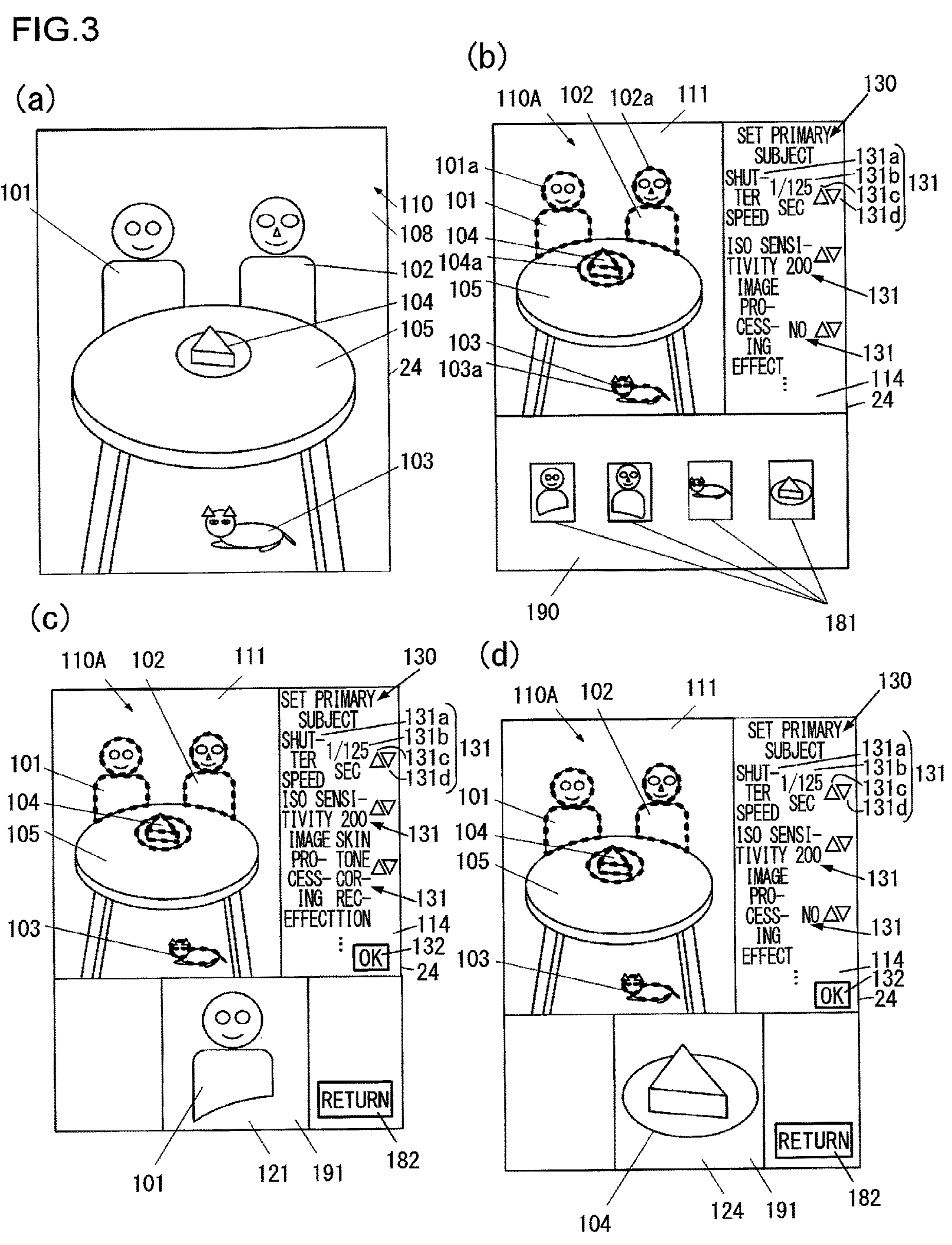

FIG. 3(*a*) provides a schematic illustration of a subject image 110 brought up on display at the liquid crystal monitor 24 at the information terminal device 10 judged by the attitude detection unit 29 to be currently in a vertical orientation. The following description will be provided by assuming that two persons 101 and 102, a small animal 103, a table 105 and a slice of cake 104 placed on a plate are present as photographic subjects within the image-capturing range of the information terminal device 10. The two persons 101 and 102 are located on the other side of the table 105, the small animal 103 is located under the table 105 and the cake 104 on the plate is located on the table 105, viewed from the side where the information terminal device 10 is situated. It is to be noted that in order to simplify the explanation, it is assumed that no photographic subject that could be extracted as another photographic subject element is present in a background portion 106 in the photographic image 110. It is also to be noted that this subject image 110 has been captured under uniform image-capturing conditions (a uniform exposure time, a uniform gain and a uniform frame rate) for the entire image-capturing surface 30, i.e., for all the unit groups 32, based upon the exposure conditions determined in correspondence to photometric values indicating the subject brightness or based upon the exposure conditions manually selected by the user.

The object recognition unit 23*a* recognizes specific photographic subject objects, i.e., the two persons 101 and 102, the small animal 103, the cake 104 on the plate and the table 105 in the subject image 110 on display at the liquid crystal monitor 24. The object recognition unit 23*a* detects photographic subjects based upon image data expressing the subject image 110, which are output from the image sensor 22. The object recognition unit 23*a* recognizes the specific photographic subject objects, i.e., the two persons 101 and 102, the small animal 103, the cake 104 on the plate and the table 105 as the results of the photographic subject detection.

When a plurality of photographic subject objects are detected by the object recognition unit 23*a*, the weight setting unit 23*b* individually weights each of the plurality of photographic subject objects detected by the object recognition unit 23*a*. In this example, the weight setting unit 23*b* applies the greatest weight to the two persons 101 and 102, applies the second greatest weight to the small animal 103, applies the third greatest weight to the cake 104 on the plate and applies the fourth greatest weight to the table 105.

The area sectionalizing unit 23*c* designates highest ranked photographic subject objects, e.g., the top four photographic subject objects, based upon the weights applied by the weight setting unit 23*b*, among the five photographic subject objects detected by the object recognition unit 23*a*, as primary subjects, and demarcates the positions taken by the four primary subjects within the subject image, i.e., the areas taken up by the four primary subjects, as primary subject areas. In the following description, specifying or demarcating primary subject areas in this manner may be also referred to as "area sectionalization".

Once the area sectionalizing unit 23*c* specifies or demarcates primary subject areas, the control unit 23 provides an instructive display by superimposing the four primary subject areas over a subject image 110A displayed in a display area 111 as shown in FIG. 3(*b*). At this time, the control unit 23 may display outlines 101*a*, 102*a*, 103*a* and 104*a* of the four primary subject areas, as indicated by the dotted lines, on the subject image 110A. Instead of indicating the outlines 101*a*, 102*a*, 103*a* and 104*a* with dotted lines as shown in the figure, the various primary subject areas may be highlighted in their entirety in contrast to the other areas or they may be highlighted in their entirety in a different color.

The control unit 23 generates partial images 181 in correspondence to the primary subjects 101 through 104 in the subject image 110A. In addition to displaying the outlines 101*a*, 102*a*, 103*a* and 104*a* of the primary subject areas on the subject image 110A, the control unit 23 sets a partial image display area 190 below the subject image 110A, and more specifically, toward the bottom of the liquid crystal monitor 24 and displays the partial images 181 corresponding to the primary subjects 101 through 104 in this partial image display area 190, as shown in FIG. 3(*b*). Namely, the control unit 23 indicates the areal portions specified by the area sectionalizing unit 23*c* with the outlines 101*a*, 102*a*, 103*a* and 104*a* of the primary subject areas and displays the partial images 181 that correspond to the primary subject areas within the subject image. In addition, the control unit 23 displays a primary subject image-capturing condition setting screen 130 in a display area 114 set at an upper right position within the display screen at the liquid crystal monitor 24. The partial images 181 are thus displayed on the lower side of the display screen where they can be, for instance, selected by the user with his/her finger with ease. The setting screen 130 is displayed on the side closer to the user's dominant hand so as to allow the user to set the image-capturing conditions and the like with better ease. While the embodiment illustrated in FIG. 3(*b*) assumes that the user's dominant hand is the right hand, the setting screen will be displayed on the left side of the display screen if the dominant hand of the user is the left hand. In addition, the control unit 23 controls display so as to ensure that the aspect ratio (of the subject image 110A (the ratio of the longitudinal measurement and the lateral measurement of the subject image 110A) remains unchanged even when the setting screen 130 and the partial image display area 190 are set within the subject image 110A. Furthermore, the control unit 23 ensures that the subject image 110A will not readily be covered by the user's finger by displaying the partial images 181 on the lower side of the display screen and thus assures better ease in viewing the subject image 110A.

Examples of settings 131 for the image-capturing conditions listed in the primary photographic subject image-capturing condition setting screen 130 are, starting from the top, "shutter speed", "ISO sensitivity" and "image processing effect". It is to be noted that the image processing effect is a setting selected for skin tone correction or for image processing through which a monochrome or sepia-tone image or the like is obtained. While the settings 131 in the setting screen 130 in this example include image-capturing condition "shutter speed" and "ISO sensitivity" and an image processing condition "image processing effect", these settings may be simply referred to as the "image-capturing conditions" in the following description. It is to be noted that "frame rate" will be also displayed as an additional image-capturing condition setting 131 in the setting screen 130 for a video shooting operation. In this setting screen, the frame rate setting for a primary subject can also be adjusted.

The settings 131 on display each include a setting title display 131*a*, a setting status display 131*b*, an up button display 131*c* and a down button display 131*d*. For instance, for the setting "shutter speed", the text "shutter speed" is displayed as the setting title display 131*a*, and the text "1/125 sec" indicating the current shutter speed setting is displayed as the setting status display 131*b*. The up button display 131*c* and the down button display 131*d* are provided to enable settings adjustment. As the user touches the up button display 131*c* or the down button display 131*d* the setting status is altered in sequence. In addition, an OK button 132 for confirming a selected image-capturing condition setting is displayed at a lower right position within the display area 114. Similar displays are provided for "ISO sensitivity" as well. It is to be noted that until the user selects a primary subject area and the image-capturing conditions for the particular primary subject area are changed, as will be explained later, uniform settings for the "shutter speed" and the "ISO sensitivity" are sustained for all the unit groups 32, i.e., for the entire image-capturing surface 30.

As the user selects one of the partial images 181, the control unit 23 brings up on display an enlarged image of the primary subject corresponding to the selected partial image 181 on the lower side of the liquid crystal monitor 24, as illustrated in FIG. 3(*c*). Namely, the control unit 23 displays an enlargement of the partial image corresponding to the primary subject area contained in the subject image. The control unit 23 displays the image in the partial image display area 190 in the size greater than that of the image of the particular primary subject in the subject image 110A on display in the display area 111. FIG. 3(*c*) illustrates an enlarged image 121 of the person 101 displayed in the partial image display area 190 following selection of the partial image 181 of the person 101 in FIG. 3(*b*). FIG. 3(*d*) illustrates an enlarged image 124 of the cake 104 displayed in the partial image display area 190 following selection of the partial image 181 of the cake 104 in FIG. 3(*b*). Namely, selection of the cake 104 is clearly indicated by displaying an image of the cake 104 in the partial image display area 190 in a size greater than that of the image of the particular primary subject within the subject image 110A on display in the display area 111. The display of an enlarged image of a primary subject at the liquid crystal monitor 24, provided as described above, assures a good view of the primary subject even when the primary subject takes up a small area in the subject image 110A on display and thus allows the user to select a desired setting with ease.

Together with the enlarged image on display in the partial image display area 190, the control unit 23 also displays a return button 182 at a lower right position at the liquid crystal monitor 24. In response to a user operation at the return button 182, the control unit 23 resets the display mode for the partial image display area 190 to that shown in FIG. 3(*b*).

While the enlarged image of the primary subject 101 is on display in the partial image display area 190 as shown in FIG. 3(*c*), the user sets the image-capturing conditions such as the shutter speed by touching the up button display 131*c* or the down button display 131*d* for each of the setting titles 131*a* in the primary subject setting screen 130.

In the example presented In FIG. 3(*c*), the shutter speed setting is adjusted from 1/125 sec to 1/250 sec since the person 101 may shift during the image-capturing operation and a skin tone correction mode is selected for the image processing effect so that that person 101 will be photographed with a lighter skin tone.

As the OK button 132 at the lower right position in the display area 114 is touched, the image-capturing condition setting unit 23*d* sets the image-capturing conditions currently displayed in the display area 114 as the image-capturing conditions selected for the person 101. In more specific terms, the image-capturing condition setting unit 23*d* sets, at the image-capturing control unit 23*f*, the exposure time (charge accumulation duration) and the gain for the plurality of unit groups 32 at the image sensor 22, which correspond to the person 101 designated as a primary subject as a result of the area sectionalization achieved by the area sectionalizing unit 23*c*, in correspondence to the selected shutter speed setting and ISO sensitivity setting. Even more specifically, the image-capturing condition setting unit 23*d* sets, at the image-capturing control unit 23*f*, the exposure time and the gain for the plurality of unit groups 32 from which image signals pertaining to the person 101 designated as a primary subject are output, within the image-capturing surface 30 of the image sensor 22. At the same time, the image-capturing condition setting unit 23*d* sets the skin tone correction mode at the image processing unit 23*e* for the primary subject.

The image sensor 22 creates a subject image by capturing an image of the primary subject under the image-capturing conditions set via the image-capturing condition setting unit 23*d*. The image processing unit 23*e* executes a skin tone correction processing selected via the image-capturing condition setting unit 23*d* for the primary subject. The control unit 23 brings up on display a subject image, generated by executing the skin tone correction processing on the primary subject, at the liquid crystal monitor 24. The user is able to verify the effects of the image-capturing conditions and the image processing conditions he has selected by viewing the subject image.

Subsequently, in response to an operation at a shutter release button or a button for issuing an image-capturing instruction (neither shown), the control unit 23 generates subject image data by executing an image-capturing operation and image processing under the image-capturing conditions and the image processing conditions set by the image-capturing condition setting unit 23*d* for each of the primary subjects, and has the subject image data thus generated recorded into the memory card 25.

When the user sets image-capturing conditions for a primary subject in the primary subject settings 130, the user selects one partial image among the plurality of partial images 181 and the control unit 23 provides an enlarged display of the selected partial image before the image-capturing conditions for the primary subject are set. As an alternative, after the user selects a partial image, image-capturing conditions may be set for the corresponding primary subject without displaying an enlarged image, and as a further alternative, image-capturing conditions may be set for a primary subject selected with the user's finger among the primary subjects indicated by the highlighted dotted lines in the live view image shown in FIG. 3(*b*), without displaying the plurality of partial images.

While there are a fair number of primary subjects in the example explained above, only one or two primary subjects may be designated. In such a case, the control unit 23 controls the various units as described below in order to set image-capturing conditions for a primary subject. FIG. 4(*a*) and FIG. 5(*a*) each provide a schematic illustration of a subject image showing a single person 106, displayed at the liquid crystal monitor 24 of the information terminal device 10 judged by the attitude detection unit 29 to be currently in a vertical orientation. The person 106 displayed at the liquid crystal monitor 24 takes up a large area, i.e., the ratio of the area taken up by the person 106 to the display area of the liquid crystal monitor 24 is greater than a predetermined value in FIG. 4(*a*). The person 106 displayed at the liquid crystal monitor 24 takes up a small area, i.e., the ratio of the area taken up by the person 106 to the display area of the liquid crystal monitor 24 is smaller than the predetermined value, in FIG. 5(*a*).

In the states shown In FIG. 4(*a*) and FIG. 5(*a*), the object recognition unit 23*a* extracts the person 106 as a photographic subject object, and the weight setting unit 23*b* applies the greatest weight to the person 106. The area sectionalizing unit 23*c* designates the photographic subject object 106 as a primary subject. In addition, if a subject image showing a person 106 and a person 107 is brought up on display at the liquid crystal monitor 24, the person 106 and the person 107 are each designated as a primary subject.

When there is a single primary subject and the ratio of the area taken up by the primary subject to the image-capturing range is greater than the predetermined value, as illustrated in FIG. 4(*a*), the control unit 23 displays an outline 106*a* of the primary subject area on a subject image 1101B, as illustrated in FIG. 4(*b*) after executing the area sectionalization explained earlier. In addition, the control unit 23 displays a setting screen 130*a*, in which image-capturing conditions for the primary subject, i.e., the person 106, can be set, at the liquid crystal monitor 24. The control unit 23 may display the setting screen 130A for setting image-capturing conditions for the primary subject, i.e., the person 106, at, for instance, an upper right position at the liquid crystal monitor 24. In other words, the control unit 23 does not include the setting screen 130 and the partial image display area 190, shown in FIG. 3(*c*) and the like, in the subject image 110B on display.

As the setting status displays 131*b* for the various settings 131 are adjusted and the OK button 132 is touched, the image-capturing condition setting unit 23*d* in the control unit 23 sets the adjusted image-capturing conditions as the image-capturing conditions for the person 106.

Consequently, the person 106 in the subject image 110B is displayed by reflecting the selected image-capturing conditions and image processing conditions. It is to be noted that, although not shown, a similar operation is executed when there are two primary subjects and the ratio of the area taken up by the primary subjects to the image-capturing range is greater than the predetermined value. In this case, if the image of the person 106 among the primary subjects is selected, image-capturing conditions can be set for the person 106, whereas if the image of the person 107 is selected, image-capturing conditions can be set for the person 107.

In response to an operation at the shutter release button or the button for issuing an image-capturing instruction (neither shown) performed in the state shown in FIG. 4(*b*), the control unit 23 generates subject image data by executing an image-capturing operation and image processing under the image-capturing conditions and the image processing conditions set by the image-capturing condition setting unit 23*d* in correspondence to the primary subject and has the subject image data thus generated recorded into the memory card 25.

When there is a single primary subject and the ratio of the area taken up by the primary subject to the image-capturing range is equal to or smaller than the predetermined value, as illustrated in FIG. 5(*a*), the control unit 23 displays an outline 106*a* of the primary subject area on a subject image 110C, and also displays an enlarged image 125 of the person 106, i.e., the primary subject, at a position below the subject image 110C and more specifically, in a partial image display area 190 located on the lower side of the liquid crystal monitor 24 as illustrated in FIG. 5(*b*), after executing the area sectionalization explained earlier. A setting screen 130A, in which image-capturing conditions are set for the person 106, i.e., the primary subject, is displayed in a display area 114 located at an upper right position within the screen.

As the setting status displays 131*b* for the various settings 131 are adjusted and the OK button 132 is operated, the image-capturing condition setting unit 23*d* in the control unit 23 sets the adjusted image-capturing conditions as the image-capturing conditions for the person 106.

Consequently, the control unit 23 displays the person 106 in the subject image 110C and the person 106 in the enlarged image 125 by reflecting the selected image-capturing conditions and image processing conditions.

In response to an operation at the shutter release button or the button for issuing an image-capturing instruction (neither shown) performed in the state shown in FIG. 5(*b*), the control unit 23 generates subject image data by executing an image-capturing operation and image processing under the image-capturing conditions and image processing conditions set by the image-capturing condition setting unit 23*d* in correspondence to the primary subject and has the subject image data thus generated recorded into the memory card 25. It is to be noted that, although not shown, a similar operation is executed when there are two primary subjects and the ratio of the area taken up by the primary subjects to the image-capturing range is smaller than the predetermined value.

—When the Information Terminal Device 10 is in a Horizontal Orientation—

If the attitude detection unit 29 judges that the information terminal device 10 is currently in a horizontal orientation, the control unit 23 brings up on display a subject image 110E, such as that shown in FIG. 6(*a*), at the liquid crystal monitor 24. The following explanation is given with the assumption that two persons 101 and 102, a small animal 103, tables 105A, 105B and 105C and cakes 104A and 104B on plates are present as subjects within the image-capturing range of the information terminal device 10. The object recognition unit 23*a* recognizes the two persons 101 and 102, the small animal 103, the tables 105A, 105B and 105C and the cakes 104A and 104B as photographic subject objects, and the weight setting unit 23*b* individually applies specific weights to the eight photographic subject objects so as to rank the various photographic subject objects. The area sectionalizing unit 23*c* then selects five photographic subject objects, i.e., the persons 101 and 102, the small animal 103 and the cakes 104A and 104B among the eight photographic subject objects having been ranked, and designates the selected photographic subject objects as primary subjects.

FIG. 6(*b*) shows a display screen brought up at the liquid crystal monitor 24, which includes a subject image with the five photographic subject objects 101, 102, 103, 104A and 104B, having been designated as primary subjects, highlighted with dotted lines. It is to be noted that FIG. 6(*b*) corresponds to FIG. 3(*b*) showing the display screen brought up when the attitude detection unit 29 judges that the information terminal device 10 is currently in a vertical orientation. When the attitude detection unit 29 judges that the information terminal device 10 is in a horizontal orientation, three partial images 126 through 128 corresponding to three primary subjects among the five primary subjects are respectively displayed in display areas 146 through 148 located on the left side of the liquid crystal monitor 24. A setting screen 130 where image-capturing conditions for a primary subject are set is displayed on the right side of the screen. It is to be noted that the control unit 23 sequentially switches the display in the display areas 146 through 148 so that one of the images of the three primary subjects is replaced by the partial image of one of the two remaining primary subjects as the user operates either an operation mark 115 or an operation mark 116 in the display area 146 or 148.

An image 128 of the cake 104 displayed in the display area 148 may be selected in the state shown in FIG. 6(*b*). In this situation, the control unit 23 brings up on display an enlarged image 129 of the cake 104A in a partial image display area 149 on the left side of the liquid crystal monitor 24, as shown in FIG. 6(*c*). The user, viewing this enlarged image 129, is able to adjust the image-capturing conditions for the primary subject, i.e., the cake 104A, as desired in the setting screen 130. The enlarged image 129 of the cake 104A assures easy viewing and thus allows the user to select desired settings with better ease.

It is to be noted that the control unit 23 may adjust the display range over which the subject image 110D is displayed, as illustrated in FIG. 6(*d*), so as to ensure that the area of the subject image 110D where the cake 104A, i.e. the image-capturing condition setting target, is present, is not hidden by the partial image display area 149 or the setting screen 130. FIG. 6(*d*) presents an example in which the control unit 23 adjusts the display range for the subject image 110D at the liquid crystal monitor 24 so as to show the subject image corresponding to the cake 104A in a subject image display area 152 positioned between the partial image display area at 149 and the setting screen 130. In addition, the view of the setting screen 130 may be improved by withholding the display of the subject image 110E over the display area where the image-capturing condition setting screen 130 is displayed, as shown in FIG. 6(*d*).

As the OK button 132 at the lower right position in a display area 151 is touched, the image-capturing condition setting unit 23*d* sets the image-capturing conditions currently displayed in the display area 151 as the image-capturing conditions selected for the cake 104A. As a result, the cake 104A in the subject image 110E and the cake 104A in the enlarged image 129 in the display area 149 are displayed by reflecting the selected image-capturing conditions and image processing conditions. The image-capturing conditions and the image processing conditions may be set in a similar manner for another primary subject. Once the image-capturing conditions and the image processing conditions for the primary subject are set, a subject image display is provided and a shutter release operation is executed in much the same way as in the example explained earlier. It is to be noted that the display mode at the liquid crystal monitor 24 may return to that shown in FIG. 6(*b*) if the enlarged image 129 in the display area 149 in FIG. 6(*c*) is operated twice in quick succession.

It is to be noted that a similar display mode is assumed at the liquid crystal monitor 24 when there is a single primary subject and the ratio of the area taken up by the primary subject to the image-capturing range is equal to or smaller than the predetermined value. In this case, the enlarged image on the left side of the screen will occupy a central position along the up/down direction. In addition, when there is only a small number of primary subjects (e.g., one or two) and the ratio of the area taken up by the primary subjects to the image-capturing range is greater than the predetermined value, the display mode assumed at the liquid crystal monitor 24 will be similar to that shown in FIG. 4(*a*) and FIG. 4(*b*).

—Flowchart—

FIG. 7 presents a flowchart of processing executed when capturing a subject image by setting image-capturing conditions for individual primary subjects as described above. As power to the information terminal device 10 is turned on, the program that enables the processing shown in FIG. 7 is started up and is executed by the control unit 23. In step S1, the control unit 23 starts up an image-capturing application program and then the operation proceeds to step S3. In step S3, the image-capturing control unit 23*f* controls the image-capturing pixels 31 at the image sensor 22 so that uniform values, determined based upon, for instance, the subject brightness, are set for the charge accumulation duration and the gain at the image-capturing pixels 31 in all the unit groups 32, and a subject image generated based upon image-capturing signals originating from the image-capturing pixels 31 under this control is displayed at the liquid crystal monitor 24.

In step S7, the object recognition unit 23*a* recognizes or extracts any photographic subject object, i.e., any photographic subject element, in the subject image 110 on display at the liquid crystal monitor 24, and the operation proceeds to step S9. In this step, the object recognition unit 23*a* recognizes or extracts each photographic subject object, i.e., each photographic subject element, based upon the image data expressing the subject image 110 output from the image sensor 22. In step S9, the weight setting unit 23*b* applies weights to the photographic subject elements having been extracted by the object recognition unit 23*a*, before the operation proceeds to step S11. In step S11, the area sectionalizing unit 23*c* designates a specific number of highest ranked photographic subject elements, based upon the weights applied by the weight setting unit 23*b*, among the various photographic subject elements having been extracted by the object recognition unit 23*a*, as primary subjects and sectionalizes the corresponding areas, before the operation proceeds to step S15.

In step S15, the control unit 23 controls the various units so as to provide an instructive display of the primary subjects on the subject image, e.g., so as to indicate the outlines of the primary subjects with dotted lines or to provide a highlighted display of the primary subjects, and then the operation proceeds to step S17. In step S17, the control unit 23 makes a decision as to whether or not there are numerous primary subjects. It is to be noted that the control unit decides that there are numerous primary subjects when their number is equal to or greater than a predetermined value of, for instance, three. Upon making an affirmative decision in step S17, the operation proceeds to step S19, in which the control unit 23 displays a subject image 110A, partial images 181 corresponding to the primary subjects, and the like at the liquid crystal monitor 24, as shown in, for instance, FIG. 3(*b*) before the operation proceeds to step S21. In step S21, the control unit 23 sets image-capturing conditions for each primary subject in response to user operations, and then the operation proceeds to step S23. It is to be noted that the display at the liquid crystal monitor 24 shifts and the image-capturing conditions are set in response to the user operations in step S21, as has been explained earlier.

In step S23, the control unit 23 makes a decision as to whether or not the user has issued an image-capturing instruction, i.e., whether or not the shutter release button or the button via which an image-capturing instruction is issued (neither shown) has been operated. Upon making an affirmative decision in step S23, the operation proceeds to step S25, whereas if a negative decision is made in step S23, the operation returns to step S21.

In step S25, the control unit 23 controls the image sensor 22 so as to capture an image of each primary subject under the image-capturing conditions having been set for the particular primary subject as described above, generates captured image data by executing specific image processing on the images of the primary subjects in the subject image obtained through the image-capturing operation executed as described above, and records the captured image data thus generated into the memory card 25.

In step S27, the control unit 23 makes a decision as to whether or not the current image-capturing session is to continue. The control unit 23 may make this decision by, for instance, judging whether or not an instruction for ending the image-capturing application program has been issued. If it is decided in step S27 that the current image-capturing session is to continue, the operation returns to step S7, whereas if it is decided that the image-capturing session is to end, the image-capturing application program is terminated.

If a negative decision is made in step S17, i.e., if the number of primary subjects is determined to be one or two, the operation proceeds to step S31. In step S31, the control unit 23 makes a decision as to whether or not the ratio of the area taken up by the primary subject to the image-capturing range is greater than a predetermined value. In other words, it makes a decision as to whether or not the image of the primary subject is greater than a predetermined size. If a negative decision is made in step S31, i.e., if the ratio of the area taken up by the primary subject to the image-capturing range is equal to or smaller than the predetermined value, the operation proceeds to step S19.

If an affirmative decision is made in step S31, i.e., if the ratio of the area taken up by the primary subject to the image-capturing range is greater than the predetermined value, the operation proceeds to step S35. In step S35, the control unit displays a subject image 110B and an image-capturing condition setting screen 130 at the liquid crystal monitor 24, as shown in, for instance, FIG. 4 before the operation proceeds to step S21.

The following advantages and operations are achieved through the first embodiment described above.

(1) The area taken up by each primary subject within a subject image is sectionalized as an areal portion, and partial images showing primary subjects, an enlarged image of a primary subject and the subject image are brought up on display at the liquid crystal monitor 24. The user viewing this display is able to recognize each primary subject with ease, better user convenience is thus assured, and ultimately, a user-friendly electronic device can be provided.

(2) The structure allows partial images showing primary subjects, an enlarged image of a primary subject and a subject image to be brought up on display at the liquid crystal monitor 24 and allows image-capturing conditions to be set manually for the image-capturing area corresponding to a partial image. The image-capturing conditions having been manually set are then selected as image-capturing conditions for a plurality of unit groups 32 at the image sensor 22, which correspond to the particular primary subject. Through these measures, a user interface that allows the user to set optimal image-capturing conditions for each image-capturing area can be provided.

(3) The control unit 23 provides an instructive display of the primary subject areas over the subject image. As a result, even a primary subject taking up a small area in the display on the liquid crystal monitor 24 can be recognized by the user with ease, and thus a high level of user convenience is assured.

(4) The images of the primary subjects are displayed as partial images 181, separately from the subject image, at the liquid crystal monitor 24. As a result, the user is easily able to select a primary subject, the image-capturing conditions for which he wishes to adjust, in an improved at-a-glance display of the images of the primary subjects.

(5) The image of a primary subject is brought up on display as an enlarged image, separately from the subject image, at the liquid crystal monitor 24. In this display, the primary subject can be viewed with better ease and the image-capturing conditions can be adjusted with better ease. Furthermore, the user is able to verify the effects of the selected image-capturing conditions and image processing conditions with ease.

(6) The object recognition unit 23*a* recognizes specific photographic subject objects in a subject image on display as the subject image 110 at the liquid crystal monitor 24. Among the photographic subject objects detected by the object recognition unit 23*a*, highest-ranking photographic subject objects, determined through weight application by the weight setting unit 23*b*, are designated as primary subjects for which image-capturing conditions can be manually set. Thus, even when the object recognition unit automatically recognizes numerous photographic subject objects, a limited specific number of photographic subject objects will be designated as primary subjects.

(7) The image processing effect to be realized for a given primary subject can also be adjusted. As a result, a subject image achieving the quality intended by the user can be obtained with ease.

Second Embodiment

In reference to FIG. 8 through FIG. 9(*b*), the second embodiment of the present invention will be described. The following explanation will focus on features differentiating the current embodiment from the first embodiment, with the same reference signs given to structural elements identical to those in the first embodiment. Any feature that is not specially noted may be assumed to be identical to the corresponding feature in the first embodiment. The object recognition unit 23*a* in the first embodiment automatically recognizes specific types of photographic subject objects in a subject image as primary subjects, or it recognizes specific types of photographic subject objects in a subject image as primary subjects. Namely, it detects the area taken up by or the range of a given photographic subject object. As the user specifies a point or a location within a subject image as part of a primary subject, the object recognition unit 23*a* in the second embodiment automatically detects the area taken up by a primary subject or the range of a primary subject based upon color information at the specified position within the subject image, or detects the area taken up by a primary subject or the range of a primary subject based upon color information at the specified position within the subject image.

FIG. 8 is a block diagram showing the structure of an information terminal device 10A achieved in the second embodiment. The information terminal device 10A in the second embodiment is distinguishable from the information terminal device 10 in the first embodiment in that it does not include the weight setting unit 23*b*. It is otherwise identical to the information terminal device 10 in the first embodiment.

FIG. 9(*a*) is a schematic illustration showing a user's finger 161 touching a person 101 in a subject image 110 on display at the liquid crystal monitor 24. In the embodiment, as the user selects a point or a location within the subject image 110 as part of a primary subject, as shown in FIG. 9(*a*), the object recognition unit 23*a* automatically detects the area of an image or the range of an image holding color information substantially matching the color information at the selected position within the subject image 110, based upon the color information at the selected position. For instance, as the user touches part of the face of the person 101 in the subject image 110, as shown in FIG. 9(*a*), the object recognition unit 23*a* detects a facial area of the person 101 by detecting an expanse of skin-colored area based upon facial skin color information. As the user specifies an area within the subject image 110 on display at the liquid crystal monitor 24, the object recognition unit 23*a* recognizes a specific area that includes the specified area as a primary subject. For instance, if the user specifies part of the area taken up by a person 110 within the subject image on display, the object recognition unit 23*a* recognizes the area taken up by the particular person as a specific area. In addition, if the user specifies part of the area taken up by one person in a subject image 110 showing a plurality of people on display at the liquid crystal monitor 24, the object recognition unit 23*a* may recognize the areas taken up by the plurality of people as specific areas. Namely, even when the user specifies a single area, the object recognition unit 23*a* may recognize a plurality of areas as specific areas based upon, for instance, the color information or the brightness information in the specified area or based upon subject information (a person, a face or the like) in the specified area.

Once the object recognition unit 23*a* detects the area corresponding to the primary subject, the area sectionalizing unit 23*c* demarcates the primary subject area within a subject image 110A. As a result, the control unit 23 is able to provide a highlighted display of the person's face, i.e., the primary subject, as indicated by the dotted line on the subject image 110A in FIG. 9(*b*). The user may touch another point on the subject image 110A, and in such a case, too, the area taken up by another primary subject is detected based upon the color information thereat and the detected primary subject is highlighted on the subject image 110A in a similar manner.

The image-capturing conditions for the primary subject are subsequently adjusted in the setting screen 130 in much the same way as in the first embodiment, and accordingly, a detailed description is not provided.

The following advantage and operation are achieved through the second embodiment described above, in addition to the advantages and operations achieved in the first embodiment.

(1) As the user touches a point or a location within the subject image as part of a primary subject, the particular primary subject is automatically detected. These measures allow the user to specify any primary subject and thus, a subject image achieving the quality intended by the user can be obtained with ease.

Third Embodiment

In reference to FIG. 10(*a*) through FIG. 11(*b*), the third embodiment of the present invention will be described. The following explanation will focus on features differentiating the current embodiment from the first embodiment, with the same reference signs given to structural elements identical to those in the first embodiment. Any feature that is not specially noted may be assumed to be identical to the corresponding feature in the first and second embodiments. The third embodiment is primarily distinguishable from the first and second embodiments in that as a user indicates a subject range, a subject present within the indicated range is set as a primary subject.

An information terminal device 10A in the third embodiment assumes a structure identical to that of the information terminal device 10A in the second embodiment shown in FIG. 8.

Figure 10:
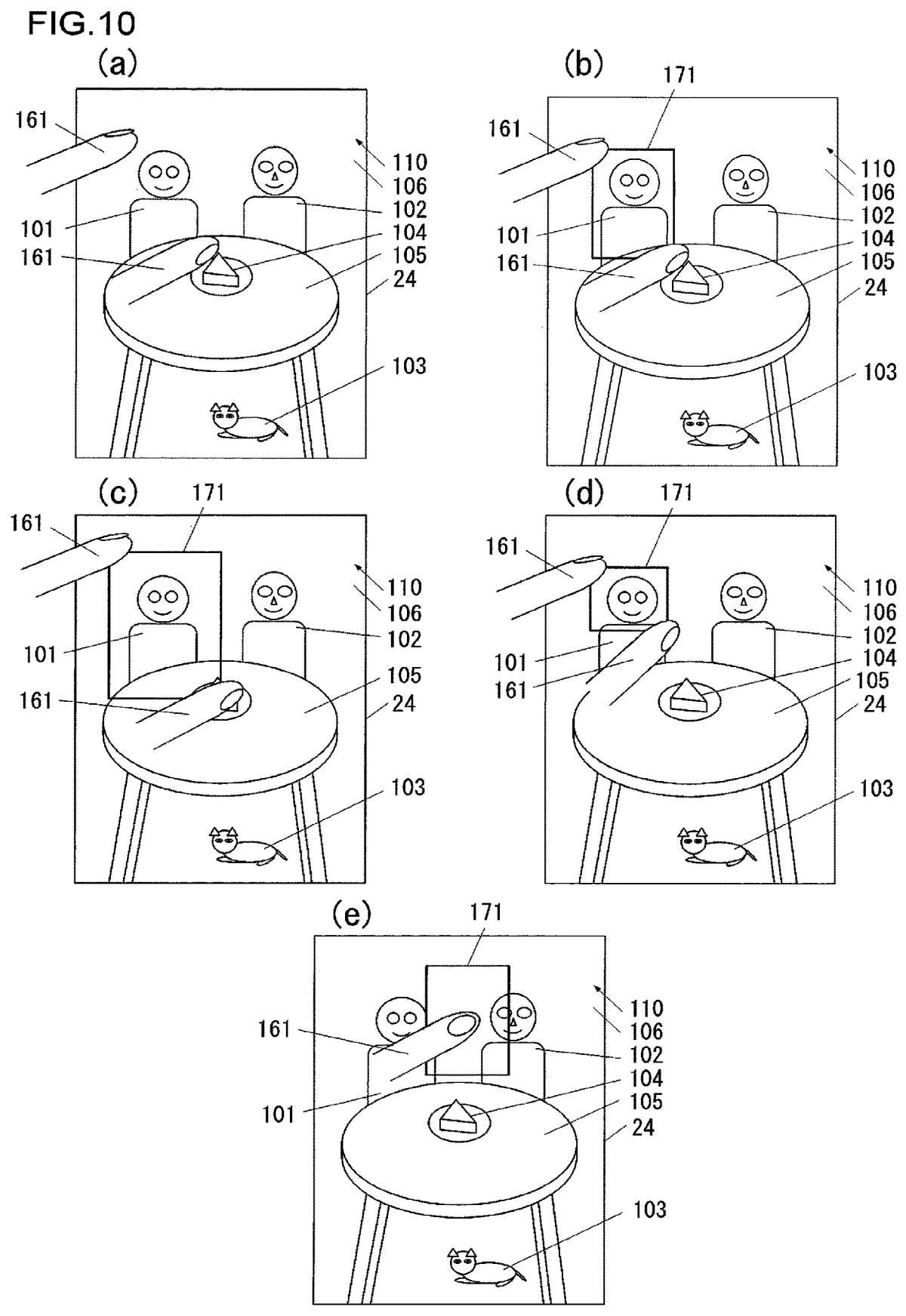

FIG. 10(*a*) is a schematic illustration showing the user touching a person 101 in a subject image 110 on display at the liquid crystal monitor 24 with his two fingers 161. In the embodiment, as the user specifies any two positions at the liquid crystal monitor 24 where the subject image 110 is on display, as shown in FIG. 10(*a*), the control unit 23 brings up on display at the liquid crystal monitor 24 a rectangular frame 171 based on a diagonal that connects the specified two positions, as indicated in FIG. 10(*b*).

The control unit 23 enlarges the frame 171 in response to a pinch-out operation, as shown in FIG. 10(*c*), and reduces the size of the frame 171 in response to a pinch-in operation, as shown in FIG. 10(*d*). In addition, as the positional relationship between the two fingers 161 changes, the aspect ratio of the frame 171 is adjusted in correspondence to the positions touched by the fingers 161. Furthermore, as a finger 161 holds a position on or within the frame 171, the control unit 23 selects the frame 171 and as the finger 171 moves over the display screen at the liquid crystal monitor 24, it moves the position of the frame 171 in correspondence to the movement of the finger 161, as illustrated in FIG. 10(*e*).

Moreover, upon judging that a single finger 161 touching the display screen at the liquid crystal monitor 24 has traced over the display screen along the direction indicated by an arrow A in FIG. 11(*a*), the control unit 23 displays a line 172 running along the locus of the finger trace at the liquid crystal monitor 24. Then, as the finger 161 traces over the display screen at the liquid crystal monitor 24 as indicated by an arrow B in FIG. 11(*b*), the control unit 23 displays a line 172 running along the locus of the movement of the finger 161. As the locus of the finger 161 connects with the starting point of the line 172, the control unit 23 sets the line 172 forming a closed loop as a frame 171 (not shown). It is to be noted that even if the finger 161 moves away from the display screen at the liquid crystal monitor 24 before the locus of the finger 161 connects with the starting point of the line 172, the control unit 23 automatically forms a closed loop with the line 172 and sets it as a frame 171, as long as the finger 161 moves away from the display screen at a position close to the starting point.

Once the frame 171 is set as described above, the object recognition unit 23*a* detects a photographic subject object present within the frame 171 in the subject image 110 on display at the liquid crystal monitor 24. The area sectionalizing unit 23*c* then designates the photographic subject object detected by the object recognition unit 23*a* as a primary subject and specifies or demarcates the position taken up by the primary subject, i.e., the area taken up by the primary subject within the subject image 110, as a primary subject area. The image-capturing conditions for the primary subject are subsequently adjusted in the setting screen 130 in much the same way as in the first embodiment, and accordingly, a detailed description is not provided.

The following advantage and operation are achieved through the third embodiment described above, in addition to the advantages and operations achieved in the first and second embodiments.

(1) The structure allows the user to draw the frame 171 and the line 172 by touching the display screen at the liquid crystal monitor 24. Then, a photographic subject object present within the area specified with the frame 171 or the line 172 is detected. Since this allows the user to specify a primary subject exactly as he wants, a subject image can be obtained with ease exactly as intended by the user.

—Variations—

(1) The object recognition unit 23*a* recognizes a specific type of photographic subject object so as to allow the image-capturing conditions for the area inside the outline of the corresponding primary subject to be adjusted in the explanation provided above. However, the present invention is not limited to this example. For instance, the image-capturing conditions for the entire area inside the frame 171 in the third embodiment described above may be rendered adjustable.

(2) The display mode may be switched in correspondence to the screen size at the liquid crystal monitor 24. For instance, at a device such as a tablet terminal device with a large screen, a primary subject is likely to be displayed in a significant size compared to that at a smart phone and thus, an enlarged image display does not need to be provided except for an extremely small primary subject. In other words, the control unit 23 may make a decision as to whether or not a primary subject to be brought up on display takes up an area equal to or greater than a predetermined size and may control the display mode in correspondence to the decision-making results.

(3) The order with which the image-capturing condition settings 131 is displayed may be adjusted in correspondence to the subject type. For instance, when the primary subject is a person, the likelihood of adjusting a setting related to the brightness of the person is high, and accordingly, the control unit 23 may provide a display of the settings 131 by giving priority to the setting related to brightness adjustment. Through these measures, the ease of the setting adjustment operation can be improved.

(4) While the liquid crystal monitor 24, which is a touch panel display device, constitutes part of the operation unit 26 in the description provided above, the present invention is not limited to this example. For instance, the operation unit 26 may include operation devices such as operation keys, an operation dial and a mouse and in such a case, a desired position on the display screen may be specified as a cursor, a pointer or the like is moved to the desired position within the display screen at the liquid crystal monitor 24.

(5) When, for instance, an enlarged image of a primary subject is brought up on display, the aspect ratio of the area where the subject image is displayed may be different from that of the initial subject image. Under such circumstances, the entire subject image may be displayed in a reduced size or a trimmed image created by trimming the initial subject image as needed may be displayed.

(6) While the image-capturing condition settings 131 include "shutter speed", "ISO sensitivity", "frame rate" and "image processing effect" in the description provided above, these are simply examples and the present invention is not limited to them. For instance, only one of; "shutter speed", "ISO sensitivity" and "frame rate" needs to be included in the image-capturing condition settings 131. In addition, "image processing effect", selected as an image processing condition, does not need to be included in the settings 131. Moreover, the settings 131 may include a setting other than those listed above.

(7) While the information terminal device 10 described above is a device with a low profile, having a large liquid crystal monitor mounted at the front surface thereof and an image-capturing optical system installed on the back side surface thereof, an example of which is a tablet-type information terminal device, the present invention is not limited to this example. For instance, the information terminal device 10 may be an image-capturing device, i.e., a built-in lens-type camera or it may be an exchangeable lens-type camera at which exchangeable lenses can be detachably mounted at a camera body.

(8) While the information terminal device 10 described above is a single electronic device that includes the image sensor 22 and the control unit 23, the present invention is not limited to this example. The present invention may also be adopted in, for instance, an electronic device that controls an external image sensor 22. The following is a detailed description of a mode in which the present invention is adopted in conjunction with an external image sensor 22.

FIG. 12 is a schematic block diagram showing the structure of an image-capturing system achieved in this variation. An image-capturing system 1000 shown in FIG. 12 comprises an image-capturing unit 1001 and an electronic device 1002. The image-capturing unit 1001 includes the photographic optical system 21 and the image sensor 22 having been described in reference to the first embodiment and further includes a first communication unit 1003. The electronic device 1002 includes the control unit 23, the liquid crystal monitor 24, the memory card 25, the operation unit 26, the DRAM 27, the flash memory 28 and the attitude detection unit 29 described in reference to the first embodiment and further includes a second communication unit 1004. The first communication unit 1003 and the second communication unit 1004 are capable of bidirectional data communication through, for instance, a wireless communication technology, an optical communication technology or the like of the known art. As an alternative, the first communication unit 1003 and the second communication unit 1004 may be engaged in bidirectional data communication through a wired connection between the image-capturing unit 1001 and the electronic device 1002, achieved via, for instance, a wiring cable.

In the image-capturing system 1000 in the variation, the control unit 23 controls the image sensor 22 through data communication carried out via the second communication unit 1004 and the first communication unit 1003. For instance, it sets different image-capturing conditions from one unit group 32 to another and reads out image-capturing signals from the individual unit groups 32 by exchanging specific control data with the image-capturing unit 1001.

As described above, the control unit 23 individually controls the various unit groups 32 in the image-capturing system 1000. While the electronic device 1002 is not equipped with the image sensor 22, it executes control similar to that in the first embodiment by controlling the external image sensor 22 (the image-capturing unit 1001) located outside the electronic device 1002. Namely, the present invention can be adopted in an electronic device that does not include the image sensor 22.

(9) The display mode for the enlarged image described above simply represents an example and the present invention is not limited to this example. For instance, a balloon 201 may be brought up on display beside a primary subject (person 101) and an enlarged image of the primary subject may be provided inside the balloon 201, as illustrated in FIG. 13(*a*). It is to be noted that the balloon may be displayed above or below the primary subject or it may be displayed at a position diagonally beside the primary subject. In addition, the balloon does not need to have a rectangular shape, as shown in FIG. 13(*a*), and may assume a circular shape or a polygonal shape. Moreover, the balloon does not need to be outlined. Furthermore, together with the enlarged image of the primary subject or instead of the enlarged image of the primary subject, an image indicating the current image-capturing condition settings selected for the primary subject may be displayed.

(10) As shown in FIG. 13(*b*), a slide bar adjuster made up with a balloon 201, which is used to provide an enlarged display of a primary subject, and a slider (knob) 201*a*, to be moved along the outline of the balloon 201 to adjust the various settings 131, may be displayed. In the example presented in FIG. 13(*b*), scale marks 201*b* are set along the outline of the circular balloon 201. As the user moves the slider 201*a* along the outline of the balloon 201, the value selected for a specific setting 131 can be adjusted. It is to be noted that FIG. 13(*b*) does not include an illustration of the primary subject. In addition, the slide bar, and the slider 201*a* may be displayed together with the balloon 201 or instead of the balloon 201.

(11) As another example of the display mode for providing an instructive display of primary subjects in the subject image, a primary subject may be displayed so as to appear as if lifted off the screen. FIG. 14(*a*) presents an example of a subject image 110 on display at the liquid crystal monitor 24. The image of a person 101 designated as a primary subject in the subject image 110 may be displayed in a slightly larger size (e.g., enlarged by a factor of 1.2) as an image 101*b* in FIG. 14(*b*) so that the person 101 takes on the appearance of being lifted off the screen.

(12) While the display area for the partial images 181 or the enlarged image and the subject image display area are partitioned from each other along a straight line, the present invention is not limited to this example and they may be separated from each other along, for instance, a curved line.

(13) As the image of a person 101, designated as a primary subject, is touched in a subject image 110, icons 202 used to select image-capturing condition settings may be displayed around the image of the person 101, as illustrated in FIG. 15(*a*). As an alternative, as the image of the person 101 designated as a primary subject is touched in the subject image 110, slide bars 203 used to adjust the various image-capturing condition settings may be displayed around the image of the person 101, as illustrated in FIG. 15(*b*). These measures make it possible to directly adjust the image-capturing condition settings for the primary subject. The image-capturing condition settings currently selected for the primary subject may be indicated on the slide bars 203, as well.

(14) A graphic 204 indicating the exact position taken up by a primary subject area, for which the image-capturing condition settings are to be adjusted, within the subject image 110 may be displayed together with the subject image 110, as illustrated in FIG. 16. Namely, a graphic (area display graphic) 204 indicating the primary subject area designated as the image-capturing condition adjustment target, may be displayed in, for instance, an upper right area at the liquid crystal monitor 24, as illustrated in FIG. 16. In the example presented in FIG. 16, a table 105, a cake 104 placed on a plate and a small box 109 are present within the image-capturing range of the image information terminal device 10. The cake 104 on the plate and the small box 109 are set on the table 105. The primary subject area for which the image-capturing conditions are to be adjusted, i.e., the primary subject designated as the image-capturing condition adjustment target, is the table 105.

In the area display graphic 204, the area corresponding to a background portion 108 in the subject image 110 and an area corresponding to the area other than the table 105 in the subject image 110 are masked or displayed at low saturation (grayed out). As a result, the table 105, i.e., the image-capturing condition adjustment target, is displayed with higher clarity compared to the other areas in the area display graphic 204. Thus, the user viewing the area display graphic 204 is able to recognize the table 105 as the image-capturing condition adjustment target primary subject with ease. Then, by operating the slide bars 203 displayed below the area display graphic 204, the user is able to adjust the photographic conditions for the table 105. The image-capturing condition settings currently selected for the primary subject may be indicated on the slide bars 203, as well.

(15) As shown in FIG. 17, an image of a primary subject (person 101) before image-capturing condition setting adjustment may be displayed in one of two display areas 194 and 195 (e.g., in the display area 194) and an image of the primary subject (person 101) resulting from the image-capturing condition setting adjustment may be displayed in the other display area (e.g., in the display area 195). These measures allow subtle changes occurring in the image through adjustment of the settings such as the shutter speed and the ISO sensitivity to be checked in the setting adjustment before/after images.

(16) Icons each used to set a primary subject in correspondence to a specific motif may be displayed together with a subject image 110 at the liquid crystal monitor 24, as shown in, for instance, FIG. 18, and as an icon is selected, a subject matching the motif corresponding to the particular icon may be set as a primary subject. In the example presented in FIG. 18, icons 205*a*, 205*b* and 205*c* used to set primary subjects in correspondence to specific motifs are displayed on the lower side of the screen at the liquid crystal monitor 24.

For instance, as the user touches the icon 205*a*, the control unit 23 controls the various units so as to set a person 106 and a person 107 in the subject image 110 as primary subjects. If, on the other hand, the user touches the icon 205*b*, the control unit 23 controls the various units so as to set the vehicles 206 in the subject image 110 as primary subjects. If the user touches the icon 205*c*, the control unit 23 controls the various units so as to set a background portion 108 in the subject image 110 as a primary subject. This structure makes it possible to set a primary subject in correspondence to a specific motif and adjust the image-capturing conditions for the primary subject with better ease.

(17) Icons each used to set a specific person in a subject image 110 as a primary subject may be displayed at the liquid crystal monitor 24 together with the subject image 110, as illustrated in FIG. 19. In this case, as an icon is selected, the person corresponding to the particular icon is selected as a primary subject. In the example presented in FIG. 19, icons 221 through 223, each used to set a specific person as a primary subject, are displayed on the lower side of the screen at the liquid crystal monitor 24.

Namely, the control unit 23 controls the various units so as to detect people's faces in the subject image brought up on display. Then, as a person's face is detected, it generates an icon to be used to set the particular person as a primary subject based upon the image of the detected face and displays the icon at the liquid crystal monitor 24. In the example presented in FIG. 19, the control unit 23 detects the faces of three persons 211 through 213 in a subject image brought up on display as the subject image. Then, based upon the images of the faces of the individual persons 211 through 213, it generates the icons 221 through 223 and displays the icons thus generated at the liquid crystal monitor 24.

For instance, as the user touches the icon 221 corresponding to the person 211, the control unit 23 controls the various units so as to set the person 211 within the subject image 110 as a primary subject. If the user touches the icon 222 corresponding to the person 212, the control unit 23 controls the various units so as to set the person 212 within the subject image 110 as a primary subject. In addition, if the user touches the icon 223 corresponding to the person 213, the control unit 23 controls the various units so as to set the person 213 within the subject image 110 as a primary subject. This structure allows each person in the subject image 110 to be individually selected or not selected as a primary subject with ease.

(18) While an explanation has been given above by assuming that the orientation of the information terminal device 10 detected by the attitude detection unit 29 matches the direction along which the subject image is displayed, i.e., if the attitude detection unit 29 determines that the information terminal device 10 is in a horizontal orientation, the subject image display is also provided in the horizontal orientation, the present invention is not limited to this example. Provided that the user selects in advance the vertical orientation for the subject image display, the control unit 23 selects the vertical orientation for the subject image display and executes subsequent control accordingly even when the attitude detection unit 29 determines that the information terminal device 10 is in a horizontal orientation.

(19) While no special reference has been made in the description provided above with regard to the minimum unit for sectionalization of areal portions, the minimum unit for sectionalization of areal portions may be a single unit group 32 or a single pixel.

(20) The various embodiments and variations thereof described above may be adopted in any combination.

Fourth Embodiment

FIG. 20 is a block diagram of the image-capturing device achieved in the fourth embodiment of the present invention. An image-capturing device 3010 is a camera with built-in lens. The image-capturing device 3010 comprises an image-capturing optical system 21, an image sensor 22, a control unit 33, a liquid crystal monitor 24, a memory card 25, an operation unit 26, a DRAM 27, a flash memory 28 and an audio recording unit 34.

Since the image-capturing optical system 21, the image sensor 22, the liquid crystal monitor 24, the memory card 25, the operation unit 26, the DRAM 27 and the flash memory 28 are identical to those in the first embodiment, their explanation is not provided.

The control unit 33 creates an image file, as will be described later, based upon image-capturing signals output from the image sensor 22 and records the image file into the memory card 25, which is a detachable recording medium. The operation unit 26, which includes various operation members such as push-buttons, outputs an operation signal to the control unit 33 in response to an operation performed at an operation member. The audio recording unit 34, which may be configured with, for instance, a microphone, converts environmental sound to an audio signal and inputs the signal to the control unit 33.

Next, the image-capturing processing executed by the control unit 33 will be explained in sequence.

(1) Preliminary Image-Capturing

Prior to a main image-capturing operation, the control unit 33 executes a preliminary image-capturing operation. In the following description, this advance image-capturing operation will be referred to as an advance image-capturing operation. For the preliminary image-capturing operation, the control unit 33 selects specific image-capturing conditions, determined under the automatic exposure control of the known art, as the image-capturing conditions for the individual unit groups 32. A single subject image is obtained through the preliminary image-capturing operation.

(2) Identification of Darkest Area, Brightest Area and Primary Area

The control unit 33 measures the subject brightness in correspondence to each unit group 32, i.e., the subject brightness distribution, in the subject image obtained through the preliminary image-capturing operation. A description will be given below in reference to FIG. 21.

An image of the subject schematically illustrated in FIG. 21(*a*) is being captured. A person 1104, a building 1102, a ground area 1101, a sky area 1103 and the sun 1105 are captured at an image-capturing plane 1100 shown in FIG. 21(*a*). In addition, a shadow 1106 of the building 1102 is cast on the ground area 1101. FIG. 21(*b*) presents an example of a subject brightness distribution that may be obtained by capturing an image of this subject through a preliminary image-capturing operation. The small squares in the brightness distribution map 67 in FIG. 21(*b*) each represent one unit group 32. In addition, the numerical value entered in each where indicates the brightness (By value) detected in the particular unit group 32.

The control unit 33 identifies a subject darkest area (darkest area) and a subject brightest area (brightest area) in the subject brightness distribution map 67 in FIG. 21(*b*). In the example presented in FIG. 21(*b*), the smallest brightness value of "4" is detected in an area 1109 where the shadow 1106 of the building 1102 is cast. In other words, the darkest area in the subject shown in FIG. 21(*a*) is the area 1109 where the shadow 1106 is cast (hereafter notated as the darkest area 1109). In addition, the largest brightness value of "8" is detected in an area 1108 where the sun 1105 is present in the example presented in FIG. 21(*b*). Namely, the brightest area in the subject shown in FIG. 21(*a*) is the area 1108 where the sun 1108 is present (hereafter notated as the brightest area 1108).

Next, the control unit 33 executes a specific type of primary subject detection processing on the subject image obtained through the preliminary image-capturing operation. In the primary subject detection processing, the face of a human subject is detected through, for instance, a technology known as face recognition technology and the position of, and the range over which, the human subject is present, are identified. In the case of the subject shown in FIG. 21(*a*), a face 1107 of the person 1104 is first detected and then, based upon the detection results, an area where the person 1104 is present is identified. The area 1110 where the detected person 1104 is present will hereafter be referred to as a primary subject area (hereafter notated as the primary area 1110).

It is to be noted that the primary subject detection processing may be executed through a processing technology other than that described above, through which a human subject is detected by adopting the face recognition technology. For instance, a primary area in the subject image may be identified based upon the focusing position assumed by the image-capturing optical system 21, the subject color information or the like. Furthermore, a primary area in the subject image may be identified through characteristic quantity detection, pattern matching or the like of the known art. As a further alternative, the entire remaining area excluding the darkest area 1109 and the brightest area 1108 may be designated as the primary area.

Furthermore, while the control unit 33 identifies the brightest area 1108, the darkest area 1109 and the primary area 1110 which are independent of one another, the primary area 1110 may also be identified as the brightest area 1108 or the darkest area 1109 in some subject images. For instance, in a backlit scene, the primary subject is likely to be dark and thus, one area will be identified as both the primary area 1110 and the darkest area 1109. Under such circumstances, the control unit 33 should identify two areas, e.g., the primary area 1110 (=brightest area 1108) and the darkest area 1109 or the primary area 1110 (=darkest area 1109) and the brightest area 1108, instead of identifying the three areas, the brightest area 1108, the darkest area 1109 and the primary area 1110.

(3) Clipped Black/Clipped White Detection

Next, the control unit 33 checks the darkest area 1109 to determine whether or not the darkest area 1109 contains any clipped black (blocked-up shadow or underexposed black-out). In other words, the control unit 33 makes a decision as to whether or not any of the unit groups 32 belonging to the darkest area 1109 indicate a brightness value (pixel value) less than a predetermined lower limit value in the subject image obtained through the preliminary image-capturing operation.

Likewise, the control unit 33 checks the brightest area 1108 to determine whether or not the brightest area 1108 contains any clipped white (blown-out highlight or overexposed whiteout). In other words, the control unit 33 makes a decision as to whether or not any of the unit groups 32 belonging to the brightest area 1108 indicate a brightness value (pixel value) exceeding a predetermined upper limit value in the subject image obtained through the preliminary image-capturing operation. For instance, brightness values may take on integral values within the range of 0 through 255, and in such a case, the lower limit value may be set to 1 and the upper limit value may be set to 254.

The results of the clipped black/clipped white detection executed by the control unit 33 will indicate; (A) no clipped black or clipped white, (B) clipped black present with no clipped white, (C) clipped white present with no clipped black or (D) both clipped black and clipped white present.

(4) Setting Initial Conditions

Based upon the clipped black/clipped white detection results, the control unit 33 determines initial values (initial conditions) to be set as the image-capturing conditions for the unit groups 32 contained in the darkest area 1109 for the main image-capturing operation, initial values (initial conditions) to be set as the image-capturing conditions for the unit groups 32 contained in the brightest area 1108 for the main image-capturing operation and initial values (initial conditions) to be set as the image-capturing conditions for the unit groups 32 contained in the primary area 1110 for the main image-capturing operation. The method adopted by the control unit 33 when determining the initial conditions will be described in detail later.

(5) Accepting Image-Capturing Condition Adjustment Operation

Next, the control unit 33 brings up on display at the liquid crystal monitor 24 the subject image having been obtained through the preliminary image-capturing operations. It then gives the user an opportunity to adjust the image-capturing conditions for the individual unit groups 32 currently set at the initial values as described earlier. In more specific terms, it accepts a predetermined adjustment operation performed at an operation member (not shown).

In this embodiment, the adjustment operation is accepted only with regard to the image-capturing conditions for the primary area 1110 so as to simplify the operational procedure. In other words, the user is only allowed to illustratively adjust the image-capturing conditions for the primary area 1110 alone. The image-capturing conditions for the darkest area 1109 and the brightest area 1108 are basically adjusted by the control unit 33 automatically in response to the operation performed to adjust the image-capturing operations for the primary area 1110. Namely, the image-capturing conditions set for the darkest area 1109 and the brightest area 1108 interlock to the image-capturing conditions for the primary area 1110. The method adopted by the control unit 33 for the image-capturing condition adjustment will be described in detail later.

The control unit 33 highlights the primary area 1110 in the subject image on display at the liquid crystal monitor 24. It may highlight the primary area 1110 by, for instance, displaying a dotted line framing the primary area 1110 or by flashing the primary area 1110. In addition, when the image-capturing conditions for at least one of; the darkest area 1109, the brightest area 1108 and the primary area 1110 are adjusted, it displays a subject image reflecting the adjustment in the image-capturing conditions at the liquid crystal monitor 24. In other words, it reflects any adjustment in the image-capturing conditions on the display at the liquid crystal monitor 24. For instance, the image-capturing conditions for the primary area 1110 may be adjusted so as to capture a brighter image of the primary area 1110, and in such a case, the primary area 1110 in the subject image on display at the liquid crystal monitor 24 will become brighter.

(6) Main Image-Capturing Operation

The user, having set desired values (conditions) for the image-capturing conditions, performs a specific image-capturing operation at an operation member (not shown) (e.g., presses the shutter release switch all the way down). In response, the control unit 33 engages the image sensor 22 so as to capture a subject image and create subject image data (main image-capturing operation). At this time, image-capturing conditions are set for the unit groups 32 present in the darkest area 1109, the unit groups 32 present in the brightest area 1108 and the unit groups 32 present in the primary area 1110 independently of one another. The control unit 33 records the image data having been created through the main image-capturing operation into, for instance, the memory card 25 or brings up the image expressed by the image data on display at the liquid crystal monitor 24.

The image-capturing processing is executed as described above by the control unit 33. It is to be noted that the image-capturing conditions explained above may be exposure conditions, such as the shutter speed, the ISO sensitivity and the aperture value, or they may be image-capturing conditions including the video frame rate.

Next, specific aspects of the image-capturing processing described above, i.e., (4) Setting initial conditions and (5) Accepting image-capturing condition adjustment operation, will be explained in correspondence to different scenarios indicated by the results of (3) Clipped black/clipped white detection.

(A) No Clipped Black or Clipped White (Normal Image)

FIG. 22(*a*) presents histograms of brightness values each measured for a specific unit group 32 in an image having no clipped black or clipped white. In FIG. 22(*a*), the brightness (pixel value) is indicated along the horizontal axis and the quantity (frequency) of unit groups 32 assuming a given brightness value is indicated along the vertical axis. It is to be noted that FIG. 22(*a*) presents a schematic representation of an aggregate 1121 of the unit groups 32 present in the darkest area 1109, an aggregate 1123 of the unit groups 32 present in the brightest area 1108 and an aggregate 1122 of the unit groups present in the primary area 1110.

It is to be noted that while no matching brightness values are measured for the aggregates 1121, 1122 and 1123 in the example presented in FIG. 22(*a*), an overlap of the aggregates 1121, 1122 and 1123 may occur if, for instance, the brightness values measured for the aggregates 1121, 1122 and 1123 assume relatively broad ranges, if there is only a small difference between the brightness measured for the aggregate 110 in the darkest area 1109 and the brightness measured for the aggregate 1122 in the primary area, or the like. Even under such circumstances, the control unit 33 is able to individually shift the aggregates 1121, 1121, 1123 to the left or to the right along the brightness axis.

When there is no clipped black or clipped white, i.e., when the brightness values within the entire image plane fall into a predetermined range (within the range between the lower limit value and the upper limit value), the brightness values in the three aggregates 1121, 1122 and 1123 all fall within the range defined by a predetermined lower limit value 1120 and a predetermined upper limit value 1130. In this situation, the control unit 33 sets image-capturing conditions matching those set for the preliminary image-capturing operation, i.e., the specific image-capturing conditions determined by the control unit 33 as the initial conditions for the darkest area 1109, the brightest area 1108 and the primary area 1110. For instance, it may set exposure conditions such as the shutter speed (charge accumulation duration), the aperture value and the ISO sensitivity (gain), to specific exposure conditions determined under the automatic exposure control.

If the user performs an adjustment operation (e.g., an operation for raising the shutter speed for the primary area 1110) to adjust the image-capturing conditions for the primary area 1110 so as to darken the primary area 1110 (i.e., to reduce the brightness in the primary area 1110) the control unit 33 adjusts the image-capturing conditions for the darkest area 1109 so that a brightness difference D1 between the brightness of the aggregate 1121 in the darkest area 1109 and the brightness of the aggregate 1122 in the primary area 1110 is sustained. In other words, it adjusts the image-capturing conditions for the darkest area 1109 to image-capturing conditions (e.g., a faster shutter speed) under which the darkest area 1109 will be captured as an even darker image. More specifically, as the user moves the aggregate 1122 in the primary area 1110 further to the left along the brightness axis in FIG. 22(*a*), the control unit 33 moves the aggregate 1121 in the darkest area 1109 further to the left along the brightness axis by interlocking with the user operation. Namely, upon accepting the user operation for adjusting the image-capturing conditions for the primary area 1110, the control unit 33 adjusts the image-capturing conditions for the darkest area 1109 as well as the image-capturing conditions for the primary area 1110. The control unit 33 adjusts the image-capturing conditions for the darkest area 1109 by adjusting the image-capturing conditions for the primary area 1110.

It is to be noted that the control unit 33 adjusts the image-capturing conditions for the darkest area at 1109 by ensuring that the brightness in the darkest area 1109 does not become less than the predetermined lower limit value 1120. In other words, once the brightness in the darkest area 1109 reaches the predetermined lower limit value 1120, the control unit 33 stops (forbids) further adjustment of the image-capturing conditions for the darkest area 1109. In more specific terms, when the user moves the aggregate 1122 in the primary area 1110 further to the left along the brightness axis in FIG. 22(*a*), the aggregate 1121 in the darkest area 1109 could be moved to a brightness level below the predetermined lower limit value 1120. Under these circumstances, the control unit 33 only allows the aggregate 1122 in the primary area 1110 to move further to the left along the brightness axis and holds the aggregate 1121 in the darkest area 1109 at the lower limit value 1120. This results in a change in the brightness difference D1 between the aggregate 1121 in the darkest area 1109 and the aggregate 1122 in the primary area 1110.

In addition, the control unit 33 adjusts the image-capturing conditions for the primary area 1110 by ensuring that the brightness in the primary area 1110 does not become lower than the predetermined lower limit value 1120. In other words, the control unit 33 stops further adjustment of the image-capturing conditions for the primary area 1110 once the brightness in the primary area 1110 reaches the predetermined lower limit value 1120. Namely, if a movement of the aggregate 1122 in the primary area 1110 further to the left along the brightness axis would result in the aggregate 1122 in the primary area 1110 ranging beyond the predetermined lower limit value 1120 in FIG. 22(*a*), the control unit 33 disallows further movement of the aggregate 1122 in the primary area 1110.

It is to be noted that when an adjustment operation is performed to darken the primary area 1110 (to lower the brightness level in the primary area 1110) as described above, the image-capturing conditions for the brightest area 1108 remain unchanged. In other words, when the user moves the aggregate 1122 in the primary area 1110 to the left along the brightness axis in FIG. 22(*a*), the aggregate 1123 in the brightest area 1108 does not move, and holds its position.

In addition, if the user performs an adjustment operation (e.g., an operation for lowering the shutter speed for the primary area 1110) to adjust the image-capturing conditions for the primary area 1110 so as to brighten the primary area 1110 (i.e., so as to increase the brightness in the primary area 1110), the control unit 33 adjusts the image-capturing conditions for the brightest area 1108 so that a brightness difference D1 between the brightness of the aggregate 1123 in the brightest area 1108 and the brightness of the aggregate 1122 in the primary area 1110 is sustained. In other words, it adjusts the image-capturing conditions for the brightest area 1108 to image-capturing conditions (e.g., a slower shutter speed) under which the brightest area 1108 will be captured as an even brighter image. More specifically, as the user moves the aggregate 1122 in the primary area 1110 further to the right along the brightness axis in FIG. 22(*a*), the control unit 33 moves the aggregate 1123 in the brightest area 1108 further to the right along the brightness axis by interlocking with the user operation. Namely, upon accepting the user operation for adjusting the image-capturing conditions for the primary area 1110, the control unit 33 adjusts the image-capturing conditions for the brightest area 1108 as well as the image-capturing conditions for the primary area 1110. The control unit 33 adjusts the image-capturing conditions for the brightest area 1108 by adjusting the image-capturing conditions for the primary area 1110.

It is to be noted that the control unit 33 adjusts the image-capturing conditions for the brightest area 1108 by ensuring that the brightness in the brightest area 1108 does not exceed the predetermined upper limit value 1130. In other words, once the brightness in the brightest area 1108 reaches the specific upper limit value 1130, the control unit 33 stops further adjustment of the image-capturing conditions for the brightest area 1108. In more specific terms, when the user moves the aggregate 1122 in the primary area 1110 further to the right along the brightness axis in FIG. 22(*a*), the aggregate 1123 in the brightest area 1108 could be moved to a brightness level beyond the predetermined upper limit value 1130. Under these circumstances, the control unit 33 only allows the aggregate 1122 in the primary area 1110 to move further to the right along the brightness axis and disallows further movement of the aggregate 1123 in the brightest area 1108. This results in a change in a brightness difference D2 between the aggregate 1123 in the brightest area 1108 and the aggregate 1122 in the primary area 1110.

In addition, the control unit 33 adjusts the image-capturing conditions for the primary area 1110 by ensuring that the brightness in the primary area 1110 does not exceed the predetermined upper limit value 1130. In other words, the control unit 33 stops further adjustment of the image-capturing conditions for the primary area 1110 once the brightness in the primary area 1110 reaches the predetermined upper limit value 1130. Namely, if a movement of the aggregate 1122 in the primary area 1100 further to the right along the brightness axis would result in the aggregate 1122 in the primary area 1110 ranging beyond the predetermined upper limit value 1130 in FIG. 22(*a*), the control unit 33 disallows further movement of the aggregate 1122 in the primary area 1110.

When an adjustment operation is performed to brighten the primary area 1110 (to increase the brightness level in the primary area 1110) as described above, the image-capturing conditions for the darkest area 1109 remain unchanged. In other words, when the user moves the aggregate 1122 in the primary area 1110 to the right along the brightness axis in FIG. 22(*a*), the aggregate 1121 in the darkest area 1109 does not move, and holds its position.

It is to be noted that the control unit 33 may adjust the image-capturing conditions for the darkest area 1109 in correspondence to the adjustment of the image-capturing conditions for the primary area 1110. For instance, if it judges that high sensitivity noise would occur in the darkest area 1109 to an extent equal to or greater than a predetermined extent, it may adjust the image-capturing conditions for the darkest area 1109 so as to prevent such noise.

(B) Clipped Black Present with No Clipped White (Black-Clipping Image)

FIG. 22(*b*) presents histograms of brightness values each measured for a specific unit group 32 in an image in which clipped black is present and no clipped white is present. When clipped black is present and no clipped white is present, i.e., when the brightness values in the brightest area 1108 and the primary area 1110 are all within the predetermined range (the range between the lower limit value and the upper limit value) but brightness values in the darkest area 1109 are outside the range, the aggregate 1123 in the brightest area 1108 and an aggregate 1122*a* in the primary area 1110 are situated within the range between the predetermined lower limit value 1120 and the predetermined upper limit value 1130, but at least part of an aggregate 1121*a* in the darkest area 1109 is situated further to the left beyond the predetermined lower limit value 1120. In this situation, the control unit 33 sets image-capturing conditions matching those set for the preliminary image-capturing operation, i.e., the specific image-capturing conditions determined under the automatic exposure control as the initial conditions for the brightest area 1108.

The control unit 33 sets image-capturing conditions under which there will be no clipped black as the initial conditions for the darkest area 1109. Namely, it selects image-capturing conditions under which the darkest area 1109 is captured as a brighter image compared to the image captured with the specific image-capturing conditions determined under the automatic exposure control. As a result, the aggregate 1121*a* in the darkest area 1109 in FIG. 22(*b*) is moved to a position next to the predetermined lower limit value 1120 further to the right relative to the predetermined lower limit value 1120 (the aggregate 1121 indicated by the solid line in FIG. 22(*b*)).

In addition, the control unit 33 selects image-capturing conditions corresponding to the initial conditions for the darkest area 1109 and the initial conditions for the brightest area 1108 as the initial conditions for the primary area 1110. In more specific terms, with D1 representing the absolute value of the difference between the mode of the brightness values in the darkest area 1109 and the mode of the brightness values in the primary area 1110 under the specific image-capturing conditions determined under the automatic exposure control, D2 representing the absolute value of the difference between the mode of the brightness values in the primary area 1110 and the mode of the brightness values in the brightest area 1108 under the same image-capturing conditions and da representing the absolute value of the difference between the mode of the brightness values in the darkest area 1109 under the specific image-capturing conditions determined under the automatic exposure control and the mode of the brightness values in the darkest area 1109 under the initial conditions explained earlier, image-capturing conditions under which the brightness in the primary area 1110 is raised (the primary area is brightened) by an extent represented by D3, defined as in (1) below, are set as the initial conditions for the primary area 1110.

$$D3=(da\times D2)/(D1+D2) \quad (1)$$

Namely, initial conditions are set for the darkest area 1109 and the primary area 1110 so as to eliminate clipped black while retaining the relationship among the brightness in the darkest area 1109, the brightness in the primary area 1110 and the brightness in the brightest area 1108 under the specific image-capturing conditions determined under the automatic exposure control. As a result, the aggregate 1122*a* in the primary area 1110 in FIG. 5 is moved further to the right along the brightness axis by D3 (the aggregate 1122 indicated by the solid line in FIG. 22(*b*).

If the user performs an adjustment operation to adjust the image-capturing conditions for the primary area 1110 so as to darken the primary area 1110 (i.e., so as to reduce the brightness in the primary area 1110), the control unit 33 adjusts the image-capturing conditions for the brightest area 1108 so that a brightness difference D2' between the brightness of the aggregate 1123 in the brightest area 1108 and the brightness of the aggregate 1122 in the primary area 1110 is sustained. In other words, it adjusts the image-capturing conditions for the brightest area 1108 to image-capturing conditions under which the brightest area 1108 will be captured as a darker image. In more specific terms, as the user moves the aggregate 1122 in the primary area 1110 further to the left along the brightness axis in FIG. 22(*b*), the control unit 33 moves the aggregate 1123 in the brightest area 1108 further to the left along the brightness axis by interlocking with the user operation. Namely, upon accepting the user operation for adjusting the image-capturing conditions for the primary area 1110, the control unit 33 adjusts the image-capturing conditions for the brightest area 1108 as well as the image-capturing conditions for the primary area 1110. The control unit 33 adjusts the image-capturing conditions for the brightest area 1108 by adjusting the image-capturing conditions for the primary area 1110.

It is to be noted that the control unit 33 adjusts the image-capturing conditions for the primary area 1110 by ensuring that the brightness in the primary area 1110 does not become less than the predetermined lower limit value 1120. In other words, once the brightness in the primary area 1110 reaches the predetermined lower limit value 1120, the control unit 33 stops (forbids) further adjustment of the image-capturing conditions for the primary area 1110. In more specific terms, if a movement of the the aggregate 1122 in the primary area 1110 further to the left along the brightness axis in FIG. 22(*b*), would result in the aggregate 1122 in the primary area 1110 ranging beyond the predetermined lower limit value 1120, the control unit 33 holds the aggregate 1122 in the primary area 1110 in place, disallowing further movement thereof.

In addition, if the user performs an adjustment operation to adjust the image-capturing conditions for the primary area 1110 so as to brighten the primary area 1110 (i.e., so as to raise the brightness in the primary area 1110) the control unit 33 adjusts the image-capturing conditions for the brightest area 1108 so that a brightness difference between the brightness of the aggregate 1123 in the brightest area 1108 and the brightness of the aggregate 1122 in the primary area 1110 is sustained. In other words, it adjusts the image-capturing conditions for the brightest area 1108 to image-capturing conditions under which the brightest area 1108 will be captured as an even brighter image. In other words, as the user moves the aggregate 1122 in the primary area 1110 further to the right along the brightness axis in FIG. 22(*b*) the control unit 33 moves the aggregate 1123 in the brightest area 1108 further to the right along the brightness axis by interlocking with the user operation. Namely, upon accepting the user operation for adjusting the image-capturing conditions for the primary area 1110, the control unit 33 adjusts the image-capturing conditions for the brightest area 1108 as well as the image-capturing conditions for the primary area 1110. The control unit 33 adjusts the image-capturing conditions for the brightest area 1108 by adjusting the image-capturing conditions for the primary area 1110.

It is to be noted that the control unit 33 adjusts the image-capturing conditions for the brightest area 1108 by ensuring that the brightness in the brightest area 1108 does not exceed the predetermined upper limit value 1130. In other words, once the brightness in the brightest area 1108 reaches the predetermined upper limit value 1130, the control unit 33 stops further adjustment of the image-capturing conditions for the brightest area 1108. In more specific terms, when the user moves the aggregate 1122 in the primary area 1110 further to the right along the brightness axis in FIG. 22(*b*), the aggregate 1123 in the brightest area 1108 might be moved to a brightness level above the predetermined upper limit value 1130. Under such circumstances, the control unit 33 simply moves the aggregate 1122 in the primary area 1110 to the right along the brightness axis and holds the aggregate 1123 in the brightest area 1108 in place without allowing any further movement thereof. This will result in a change in the brightness difference D2' between the aggregate 1123 in the brightest area 1108 and the aggregate 1122 in the primary area 1110.

In addition, the control unit 33 adjusts the image-capturing conditions for the primary area 1110 by ensuring that the brightness in the primary area 1110 does not exceed the predetermined upper limit value 1130. In other words, the control unit 33 stops further adjustment of the image-capturing conditions for the primary area 1110 once the brightness in the primary area 1110 reaches the predetermined upper limit value 1130. Namely, if a movement of the aggregate 1122 in the primary area 1110 further to the right along the brightness axis would result in the aggregate 1122 in the primary area 1110 ranging beyond the predetermined upper limit value 1130 in FIG. 22(*b*), the control unit 33 disallows further movement of the aggregate 1122 in the primary area 1110.

It is to be noted that through the adjustment operation described above, the image-capturing conditions for the darkest area 1109 remain unchanged. In other words, the aggregate 1121 in the darkest area 1109 does not move regardless of whether the user attempts to move the aggregate 1122 in the primary area 1110 further to the left or further to the right along the brightness axis in FIG. 22(*a*).

(C) Clipped White Present with No Clipped Black (White-Clipping Image)

FIG. 22(*c*) presents histograms of brightness values each measured for a specific unit group 32 in an image in which clipped white is present and no clipped black is present. When clipped white is present with no clipped black, i.e., when the brightness values in the darkest area 1109 and the primary area 1110 are all within the predetermined range (the range between the lower limit value and the upper limit value) but brightness values in the brightest area 1108 are outside the range, the aggregate 1121 in the darkest area 1109 and an aggregate 1122*a* in the primary area 1110 are situated within the range between the predetermined lower limit value 1120 and the predetermined upper limit value 1130, but at least part of an aggregate 1123*a* in the brightest area 1108 is situated further to the right beyond the predetermined upper limit value 1130. In this situation, the control unit 33 sets image-capturing conditions matching those set for the preliminary image-capturing operation, i.e., the specific image-capturing conditions determined under the automatic exposure control as the initial conditions for the darkest area 1109.

The control unit 33 sets image-capturing conditions under which there will be no clipped white as the initial conditions for the brightest area 1108. Namely, it selects image-capturing conditions under which the brightest area 1108 is captured as a darker image compared to the image captured with the specific image-capturing conditions determined under the automatic exposure control. As a result, the aggregate 1123*a* in the brightest area 1108 in FIG. 22(*c*) is moved to a position next to the predetermined upper limit value 1130 further to the left relative to the predetermined upper limit value 1130 (the aggregate 1123 indicated by the solid line in FIG. 22(*c*)).

In addition, the control unit 33 selects image-capturing conditions corresponding to the initial conditions for the darkest area 1109 and the initial conditions for the brightest area 1108 as the initial conditions for the primary area 1110. In more specific terms, with D1 representing the absolute value of the difference between the mode of the brightness values in the darkest area 1109 and the mode of the brightness values in the primary area 1110 under the specific image-capturing conditions determined under the automatic exposure control, D2 representing the absolute value of the difference between the mode of the brightness values in the primary area 1110 and the mode of the brightness values in the brightest area 1108 under the same image-capturing conditions and db representing the absolute value of the difference between the mode of the brightness values in the brightest area 1108 under the specific image-capturing conditions determined under the automatic exposure control and the mode of the brightness values in the brightest area 1108 under the initial conditions explained earlier, image-capturing conditions under which the brightness in the primary area 1110 is lowered (the primary area is darkened) by an extent represented by D4, defined as in (2) below, are set as the initial conditions for the primary area 1110.

$$D4=(db\times D1)/(D1+D2) \quad (2)$$

Namely, initial conditions are set for the brightest area 1108 and the primary area 1110 so as to eliminate clipped white while retaining the relationship among the brightness in the darkest area 1109, the brightness in the primary area 1110 and the brightness in the brightest area 1108 under the specific image-capturing conditions determined under the automatic exposure control. As a result, the aggregate 1122*a* in the primary area 1110 in FIG. 22(*c*) is moved further to the left along the brightness axis by D4 (the aggregate 1122 indicated by the solid line in FIG. 22(*c*)).

If the user performs an adjustment operation to adjust the image-capturing conditions for the primary area 1110 so as to darken the primary area 1110 (i.e., so as to reduce the brightness in the primary area 1110), the control unit 33 adjusts the image-capturing conditions for the darkest area 1109 so that a brightness difference D1' between the brightness of the aggregate 1121 in the darkest area 1109 and the brightness of the aggregate 1122 in the primary area 1110 is sustained. In other words, it adjusts the image-capturing conditions for the darkest area 1109 to image-capturing conditions under which the darkest area 1109 will be captured as an even darker image. More specifically, as the user moves the aggregate 1122 in the primary area 1110 further to the left along the brightness axis in FIG. 22(*c*), the control unit 33 moves the aggregate 1121 in the darkest area 1109 further to the left along the brightness axis by interlocking with the user operation. Namely, upon accepting the user operation for adjusting the image-capturing conditions for the primary area 1110, the control unit 33 adjusts the image-capturing conditions for the darkest area 1109 as well as the image-capturing conditions for the primary area 1110. The control unit 33 adjusts the image-capturing conditions for the darkest area 1109 by adjusting the image-capturing conditions for the primary area 1110.

It is to be noted that the control unit 33 adjusts the image-capturing conditions for the darkest area 1109 by ensuring that the brightness in the darkest area 1109 does not become less than the predetermined lower limit value 1120. In other words, once the brightness in the darkest area 1109 reaches the predetermined lower limit value 1120, the control unit 33 stops (forbids) further adjustment of the image-capturing conditions for the darkest area 1109. In more specific terms, when the user moves the aggregate 1122 in the primary area 1110 further to the left along the brightness axis in FIG. 22(*c*), the aggregate 1121 in the darkest area 1109 could be moved to a brightness level below the predetermined lower limit value 1120. Under these circumstances, the control unit 33 simply moves the aggregate 1122 in the primary area 1110 further to the left along the brightness axis and holds the aggregate 1121 in the darkest area 1109 in place, disallowing further movement thereof. This will result in a change in the brightness difference D1' between the aggregate 1121 in the darkest area 1109 and the aggregate 1122 in the primary area 1110.

In addition, the control unit 33 adjusts the image-capturing conditions for the primary area 1110 by ensuring that the brightness in the primary area 1110 does not become lower than the predetermined lower limit value 1120. In other words, the control unit 33 stops further adjustment of the image-capturing conditions for the primary area 1110 once the brightness in the primary area 1110 reaches the predetermined lower limit value 1120. Namely, if a movement of the aggregate 1122 in the primary area 1110 further to the left along the brightness axis would result in the aggregate 1122 in the primary area 1110 ranging beyond the predetermined lower limit value 1120 in FIG. 22(*c*), the control unit 33 disallows further movement of the aggregate 1122 in the primary area 1110.

In addition, if the user performs an adjustment operation to adjust the image-capturing conditions for the primary area 1110 so as to brighten the primary area 1110 (i.e., so as to raise the brightness in the primary area 1110), the control unit 33 adjusts the image-capturing conditions for the darkest area 1109 so that a brightness difference between the brightness of the aggregate 1121 in the darkest area 1109 and the brightness of the aggregate 1122 in the primary area 1110 is sustained. In other words, it adjusts the image-capturing conditions for the darkest area 1109 to image-capturing conditions under which the darkest area 1109 will be captured as a brighter image. More specifically, as the user moves the aggregate 1122 in the primary area 1110 further to the right along the brightness axis in FIG. 22(*c*) the control unit 33 moves the aggregate 1121 in the darkest area 1109 further to the right along the brightness axis by interlocking with the user operation. Namely, upon accepting the user operation for adjusting the image-capturing conditions for the primary area 1110, the control unit 33 adjusts the image-capturing conditions for the darkest area 1109 as well as the image-capturing conditions for the primary area 1110. The control unit 33 adjusts the image-capturing conditions for the darkest area 1109 by adjusting the image-capturing conditions for the primary area 1110.

It is to be noted that the control unit 33 adjusts the image-capturing conditions for the primary area 1110 by ensuring that the brightness in the primary area 1110 does not exceed the predetermined upper limit value 1130. In other words, once the brightness in the primary area 1110 reaches the predetermined upper limit value 1130, the control unit 33 stops further adjustment of the image-capturing conditions for the primary area 1110. In more specific terms, if the user moves the aggregate 1122 in the primary area 1110 further to the right along the brightness axis in FIG. 22(*c*), the aggregate 1122 in the primary area 1110 would be moved to a brightness level beyond the predetermined upper limit value 1130, the control unit 33 holds the aggregate 1122 in the primary area 1110 in place, disallowing any further movement thereof.

It is to be noted that through the adjustment operation described above, the image-capturing conditions for the brightest area 1108 remain unchanged. In other words, the aggregate 1123 in the brightest area 1108 does not move regardless of whether the user attempts to move the aggregate 1122 in the primary area 1110 further to the left or further to the right along the brightness axis in FIG. 22(*c*).

(D) Both Clipped Black and Clipped White Present

FIG. 22(*d*) presents histograms of brightness values each measured for a specific unit group 32 in an image having both clipped black and clipped white. When both clipped black and clipped white are present, i.e., when the brightness in the primary area 1110 is within the predetermined range (the range between the lower limit value and the upper limit value) but the brightness in the darkest area 1109 and the brightness in the brightest area 1108 are beyond the range, an aggregate 1122*a* in the primary area 1110 remains within the range between the predetermined lower limit value 1120 and the predetermined upper limit value 1130, at least part of the aggregate 1121*a* in the darkest area 1109 takes up a position further to the left beyond the predetermined lower limit value 1120 and at least part of an aggregate 1123*a* in the brightest area 1108 takes a position further to the right beyond the predetermined upper limit value 1130.

Under these circumstances, the control unit 33 sets image-capturing conditions under which both clipped black and clipped white are eliminated while sustaining the positional relationship among the darkest area 1109, the brightest area 1108 and the primary area 1110 (the relationship among the brightness levels in those areas) as the initial conditions for the darkest area 1109, the brightest area 1108 and the primary area 1110. Namely, the control unit 33 selects image-capturing conditions under which the darkest area 1109 will be captured as a brighter image than that captured under the specific image-capturing conditions determined under the automatic exposure control as the initial conditions for the darkest area 1109, and selects image-capturing conditions under which the brightest area 1108 is captured as a darker image than that captured under the specific image-capturing conditions determined under the automatic exposure control, as the initial conditions for the brightest area 1108. As a result, the aggregate 1121*a* in the darkest area 1109 and the aggregate 1123*a* in the brightest area 1108 under the initial conditions indicated by the dotted lines in FIG. 22(*d*) each move into the range between the lower limit value 1120 and the upper limit value 1130 (aggregates 1121 and 1123 each indicated by the solid line in FIG. 22(*d*)). The initial conditions for the primary area 1110 are set to the image-capturing conditions corresponding to the initial conditions for the darkest area 1109 and the initial conditions for the brightest area 1108.

In more specific terms, with D1 representing the absolute value of the difference between the mode of the brightness values in the darkest area 1109 and the mode of the brightness values in the primary area 1110 under the specific image-capturing conditions determined under the automatic exposure control, D2 representing the absolute value of the difference between the mode of the brightness values in the primary area 1110 and the mode of the brightness values in the brightest area 1108 under the same image-capturing conditions, da representing the absolute value of the difference between the mode of the brightness values in the darkest area 1109 under the specific image-capturing conditions determined under the automatic exposure control and the mode of the brightness values in the darkest area 1109 under the initial conditions explained earlier, and db representing the absolute value of the difference between the mode of the brightness values in the brightest area 1108 under the specific image-capturing conditions determined under the automatic exposure control and the mode of the brightness values in the brightest area 1108 under the initial conditions mentioned earlier, image-capturing conditions under which the brightness in the primary area 1110 changes by an extent represented by D5, defined as in (3) below, are set as the initial conditions for the primary area 1110.

$$D5=(db\times D1-da\times D2)/(D1+D2) \quad (3)$$

Namely, initial conditions are set for the darkest area 1109, the primary area 1110 and the brightest area 1108 so as to eliminate clipped black and clipped white while retaining the relationship among the brightness in the darkest area 1109, the brightness in the primary area 1110 and the brightness in the brightest area 1108 under the specific image-capturing conditions determined under the automatic exposure control.

As the user performs an adjustment operation in order to adjust the image-capturing conditions for the primary area 1110, the control unit 33 simply adjusts the image-capturing conditions for the primary area 1110 alone without adjusting the image-capturing conditions for the darkest area 1109 or the brightest area 1108. In other words, as the user moves the aggregate 1122 in the primary area 1110 either to the left or to the right along the brightness axis in FIG. 22(*d*), the control unit 33 moves the aggregate 1122 in the primary area 1110 in the direction desired by the user along the brightness axis while holding the aggregate 1121 in the darkest area 1109 and the aggregate 1123 in the brightest area 1108 at the current positions.

It is to be noted that the control unit 33 adjusts the image-capturing conditions for the primary area 1110 by ensuring that the brightness in the primary area 1110 does not become lower than the predetermined lower limit value 1120 or higher than the predetermined upper limit value 1130. In other words, the control unit 33 disallows adjustment of the image-capturing conditions for the primary area 1110, which would result in the brightness in the primary area 1110 becoming lower than the predetermined lower limit value 1120 or adjustment of the image-capturing conditions for the primary area 1110, which would result in the brightness in the primary area 1110 becoming higher than the predetermined upper limit value 1130. Namely, if an attempt by the user to move the aggregate 1122 in the primary area 1110 to the left along the brightness axis in FIG. 22(*d*) would result in the aggregate 1122 in the primary area 1110 moving beyond the predetermined lower limit value 1120, the control unit 33 holds the aggregate 1122 in the primary area 1110 in place and disallows any movement thereof. Moreover, if an attempt by the user to move the aggregate 1122 in the primary area 1110 to the right along the brightness axis would result in the aggregate 1122 in the primary area 1110 moving beyond the predetermined upper limit value 1130, the control unit 33 holds the aggregate 1122 in the primary area 1110 in place and disallows any movement thereof.

It is to be noted that while the control unit 33 automatically determines the initial values for the image-capturing conditions under the automatic exposure control of the known art in the description provided above, manual values specified by the user may be used as the initial values for the image-capturing conditions.

The following advantages and operations are achieved with the image-capturing device in the fourth embodiment described above.

(1) The image sensor 22 (image-capturing unit) adopts a structure that allows different image-capturing conditions to be set from one unit group 32 (image-capturing area) to another among a plurality of unit groups 32. The control unit 33 captures an image of the primary area 1110 in the subject via a unit group 32 with first image-capturing conditions set therein and captures an image of the darkest area 1109 or the brightest area 1108 in the subject via another unit group 32, i.e., a second unit group 32 with second image-capturing conditions set therein. The control unit 33 adjusts the first image-capturing conditions in response to a user operation and further adjusts the second image-capturing conditions based upon the adjusted first image-capturing conditions. Thus, a user-friendly image-capturing device 3010 that allows desired image-capturing conditions to be set for each image-capturing area with ease can be provided.

(2) Prior to the adjustment of the first image-capturing conditions executed in response to the user operation, the control unit 33 sets initial values for the first image-capturing conditions and initial values for the second image-capturing conditions so that image-capturing signals originating from the unit group 32 engaged to capture an image of the primary area 1110 and image-capturing signals originating from the unit groups 32 engaged to capture images of the darkest area 1109 and the brightest area 1108, all remain within the range between the lower limit value 1120 and the upper limit value 1130 under these image-capturing conditions. As a result, an image with a greater dynamic range can be captured. In other words, the dynamic range of the captured image can be increased.

(3) The control unit 33 forbids any adjustment of the second image-capturing conditions that would cause the image-capturing signals originating from the unit groups engaged to capture images of the darkest area 1109 and the brightest area 1108 to range beyond the lower limit value 1120 or the upper limit value 1130. Through these measures, it is ensured that image-capturing condition adjustment would not result in occurrence of clipped black or clipped white, and thus, the user is able to freely set the image-capturing conditions he desires without having to worry about clipped black or clipped white.

(4) The control unit 33 forbids adjustment of the second image-capturing conditions that would result in a reversal of the magnitude relations among the image-capturing signals originating from the primary area 1110, the image-capturing signals originating from the darkest area 1109 and the image-capturing signals originating from the brightest area 1108. Through these measures, it is ensured that an image taking on unnatural brightness is never created.

(5) The control unit 33 determines the extent to which an image-capturing condition for the darkest area 1109 or the brightest area 1108 is to be adjusted based upon the extent to which the corresponding image-capturing condition is adjusted for the primary area 1110. As a result, desired image-capturing conditions can be set for the individual image-capturing areas with ease.

The following variations are also within the scope of the present invention, and one of the variations or a plurality of variations may be adopted in combination with the embodiment described above.

(Variation 1)

While an explanation has been given on how the image-capturing conditions for the darkest area 1109 or the brightest area 1108 are adjusted in coordination with an adjustment operation for adjusting the image-capturing conditions for the primary area 1110 and what adjustment is forbidden in response to the adjustment operation for adjusting the image-capturing conditions for the primary area 1110, they simply represent examples and image-capturing conditions may be adjusted and image-capturing condition adjustment may be forbidden with patterns different from these.

For instance, in coordination with an adjustment operation performed by the user to adjust the image-capturing conditions for the primary area 1110 so as to capture a brighter image of the primary area 1110, the control unit 33 may adjust both the image-capturing conditions for the darkest area 1109 and the image-capturing conditions for the brightest area 1108 so that brighter (or darker) images of the darkest area 1109 and the brightest area 1108 are captured. Namely, the control unit 33, having accepted the user operation for adjusting the image-capturing conditions for the primary area 1110, adjusts the image-capturing conditions for the primary area 1110, the image-capturing conditions for the brightest area 1108 and the image-capturing conditions for the darkest area 1109. The control unit 33 adjusts the image-capturing conditions for the brightest area 1108 and the image-capturing conditions for the darkest area 1109 by adjusting the image-capturing conditions for the primary area 1110. At this time, the brightness may be adjusted for the darkest area 1109 or the brightest area 1108 over a number of steps, e.g., over a number of shutter speed levels, different from the number of steps (e.g., the number of shutter speed levels) over which the brightness is adjusted by the user.

However, regardless of what adjustment pattern is adopted, setting of an image-capturing condition under which clipped black would occur in the darkest area 1109 and setting of an image-capturing condition under which clipped white would occur in the brightest area 1108 must be disallowed. In addition, an interlocking pattern, whereby the image-capturing conditions for both the darkest area 1109 and the brightest area 1108 are adjusted in a manner the same as that with which the image-capturing conditions for the primary area 1110 are adjusted (e.g., the shutter speed settings for the darkest area 1109 and the brightest area 1108 are both raised by one level by interlocking with an increase in the shutter speed for the primary area 1110 by one level) should be avoided.

(Variation 2)

In the description provided above, an adjustment made in the image-capturing conditions is reflected in the subject image on display at the liquid crystal monitor 24. In this display, the adjustment made in the image-capturing conditions for the areas other than the primary area 1110 (i.e., the darkest area 1109 and the brightest area 1108) may be reflected with timing different from that with which the adjustment of the image-capturing conditions for the primary area 1110 is reflected in the subject image. For instance, following image-capturing condition adjustment, the adjustment in the image-capturing conditions for the primary area 1110 alone may be reflected initially, then after several seconds, the adjustment in the image-capturing conditions for the darkest area 1109 and the brightest area 1108 may also be reflected in the display image.

(Variation 3)

While an explanation has been given above on an example in which the image-capturing conditions are adjusted based upon the mode of the brightness values measured in the darkest area 1109, the mode of the brightness values measured in the brightest area 1108 and the mode of the brightness values measured in the primary area 1110, image-capturing condition adjustment may be made based upon values other than the modes. For instance, medians of the brightness values or averages of the brightness values may be used instead.

(Variation 4)

When clipped white is present and no clipped black is present, as described in (C) earlier, the extent by which an image-capturing condition is to be adjusted may be varied in correspondence to the type of subject present in the brightest area 1108. Namely, upon accepting a user operation performed to adjust the image-capturing conditions for the primary area 1110, the control unit 33 adjusts the image-capturing conditions for the primary area 1110 and the image-capturing conditions for the brightest area 1108. In this situation, an image-capturing condition for the brightest area 1108 may be adjusted by an extent different from the extent by which the corresponding image-capturing condition is adjusted for the primary area 1110. For instance, the control unit 33 may identify the subject located in the brightest area 1108 based upon information such as the image-capturing distance. In this variation, the subject present in the brightest area 1108 may be judged to be the sky. Under such circumstances, in coordination with an adjustment operation performed to adjust the image-capturing conditions for the primary area 1110 so as to capture a brighter image of the primary area 1110, the control unit 33 adjusts the image-capturing conditions for the sky area (i.e., the brightest area 1108) by a matching extent so that an image with reduced brightness in the sky, i.e., reduced brightness in the brightest area 1108, is captured.

The subject present in the brightest area 1108 may be judged to be a building. In this case too, in coordination with an adjustment operation performed to adjust the image-capturing conditions for the primary area 1110 so as to capture a brighter image of the primary area 1110, the control unit 33 adjusts the image-capturing conditions for the building area (the brightest area 1108) so that an image with reduced brightness in the building, i.e., lowered brightness in the brightest area 1108 (a darker image) is captured. At this time, the extent of image-capturing condition adjustment for the brightest area 1108 is set smaller than that of image-capturing condition adjustment for the primary area 1110. For instance, assuming that an operation for lowering the shutter speed for the primary area 1110 by one level has been performed, the control unit raises the shutter speed for the brightest area 1108 by ⅓ level. It is to be noted that the image-capturing conditions for the brightest area 1108 should be adjusted by ensuring that no image blurring will occur. Namely, if the likelihood of image blurring is equal to or higher than a predetermined level, adjustment of the image-capturing conditions for the brightest area 1108 should be forbidden.

Through the measures described above, a vivid image with the blue of the sky rendered with enhanced color can be captured.

(Variation 5)

When clipped black is present and no clipped white is present, as described in (B) earlier, the extent by which an image-capturing condition is to be adjusted may be varied in correspondence to the type of subject present in the darkest area 1109. Namely, upon accepting a user operation performed to adjust the image-capturing conditions for the primary area 1110, the control unit 33 adjusts the image-capturing conditions for the primary area 1110 and the image-capturing conditions for the darkest area 1109. In this situation, an image-capturing condition for the darkest area 1109 may be adjusted by an extent different from the extent by which the corresponding image-capturing condition is adjusted for the primary area 1110. For instance, the control unit 33 may identify the subject located in the darkest area 1109 based upon information such as the image-capturing distance. In this variation, the subject present in the darkest area 1109 may be judged to be a building. Under such circumstances, in coordination with an adjustment operation performed to adjust the image-capturing conditions for the primary area 1110 so as to capture a brighter image of the primary area 1110, the control unit 33 adjusts the image-capturing conditions for the building area (i.e., the darkest area 1109) by a matching extent so that an image with increased brightness in the building, i.e., increased brightness in the darkest area 1109 is captured. It is to be noted that the image-capturing conditions for the darkest area 1109 should be adjusted by ensuring that no image blurring will occur. Namely, if the likelihood of image blurring is equal to or higher than a predetermined level, adjustment of the image-capturing conditions for the darkest area 1109 should be forbidden.

The subject present in the darkest area 1109 may be judged to be the sky (night sky). In this case too, in coordination with an adjustment operation performed to adjust the image-capturing conditions for the primary area 1110 so as to capture a brighter image of the primary area 1110, the control unit 33 adjusts the image-capturing conditions for the sky area (the darkest area 1109) so that an image with increased brightness in the sky, i.e., raised brightness in the darkest area 1109 (a brighter image) is captured. At this time, the extent of image capturing condition adjustment for the darkest area 1109 is set smaller than that of the image capturing condition adjustment for the primary area 1110. For instance, assuming that an operation for lowering the shutter speed for the primary area 1110 by one level has been performed, the control unit lowers the shutter speed for the darkest area 1109 by ⅓ level. It is to be noted that the image-capturing conditions for the darkest area 1109 should be adjusted by ensuring that no high-sensitivity noise or image blurring will occur as a result of the adjustment. Namely, if the likelihood of high-sensitivity noise or image blurring is equal to or higher than a predetermined level, adjustment of the image-capturing conditions for the darkest area 1109 should be forbidden.

Through these measures, it is ensured that an image showing an unnaturally bright sky, for instance, is never captured.

(Variation 6)

In the embodiment described above, the primary area of the subject, and the darkest area and the brightest area present in the subject background area, are identified based upon the brightness distribution in the subject and the image-capturing conditions for the background area, i.e., the darkest area and the brightest area, are adjusted in correspondence to the adjustment of the image-capturing conditions for the primary area. The subject primary area and the subject background area may instead be identified based upon information other than the brightness distribution in the subject. For instance, the subject primary area and the subject background area may be identified based upon the velocity distribution (displacement distribution) in the subject.

For instance, an area where a high velocity is measured in the subject may be identified as a primary area and a subject area where a low velocity is measured may be identified as a background area (when capturing an image of a vehicle or the like). In this case, upon accepting a user operation for adjusting the image-capturing conditions for the primary area, the control unit 33 adjusts the image-capturing conditions for the primary area and the image-capturing conditions for the background area. The image-capturing conditions for the background area may be adjusted by an extent different from the extent by which the image-capturing conditions for the primary area are adjusted. For instance, while the control unit 33 may raise the shutter speed for the background area as the image-capturing conditions for the primary area are adjusted so as to raise the shutter speed for the primary area, the shutter speed for the background area may be raised by a smaller extent in comparison to that for the primary area. Likewise, while the control unit may lower the shutter speed for the background area as the image-capturing conditions for the primary area are adjusted to lower the shutter speed for the primary area, the shutter speed for the background area may be lowered by a greater extent compared to that for the primary area.

As an alternative, an area where a low velocity is measured in the subject may be identified as a primary area and a subject area where a high velocity is measured may be identified as a background area. In this case, upon accepting a user operation for adjusting the image-capturing conditions for the primary area, the control unit 33 adjusts the image-capturing conditions for the primary area and the image-capturing conditions for the background area. The image-capturing conditions for the background area may be adjusted by an extent different from the extent by which the image-capturing conditions for the primary area are adjusted. For instance, while the control unit 33 may raise the shutter speed for the background area as the image-capturing conditions for the primary area are adjusted so as to raise the shutter speed for the primary area, the shutter speed for the background area may be raised by a smaller extent in comparison to that for the primary area. Likewise, while the control unit may lower the shutter speed for the background area as the image-capturing conditions for the primary area are adjusted to lower the shutter speed for the primary area, the shutter speed for the background area may be lowered by a greater extent compared to that for the primary area.

It is to be noted that in either of the examples described above, a lower limit should be set for the shutter speed in the background area so as to prevent image blurring. In addition, it is desirable to forbid any adjustment that would reverse the magnitude relation between the shutter speed for the primary area and the shutter speed for the background area.

(Variation 7)

While the image-capturing conditions are adjusted in response to the acceptance of a specific adjustment operation performed at an operation member in the embodiment described above, an operation other than this may be performed for the purpose of image-capturing condition adjustment. For instance, an operation screen for image-capturing condition adjustment may be brought up on display at the liquid crystal monitor 24 that includes a touch sensor at which an input operation by the user is accepted. In more specific terms, an operation image 1111 at which an image-capturing operation adjustment operation is accepted may be brought up on display at the liquid crystal monitor 24, as shown in FIG. 23. The operation image 1111 includes an adjustment bar 1112 and a slider 1113. An image-capturing condition setting is selected based upon the position of the slider 1113 on the adjustment bar 1112. The user operates the slider to adjust an image-capturing condition. For instance, the user, wishing to adjust the brightness in the primary area through an image-capturing condition adjustment operation, moves the slider 1113 along the adjustment bar 1112. If the user moves the slider 1113 toward the left end of the adjustment bar, an image-capturing condition setting for darkening the primary area relative to the current level is selected. In this situation, as the image-capturing condition for the primary area is adjusted, the corresponding image-capturing condition for the image-capturing areas other than the primary area, too, is adjusted. In addition, if the user moves the slider 1113 toward the right end of the adjustment bar, an image-capturing condition setting for brightening the primary area relative to the current level is selected. In this situation, as the image-capturing condition for the primary area is adjusted, the corresponding image-capturing condition for the image-capturing areas other than the primary area, too, is adjusted (Variation 8)

While image-capturing conditions are adjusted in the embodiment described above for the subject primary area and the subject background area, i.e., the darkest area and the brightest area, image-capturing conditions may be adjusted for a target other than these. For instance, image-capturing conditions may be adjusted for a selected primary subject and for another photographic subject among a plurality of photographic subjects extracted by the object recognition unit 23*a* as has been described in reference to the first embodiment, the second embodiment and the third embodiment. Namely, as the image capturing conditions for a given photographic subject among the plurality of photographic subjects extracted by the object recognition unit 23*a* are adjusted, the image-capturing conditions for the other photographic subject having been extracted may also be adjusted in sync. In such a case, the extent to which the image-capturing conditions are adjusted for the selected photographic subject among the photographic subjects extracted by the object recognition unit 23*a*, may be set differently from the extent to which the image-capturing conditions are adjusted for the other photographic subject. In addition, a single photographic subject may be selected by the user and, in such as case, the image-capturing conditions for a photographic subject (e.g., a person, a face, a building, the sky, or the like) other than the selected photographic subject, that is also in the subject image may be adjusted as the image-capturing conditions for the selected photographic subject are adjusted. In other words, the fourth embodiment may be adopted in conjunction with the first embodiment, the second embodiment and the third embodiment. Thus, by adjusting the image-capturing conditions for a single photographic subject among a plurality of photographic subjects present in an image, the image-capturing conditions for another subject can also be adjusted, resulting in a reduction in the length of time required for the image-capturing condition adjustment operation. In addition, the length of time required to select a target subject for the image-capturing condition adjustment can also be reduced.

(Variation 9)

While the image-capturing device is configured as a single electronic device comprising the image sensor 22 and the control unit 33 in the embodiment described above, the present invention is not limited to this example. The present invention may also be adopted in, for instance, an electronic device that controls an external image sensor 22 disposed outside the device. The following is a detailed description of an embodiment in which the present invention is adopted in conjunction with an external sensor 22.

FIG. 24 is a schematic block diagram showing the structure of an image-capturing system achieved in Variation 9. An image-capturing system 4000 in FIG. 24 is configured with an image-capturing unit 4001 and an electronic device 4002. The image-capturing unit 4001 includes the image-capturing optical system 21 and the image sensor 22 described in reference to the fourth embodiment and further includes a first communication unit 4003. The electronic device 4002 includes the control unit 33, the liquid crystal monitor 24, the memory card 25, the operation unit 26, the DRAM 27, the flash memory 28 and the audio recording unit 34 described in reference to the fourth embodiment and further includes a second communication unit 4004. The first communication unit 4003 and the second communication unit 4004 are able to carry out bidirectional data communication through, for instance, a wireless communication technology or an optical communication technology of the known art.

In the image-capturing system 4000 in Variation 9, the control unit 33 controls the image sensor 22 through data communication via the second communication unit 4004 and the first communication unit 4003. For instance, it sets different image-capturing conditions from one unit group 32 to another and reads out image-capturing signals from the individual unit groups 32 by exchanging specific control data with the image-capturing unit 4001.

It is to be noted that the present invention is in no way limited to the particulars of the embodiments described above, and relates to an electronic device adopting any of various structures, comprising a display control unit that brings up on display at a display unit subject image captured by an image-capturing unit controlled under specific image-capturing conditions set for each of a plurality of image-capturing areas and a sectionalizing unit that sectionalizes at least one areal portion in the subject image. The display control unit in the electronic device displays a partial image of an image-capturing area corresponding to the areal portion captured by the image-capturing unit, and the subject image at the display unit.

In addition, the present invention is in no way limited to the particulars of the embodiments described above, and relates to an image-capturing device adopting any of various structures, comprising the electronic device described above, an image-capturing unit controlled under specific image-capturing conditions set in correspondence to each of a plurality of image-capturing areas, an image-capturing control unit that controls each of the plurality of image-capturing areas under the specific image-capturing conditions and a recording unit that records a subject image captured by the image-capturing unit into a recording medium. In this image-capturing device, the image-capturing control unit generates a subject image by controlling each image-capturing area under image-capturing conditions set by a setting unit in correspondence to the image-capturing area and the recording unit records the subject image into the recording medium.

Furthermore, the present invention is in no way limited to the particulars of the embodiments described above and relates to an image-capturing system adopting any of various structures, comprising the electronic device described above, and an image-capturing device. In this image-capturing system, the electronic device further includes a first communication unit capable of communicating with the image-capturing device and the image-capturing device includes an image-capturing unit that is controlled under specific image-capturing conditions set in correspondence to each of a plurality of image-capturing areas, an image-capturing control unit that generates a subject image by controlling each of the plurality of image-capturing areas under the specific image-capturing conditions and a second communication unit capable of communicating with the electronic device. The second communication unit transmits the subject image to the electronic device via the first communication unit, whereas the first communication unit transmits the image-capturing conditions set by a setting unit via the subject image brought up on display by the display control unit for each areal portion, to the image-capturing device.

As described above, the control unit 33 individually controls the unit groups 32 in the image-capturing system 4000. While the electronic device 4002 does not include an image sensor 22, it is able to execute control similar to that executed in the first embodiment by controlling the image sensor 22 (image-capturing unit 4001) disposed as an external component outside the electronic device 4002. In other words, the present invention may be adopted in an electronic device that does not include an image sensor 22.

As long as the features characterizing the present invention remain intact, the present invention is in no way limited to the particulars of the embodiments described above and any mode conceivable within the range of technical teaching of the present invention is also within the scope of the present invention.

The disclosures of the following priority applications are herein incorporated by reference:

Japanese Patent Application No. 2014-202104 filed Sep. 30, 2014

Japanese Patent Application No. 2014-202105 filed Sep. 30, 2014

REFERENCE SIGNS LIST

10 information terminal device, 21 image-capturing optical system, 22 image sensor, 23, 33 control unit, 23*a* object recognition unit, 23*b* weight setting unit, 23*c* area sectionalizing unit (area demarcating unit), 23*d* image-capturing condition setting unit, 23*e* image processing unit, 23*f* image-capturing control unit, 24 liquid crystal monitor, 25 memory card, 26 operation unit, 27 DRAM, 28 flash memory, 29 attitude detection unit, 34 audio recording unit, 3010 image-capturing device

What is claimed is:

1. An image-capturing device comprising:

an image sensor in which a plurality of pixels, each containing a photoelectric conversion part that converts light into an electric charge, are arranged along a row direction;

a setting part that sets a first pixel among the plurality of pixels to be driven under a first imaging condition; and a processor that is configured to control the setting part to drive a second pixel among the plurality of pixels under a second imaging condition when the first pixel is set to be driven under the first imaging condition by the setting part, wherein the processor controls the second imaging condition so that a difference between a brightness value of a subject imaged using the first pixel and a brightness value of the subject imaged using the second pixel becomes larger before and after the first imaging condition is set for the first pixel by the setting part.

2. The image-capturing device according to claim 1, wherein:

the image sensor includes:

a first conversion part that converts a first signal based on the electric charge converted by a first photoelectric conversion part into a digital signal; and a second conversion part that converts a second signal based on the electric charge converted by a second photoelectric conversion part into a digital signal, wherein the first photoelectric conversion part and the second photoelectric conversion part are disposed on a first semiconductor substrate, and the first conversion part and the second conversion part are disposed on a second semiconductor substrate stacked together with the first semiconductor substrate.

3. The image-capturing device according to claim 2, wherein:

the image sensor includes:

a first signal line on which the first signal read out from the first pixel is output;

a second signal line on which the second signal read out from the first pixel is output;

a first current source circuit that supplies current to the first signal line; and a second current source circuit that supplies current to the second signal line, wherein the first current source circuit and the second current source circuit are disposed on the second semiconductor substrate.

4. The image-capturing device according to claim 1, wherein:

the image sensor includes:

a first transfer part that transfers the electric charge of a first photoelectric conversion part; and a second transfer part that transfers the electric charge of a second photoelectric conversion part, wherein the processor controls the first transfer part and the second transfer part so that an accumulation time for accumulating the electric charge in the first photoelectric conversion part and an accumulation time for accumulating the electric charge in the second photoelectric conversion part become different from each other.

5. The image-capturing device according to claim 4, wherein:

the image sensor includes:

a first conversion part that converts a first signal based on the electric charge converted by the first photoelectric conversion part into a digital signal; and a second conversion part that converts a second signal based on the electric charge converted by the second photoelectric conversion part into a digital signal, wherein the first photoelectric conversion part and the second photoelectric conversion part are disposed on a first semiconductor substrate, and the first conversion part and the second conversion part are disposed on a second semiconductor substrate stacked together with the first semiconductor substrate.

6. The image-capturing device according to claim 5, wherein:

the image sensor includes:

a first signal line on which the first signal read out from the first pixel is output;

a second signal line on which the second signal read out from the first pixel is output;

a first current source circuit that supplies current to the first signal line; and a second current source circuit that supplies current to the second signal line, wherein the first current source circuit and the second current source circuit are disposed on the second semiconductor substrate.

7. The image-capturing device according to claim 4, wherein:

the image sensor includes:

a first reset part that discharges the electric charge of the first photoelectric conversion part; and a second reset part that discharges the electric charge of the second photoelectric conversion part, wherein the processor controls the first reset part and the second reset part so that the accumulation time for accumulating the electric charge in the first photoelectric conversion part and the accumulation time for accumulating the electric charge in the second photoelectric conversion part become different from each other.

8. The image-capturing device according to claim 7, wherein:

the image sensor includes:

a first conversion part that converts a first signal based on the electric charge converted by the first photoelectric conversion part into a digital signal; and a second conversion part that converts a second signal based on the electric charge converted by the second photoelectric conversion part into a digital signal, wherein the first photoelectric conversion part and the second photoelectric conversion part are disposed on a first semiconductor substrate, and the first conversion part and the second conversion part are disposed on a second semiconductor substrate stacked together with the first semiconductor substrate.

9. The image-capturing device according to claim 8, wherein:

the image sensor includes:

a first signal line on which the first signal read out from the first pixel is output;

a second signal line on which the second signal read out from the first pixel is output;

a first current source circuit that supplies current to the first signal line; and a second current source circuit that supplies current to the second signal line, wherein the first current source circuit and the second current source circuit are disposed on the second semiconductor substrate.

10. The image-capturing device according to claim 1, wherein:

the image sensor includes:

a first reset part that discharges the electric charge of the first photoelectric conversion part; and a second reset part that discharges the electric charge of the second photoelectric conversion part, wherein the processor controls the first reset part and the second reset part so that an accumulation time for accumulating the electric charge in the first photoelectric conversion part and an accumulation time for accumulating the electric charge in the second photoelectric conversion part become different from each other.

11. The image-capturing device according to claim 10, wherein:

the image sensor includes:

a first conversion part that converts a first signal based on the electric charge converted by the first photoelectric conversion part into a digital signal; and a second conversion part that converts a second signal based on the electric charge converted by the second photoelectric conversion part into a digital signal, wherein the first photoelectric conversion part and the second photoelectric conversion part are disposed on a first semiconductor substrate, and the first conversion part and the second conversion part are disposed on a second semiconductor substrate stacked together with the first semiconductor substrate.

12. The image-capturing device according to claim 11, wherein:

the image sensor includes:

a first signal line on which the first signal read out from the first pixel is output;

a second signal line on which the second signal read out from the first pixel is output;

a first current source circuit that supplies current to the first signal line; and a second current source circuit that supplies current to the second signal line, wherein the first current source circuit and the second current source circuit are disposed on the second semiconductor substrate.

13. The image-capturing device according to claim 1, wherein:

the setting part sets a first accumulation time for accumulating a charge in the first photoelectric conversion part, and the processor sets a second accumulation time for accumulating a charge in the second photoelectric conversion part when the first accumulation time is set by the setting part.

14. The image-capturing device according to claim 13, further comprising:

a reception part to accept user operations, wherein the setting part sets the first accumulation time based on the user operations received by the reception part.

15. An image-capturing device, comprising:

an image sensor in which a plurality of pixels, each containing a photoelectric conversion part that converts light into an electric charge, are arranged along a row direction;

a setting part that sets a first pixel among the plurality of pixels to be driven under a first imaging condition; and a processor that is configured to control the setting part to drive a second pixel among the plurality of pixels under a second imaging condition when the first pixel is set to be driven under the first imaging condition by the setting part, wherein the processor controls the second imaging condition so that a difference between a brightness value of a subject imaged using the first pixel and a brightness value of the subject imaged using the second pixel is maintained before and after the first imaging condition is set for the first pixel by the setting part.

16. The image-capturing device according to claim 15, wherein:

the image sensor includes:

a first transfer part that transfers the electric charge of a first photoelectric conversion part; and a second transfer part that transfers the electric charge of a second photoelectric conversion part, wherein the processor controls the first transfer part and the second transfer part so that an accumulation time for accumulating the electric charge in the first photoelectric conversion part and an accumulation time for accumulating the electric charge in the second photoelectric conversion part become different from each other.

17. The image-capturing device according to claim 16, wherein:

the image sensor includes:

a first reset part that discharges the electric charge of the first photoelectric conversion part; and a second reset part that discharges the electric charge of the second photoelectric conversion part, wherein the processor controls the first reset part and the second reset part so that the accumulation time for accumulating the electric charge in the first photoelectric conversion part and the accumulation time for accumulating the electric charge in the second photoelectric conversion part become different from each other.

18. The image-capturing device according to claim 15, wherein:

the image sensor includes:

a first reset part that discharges the electric charge of the first photoelectric conversion part; and a second reset part that discharges the electric charge of the second photoelectric conversion part, wherein the processor controls the first reset part and the second reset part so that an accumulation time for accumulating the electric charge in the first photoelectric conversion part and an accumulation time for accumulating the electric charge in the second photoelectric conversion part become different from each other.

19. The image-capturing device according to claim 15, wherein the setting part sets a first accumulation time for accumulating a charge in the first photoelectric conversion part, and the processor sets a second accumulation time for accumulating a charge in the second photoelectric conversion part when the first accumulation time is set by the setting part.

20. The image-capturing device according to claim 19, further comprising:

a reception part to accept user operations, wherein the setting part sets the first accumulation time based on the user operations received by the reception part.

* * * * *